(12) United States Patent
Brenan et al.

(10) Patent No.: US 11,154,834 B2
(45) Date of Patent: Oct. 26, 2021

(54) COATING PROCESS FOR MICROFLUIDIC SAMPLE ARRAYS

(71) Applicant: LIFE TECHNOLOGIES CORPORATION, Carlsbad, CA (US)

(72) Inventors: Colin Brenan, Marblehead, MA (US); Jamie Cho, Stoughton, MA (US); Javier Garcia, Lexington, MA (US); Robert Hess, Walnut Creek, CA (US); Tanya Kanigan, Charlotte, VT (US); Arrin Katz, Cambridge, MA (US); Namyong Kim, Palo Alto, CA (US); John Linton, Concord, MA (US); Shailesh Srivastava, Medway, MA (US); Karl Yoder, Stoneham, MA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

(21) Appl. No.: 16/284,953

(22) Filed: Feb. 25, 2019

(65) Prior Publication Data

US 2020/0055016 A1 Feb. 20, 2020

Related U.S. Application Data

(63) Continuation of application No. 14/300,100, filed on Jun. 9, 2014, now Pat. No. 10,213,761, which is a continuation of application No. 11/198,882, filed on Aug. 4, 2005, now abandoned.

(60) Provisional application No. 60/608,231, filed on Sep. 9, 2004, provisional application No. 60/599,217, filed on Aug. 4, 2004.

(51) Int. Cl.
*B01J 19/00* (2006.01)
*B01L 3/00* (2006.01)
*B01L 3/02* (2006.01)

(52) U.S. Cl.
CPC ....... *B01J 19/0046* (2013.01); *B01L 3/50857* (2013.01); *B01J 2219/0059* (2013.01); *B01J 2219/00596* (2013.01); *B01J 2219/00659* (2013.01); *B01L 3/0244* (2013.01); *B01L 3/5025* (2013.01); *B01L 2200/12* (2013.01); *B01L 2200/16* (2013.01); *B01L 2300/16* (2013.01)

(58) Field of Classification Search
CPC ............ B01J 19/0046; B01J 2219/0059; B01J 2219/00659
See application file for complete search history.

(56) References Cited

U.S. PATENT DOCUMENTS

| | | |
|---|---|---|
| 1,236,137 A | 8/1917 | Bastow |
| 2,745,001 A | 5/1956 | Guth |
| 2,771,398 A | 11/1956 | Snyder |
| 3,043,669 A | 7/1962 | Charles |
| 3,170,980 A | 2/1965 | Pritchard |
| 3,864,512 A | 2/1975 | Meadow |
| 3,873,268 A | 3/1975 | McKie, Jr. |
| 3,894,512 A | 7/1975 | Ohno |
| 3,997,396 A | 12/1976 | Delente |
| 4,007,010 A | 2/1977 | Woodbridge, III |
| 4,065,263 A | 12/1977 | Woodbridge, III |
| 4,110,165 A | 8/1978 | Cole et al. |
| 4,111,754 A | 9/1978 | Park |
| 4,273,877 A | 6/1981 | Anagnostopoulos |
| 4,415,732 A | 11/1983 | Caruthers et al. |
| 4,446,239 A | 5/1984 | Tsuji et al. |
| 4,458,066 A | 7/1984 | Caruthers et al. |
| 4,493,815 A | 1/1985 | Fernwood et al. |
| 4,500,707 A | 2/1985 | Caruthers et al. |
| 4,562,045 A | 12/1985 | Murata |
| 4,663,163 A | 5/1987 | Hou et al. |
| 4,682,890 A | 7/1987 | De et al. |
| 4,682,891 A | 7/1987 | De et al. |
| 4,701,304 A | 10/1987 | Horn et al. |
| 4,828,386 A | 5/1989 | Matkovich et al. |
| 4,834,946 A | 5/1989 | Levin |
| 4,861,448 A | 8/1989 | Cantor et al. |

(Continued)

FOREIGN PATENT DOCUMENTS

| | | |
|---|---|---|
| EP | 0506993 A1 | 10/1992 |
| EP | 0882593 A1 | 12/1998 |

(Continued)

OTHER PUBLICATIONS

A Laboratory Manual, "Mapping Genomes", Cold Spring Harbor Laboratory Press Table of Contents Only). vol. 4, 1999.
A Laboratory Manual, "Molecular Cloning", Cold Spring Harbor Laboratory Press, 2nd Edition, 1989, xi-xxxviii.
Adam Steel et al, The Flow-Thru Chip.TM.: A Three-Dimensional Biochip Platform, in "Microarray Biochip Technology" 87-117 (Mark Schena ed. 2000).
Arndt, et al., "A Rapid Genetic Screening System for Identifying Gene-Specific Suppression Constructs for use in Human Cells,", Nucleic Acids Research, vol. 28, No. 6., pp. e15-i-viii (2000).

(Continued)

*Primary Examiner* — Randy Boyer
(74) *Attorney, Agent, or Firm* — Jones Robb, PLLC

(57) ABSTRACT

A differentially coated device for conducting a plurality of nano-volume specified reactions, the device comprising a platen having at least one exterior surface modified to a specified physicochemical property, a plurality of nano-volume channels, each nanovolume channel having at least one interior surface in communication with the at least one exterior surface. Methods for preparing and using such devices are also provided, as well as a method of registering a location of a dispenser array in relation to a microfluidic array. Quantities related to a vector displacement from the alignment position to a fixed position on the one of the dispenser array and the microfluidic array is determined. The quantities thus determined are used to guide positioning of the dispenser array relative to the microfluidic array.

10 Claims, 27 Drawing Sheets

(56) References Cited

U.S. PATENT DOCUMENTS

| | | |
|---|---|---|
| 4,973,679 A | 11/1990 | Caruthers et al. |
| 4,990,459 A | 2/1991 | Maeda et al. |
| 5,000,921 A | 3/1991 | Hanaway et al. |
| 5,009,846 A | 4/1991 | Gavet et al. |
| 5,047,215 A | 9/1991 | Manns |
| 5,108,704 A | 4/1992 | Bowers et al. |
| 5,108,926 A | 4/1992 | Klebe |
| 5,152,060 A | 10/1992 | Schubert et al. |
| 5,153,319 A | 10/1992 | Caruthers et al. |
| 5,175,209 A | 12/1992 | Beattie et al. |
| 5,210,021 A | 5/1993 | Goodwin, Jr. |
| 5,215,593 A | 6/1993 | Nojo et al. |
| 5,234,666 A | 8/1993 | Suzuki |
| 5,242,974 A | 9/1993 | Holmes |
| 5,262,128 A | 11/1993 | Leighton et al. |
| 5,284,753 A | 2/1994 | Goodwin, Jr. |
| 5,290,705 A | 3/1994 | Davis |
| 5,322,019 A | 6/1994 | Hyland |
| 5,373,803 A | 12/1994 | Noguchi et al. |
| 5,374,525 A | 12/1994 | Lalouel et al. |
| 5,382,985 A | 1/1995 | Becker et al. |
| 5,427,908 A | 6/1995 | Dower et al. |
| 5,433,975 A | 7/1995 | Roberts et al. |
| 5,445,934 A | 8/1995 | Fodor et al. |
| 5,453,252 A | 9/1995 | Truett |
| 5,466,583 A | 11/1995 | Thomson et al. |
| 5,475,610 A | 12/1995 | Atwood et al. |
| 5,491,083 A | 2/1996 | Arentzen et al. |
| 5,506,141 A | 4/1996 | Weinreb et al. |
| 5,508,200 A | 4/1996 | Tiffany et al. |
| 5,510,270 A | 4/1996 | Fodor et al. |
| 5,519,218 A | 5/1996 | Chang |
| 5,560,811 A | 10/1996 | Briggs et al. |
| 5,576,220 A | 11/1996 | Hudson et al. |
| 5,580,717 A | 12/1996 | Dower et al. |
| 5,585,275 A | 12/1996 | Hudson et al. |
| 5,599,664 A | 2/1997 | Schwartz |
| 5,602,756 A | 2/1997 | Atwood et al. |
| 5,605,662 A | 2/1997 | Heller et al. |
| 5,621,094 A | 4/1997 | Roser et al. |
| 5,632,957 A | 5/1997 | Heller et al. |
| 5,710,381 A | 1/1998 | Atwood et al. |
| 5,722,370 A | 3/1998 | Koike et al. |
| 5,744,101 A | 4/1998 | Fodor et al. |
| 5,763,263 A | 6/1998 | Dehlinger |
| 5,770,440 A | 6/1998 | Berndt |
| 5,770,860 A | 6/1998 | Franzen |
| 5,773,238 A | 6/1998 | Shukla |
| 5,786,226 A | 7/1998 | Boecker et al. |
| 5,795,748 A | 8/1998 | Cottingham |
| 5,807,522 A | 9/1998 | Brown et al. |
| 5,840,862 A | 11/1998 | Bensimon et al. |
| 5,843,767 A | 12/1998 | Beattie |
| 5,849,598 A | 12/1998 | Wilson et al. |
| 5,853,894 A | 12/1998 | Brown |
| 5,856,100 A | 1/1999 | Hayashizaki |
| 5,888,723 A | 3/1999 | Sutton et al. |
| 5,906,683 A | 5/1999 | Chen et al. |
| 5,910,287 A | 6/1999 | Cassin et al. |
| 5,922,604 A | 7/1999 | Stapleton et al. |
| 5,929,208 A | 7/1999 | Heller et al. |
| 5,944,652 A | 8/1999 | Miller et al. |
| 5,955,377 A | 9/1999 | Maul et al. |
| 5,958,345 A | 9/1999 | Turner et al. |
| 5,985,214 A | 11/1999 | Stylli et al. |
| 6,004,744 A | 12/1999 | Goelet et al. |
| 6,015,880 A | 1/2000 | Baldeschwieler et al. |
| 6,024,925 A | 2/2000 | Little et al. |
| 6,027,873 A | 2/2000 | Schellenberger et al. |
| 6,060,240 A | 5/2000 | Kamb et al. |
| 6,071,702 A | 6/2000 | Yamamoto et al. |
| 6,071,748 A | 6/2000 | Modlin et al. |
| 6,083,682 A | 7/2000 | Campbell et al. |
| 6,083,763 A | 7/2000 | Balch |
| 6,103,479 A | 8/2000 | Taylor |
| 6,107,059 A | 8/2000 | Hart |
| 6,121,048 A | 9/2000 | Zaffaroni et al. |
| 6,136,592 A | 10/2000 | Leighton |
| 6,147,198 A | 11/2000 | Schwartz |
| 6,225,061 B1 | 5/2001 | Becker et al. |
| 6,235,473 B1 | 5/2001 | Friedman et al. |
| 6,284,377 B1 | 9/2001 | Veerasamy |
| 6,306,578 B1 | 10/2001 | Schellenberger et al. |
| 6,309,600 B1 | 10/2001 | Hunter |
| 6,309,828 B1 | 10/2001 | Schleifer et al. |
| 6,312,103 B1 | 11/2001 | Haluzak |
| 6,334,856 B1 | 1/2002 | Allen et al. |
| 6,353,774 B1 | 3/2002 | Goldenberg et al. |
| 6,387,331 B1 | 5/2002 | Hunter |
| 6,406,869 B1 | 6/2002 | Glickman et al. |
| 6,429,025 B1 | 8/2002 | Parce et al. |
| 6,436,632 B2 | 8/2002 | Schellenberger et al. |
| 6,514,750 B2 | 2/2003 | Bordenkircher et al. |
| 6,565,813 B1 | 5/2003 | Garyantes |
| 6,576,478 B1 | 6/2003 | Wagner et al. |
| 6,630,835 B2 | 10/2003 | Cheng et al. |
| 6,713,309 B1 | 3/2004 | Anderson et al. |
| 6,716,629 B2 | 4/2004 | Hess et al. |
| 6,729,352 B2 | 5/2004 | O'Connor et al. |
| 6,730,883 B2 | 5/2004 | Brown et al. |
| 6,743,633 B1 | 6/2004 | Hunter |
| 6,812,030 B2 | 11/2004 | Ozbal et al. |
| 6,844,161 B2 | 1/2005 | Siani et al. |
| 6,893,877 B2 | 5/2005 | Hunter et al. |
| 7,332,271 B2 | 2/2008 | O'Keefe et al. |
| 10,213,761 B2 * | 2/2019 | Brenan ............ B01L 3/50857 |
| 2001/0053334 A1 | 12/2001 | Chen et al. |
| 2001/0055765 A1 | 12/2001 | O'Keefe et al. |
| 2002/0001544 A1 | 1/2002 | Hess et al. |
| 2002/0001546 A1 | 1/2002 | Hunter et al. |
| 2002/0049196 A1 | 4/2002 | Carpino et al. |
| 2002/0151040 A1 | 10/2002 | O'Keefe et al. |
| 2002/0192716 A1 | 12/2002 | Schellenberger et al. |
| 2003/0080087 A1 * | 5/2003 | Stelzle ................. B01L 3/0241 216/27 |
| 2003/0124716 A1 | 7/2003 | Hess et al. |
| 2003/0170610 A1 | 9/2003 | Cima et al. |
| 2003/0219716 A1 | 11/2003 | Avdeef et al. |
| 2003/0224395 A1 | 12/2003 | Jovanovich et al. |
| 2004/0023223 A1 | 2/2004 | Thompson et al. |
| 2004/0132040 A1 | 7/2004 | Hamill |
| 2004/0171166 A1 | 9/2004 | Hunter et al. |
| 2004/0191924 A1 | 9/2004 | Hunter et al. |
| 2004/0241636 A1 | 12/2004 | Michnick et al. |
| 2005/0059074 A1 | 3/2005 | Schellenberger et al. |
| 2005/0079105 A1 | 4/2005 | Hunter et al. |
| 2005/0148066 A1 | 7/2005 | O'Keefe et al. |
| 2006/0057209 A1 | 3/2006 | Chapman et al. |
| 2006/0183171 A1 | 8/2006 | Schellenberger et al. |
| 2008/0108112 A1 | 5/2008 | O'Keefe et al. |

FOREIGN PATENT DOCUMENTS

| | | |
|---|---|---|
| JP | 2002357615 A | 12/2002 |
| JP | 2003061657 A | 3/2003 |
| JP | 2004097200 A | 4/2004 |
| JP | 2004109120 A | 4/2004 |
| WO | WO-9501559 A2 | 1/1995 |
| WO | WO-9511755 A1 | 5/1995 |
| WO | WO-9700941 A2 | 1/1997 |
| WO | WO-9700943 A1 | 1/1997 |
| WO | WO-9715394 A1 | 5/1997 |
| WO | WO-9736167 A1 | 10/1997 |
| WO | WO-9845406 A1 | 10/1998 |
| WO | WO-9847003 A1 | 10/1998 |
| WO | WO-9911373 A2 | 3/1999 |
| WO | WO-9919510 A1 | 4/1999 |
| WO | WO-9934920 A1 | 7/1999 |
| WO | WO-9939829 A1 | 8/1999 |
| WO | WO-9947922 A2 | 9/1999 |
| WO | WO-9952560 A1 | 10/1999 |
| WO | WO-9955461 A1 | 11/1999 |
| WO | WO-9961152 A1 | 12/1999 |
| WO | WO-0051735 A1 | 9/2000 |

(56) References Cited

FOREIGN PATENT DOCUMENTS

| | | |
|---|---|---|
| WO | WO-0056456 A1 | 9/2000 |
| WO | WO-0138583 A2 | 5/2001 |
| WO | WO-0161054 A2 | 8/2001 |
| WO | WO-0187335 A2 | 11/2001 |
| WO | WO-0230561 A2 | 4/2002 |
| WO | WO-02055199 A2 | 7/2002 |
| WO | WO-02087764 A1 | 11/2002 |
| WO | WO-02090984 A1 | 11/2002 |
| WO | WO-03002226 A1 | 1/2003 |
| WO | WO-03035239 A2 | 5/2003 |
| WO | WO-03057873 A1 | 7/2003 |
| WO | WO-2004074818 A2 | 9/2004 |

OTHER PUBLICATIONS

Bico, et al., "Rough Wettinq", Euroohvsics Letters, 55(2), 2001, 214-220.
Cadus, Cadus Pharmaceutical Corp. 1997 Annual Report, 1-29, May 8, 1998.
Colin J. Brenan, "A massively parallel microfluidics platform for storage & ultra high throughput screening", 4626 Proc. SPIE 560-69 (2002).
D.-S. Shin et al., Surface Modification Technology for Bio-Mems, 12th International Conference on Solid State Sensors, Actuators and Microsystems, Boston (Jun. 2003).
Erfle, H et al., "Simultaneous loading of 200 sample lanes for DNA sequencing on vertical and horizontal, standard and ultrathin gels", vol. 25, No. 11 pp. 2229-2230, Oxford University Press, 1997.
Gait, "Oligonucleotide Synthesis—A Practical Approach", IRL Press at Oxford University Press, vii-xiii (1984).
International Hapmap Consortium. A haplotype of the human genome. Nature. 2005; 437(7036): 1299-1320.
Jones, T.B., et al. "Dielectrophoretic Liquid Actuation and Nanodroplet Formation", Journal of Applied Physics, vol. 99, No. 2, Jan. 15, 2001, pp. 1441-1442.
Kanigan et al., "Living Chips for Drug Discovery", Mar. 2000, Proceedings of SPIE, vol. 3926, pp. 172-180.
Kim et al., "Nanostructured Surfaces for Dramatic Reduction of Flow Resistance in Droplet-based Microfluidics", IEEE Conference on MEMS (MEMS'2002), pp. 479-482, Las Vegas, NV, Jan. 2002.
Mac Beath, Gavin et al., "Printing Proteins as Microarrays for High-Throughput Function Determination", Science, vol. 289, 2000, 1760-1763.
Maniatis, et al., "Molecular cloning: a laboratory manual", Cold Spring Harbor Laboratory, 1982, v-x.
Moerman, R et al., "Miniaturized Electrospraying as a Technic for the Production of Microarrays of Reproducible Micrometer Sized Protein Spots, in Micro Total Analysis Systems 2000: Proceedings of the u TAS 2000 Symposium", 14-18 (May 2000).
Oligonucleotides and Analogue, "A Practical Approach", IRL Press, 1991, vii-xvii.
PCT/US2005/028048, "International Preliminary Report on Patentability" dated Feb. 6, 2007.
PCT/US2005/028048, "International Search Report dated Mar. 9, 2006", 9 pages.
Rolls, et al., "A Visual Screen of GFP-Fusion Library Identifies a New Type of Nuclear Envelope Membrane Protein,", J. Cell Biol., vol. 146, No. 1, pp. 29-43 (1999).
Sauter, A D. "Nanoliters onto media: Use of Electric Induction," American Laboratory 40-45 (Oct. 2001).
Singh-Gasson, et al., "Maskless fabrication of light-directed oligonucleotide microarrays usinq a diqital Micromirror array", Nature Biotechnoloav. vol. 17 1999, 974-978.
Smith, et al., "Dynamical Scaling of DNA Diffusion Coefficients", vol. 29, pp. 1372-1373, Macromolecules, 1996.
Sosnowski, "Manufacturing Methods for High Density Micro-Channel Arrays", (Masters Thesis) Massachusetts Institute of Technology Dep't of Mechanical Engineering, 2000.
The Living Chip-Automated Microarray Technology for Homogeneous and Inhomogeneous Bioassays, ATP 2000 Competition, http://www.nist.gov/public_affairs/atp2000/00004362.htm., Mar. 200, (2000).
Vogelstein, et al., "Digital PCR", Proc. Natl. Acad. Sci. USA, vol. 96, Aug. 1999,9236-9241.
Vykoukal, J. et al., "A Programmable Dielectrophoretic Fluid Processor for Droplet-Based Chemistry", Micro Total Analysis Systems 2001, 72-74.
Weast, PhD, Robert C., "CRC Handbook of Chemistry and Physics, Ed.", 65th Edition pp. F-20-F35, 1984-1985.
Wittwer, C. T. et al., "Continuous Fluorescence Monitoring of Rapid Cycle DNA Amplification", Biotechniques, Informa Life Sciences Publishing, Westborough, MA, vol. 22, No. 1, Jan. 1, 1997, 130/131, 134-138 pgs, XP001149075,ISSN: 0736-6205.
Wittwer, C.T. et al., "The LightCycler™: A Microvolume Multisample Fluorimeter with Rapid Temperature Control", BioTechniques, vol. 22 (1), Jan. 1997, 176-181.
Yvonne R. Thorstenson et al., "Global Analysis of ATM Polymorphism Reveals Significant Functional Constraint", 69 Am. J. Hum. Genet. 396-412 (2001).
Zhao, et al., "Directed Evolution Converts Subtilisin E into a Functional Equivalent of Thermitase,", Protein Eng., vol. 12, No. 1, pp. 47-53 (1999).

\* cited by examiner

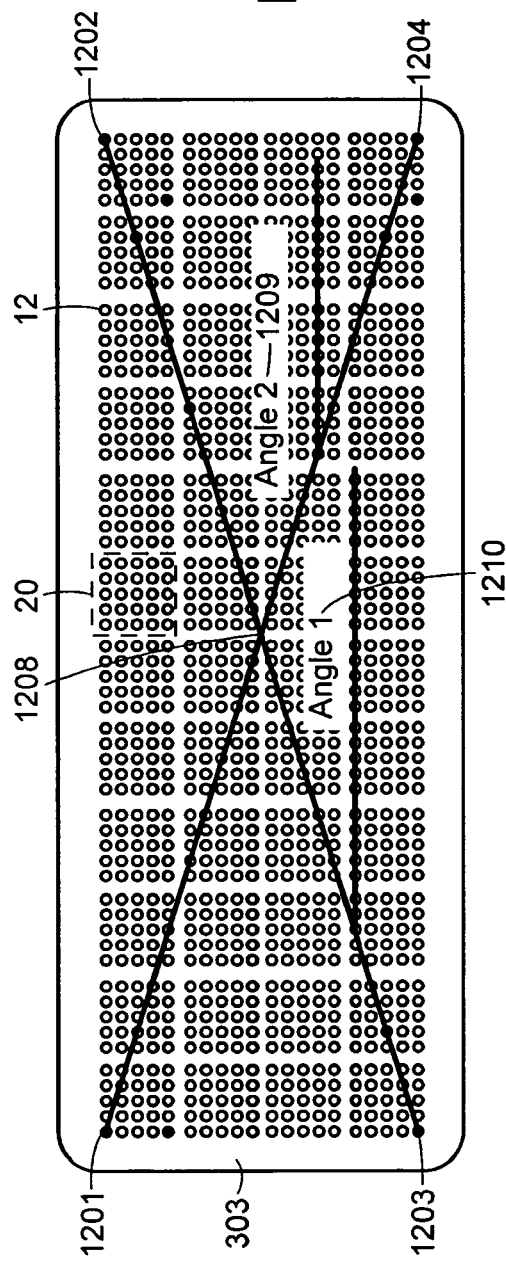
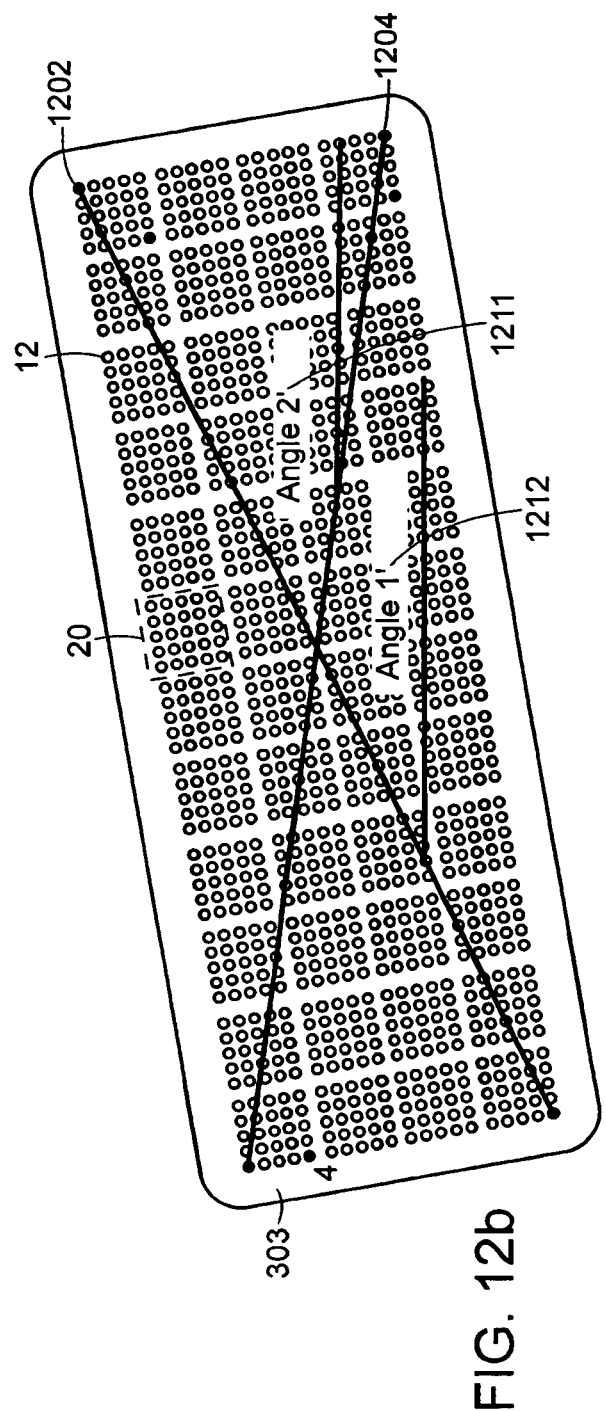
FIG. 12a
FIG. 12b

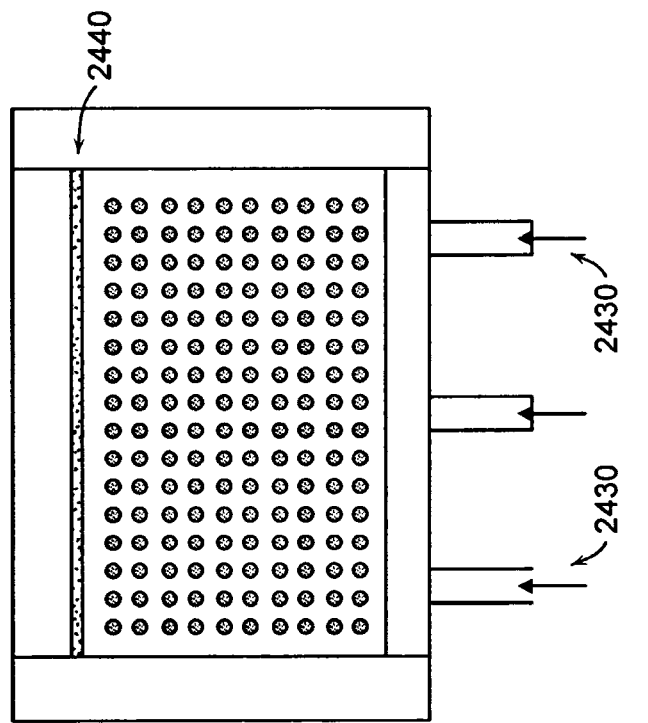
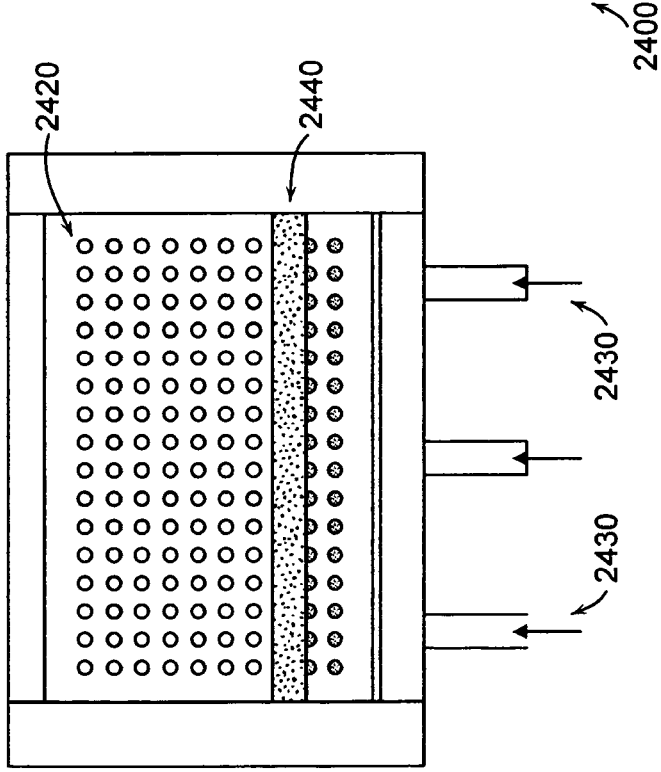
FIG. 24A

COATING PROCESS FOR MICROFLUIDIC SAMPLE ARRAYS

CROSS-REFERENCE TO RELATED APPLICATIONS

This application is a continuation of U.S. application Ser. No. 14/300,100 filed Jun. 9, 2014, which is a continuation of U.S. application Ser. No. 11/198,882, filed Aug. 4, 2005, and claims priority to U.S. application No. 60/608,231, filed Sep. 9, 2004, and claims priority to U.S. application No. 60/599,217, filed Aug. 4, 2004, which disclosures are herein incorporated by reference in their entirety.

TECHNICAL FIELD

The present invention relates to techniques for transferring small volumes of liquid, and more specifically to calibration of dispensers relative to nanoliter sample volumes in an array. The present invention also relates to processes and the devices for spatially selective chemical modification or coating of the surfaces of a substrate or through-hole array plate, such as may be used in microfluidic or nanofluidic storage and analysis systems or other applications.

BACKGROUND ART

Various systems are known for performing a large number of chemical and biological storage assays and synthesis operations. One approach uses an assay chip having an array of nanoliter volume sample sites, wherein the sample sites are through-hole wells with hydrophilic interiors and openings surrounded by hydrophobic material.

One specific commercial example of a nanoliter chip system is the Thru-Hole™ Array Technology made by Biotrove, Inc. of Woburn, Mass. Nanoliter chip technology relies on the ability to handle very small volumes of fluid samples, typically, less than 1000 nanoliters. The various considerations taken into account in handling such small liquid samples are known as microfluidics. A typical schematic of a microfluidic array is shown in FIG. 1.

In FIG. 1, the sample wells 12 may be grouped into sub-arrays such as by controlling the spacing between the wells. For example, FIG. 2 shows a chip 10 in which the sample wells 12 are grouped into a 4-by-12 array of 5-well by 5-well sub-arrays 20. In another embodiment, the sub-arrays 20 may be 8-wells by 8-wells or any other convenient number. The chip 10 in FIG. 2 is 1"×3" to correspond to a standard microscope slide. The sample wells 12 in a sub-array 20 may be laid out in a square or rectangular grid arrangement as shown in FIG. 2, or the rows and/or columns of sample wells may be offset as shown in FIG. 1. The inter- and intra-grid through-hole spacing is precise to within less than ⅕ of a hole diameter. For example, the through-holes in one embodiment of the BioTrove array are 320 micrometers in diameter with a center-to-center spacing of 500+−25 micrometers.

The sample chip 10 typically may be from 0.1 mm to more than 10 mm thick; for example, around 0.3 to 1.52 mm thick, and commonly 0.3 mm. Typical volumes of the through-hole sample wells 12 could be from 0.1 picoliter to 1 microliter, with common volumes in the range of 0.2-100 nanoliters, for example, about 30 nanoliters. This corresponds to a through-hole diameter of 350+−25 micrometers. Capillary action or surface tension of the liquid samples may be used to load the sample wells 12. For typical chip dimensions, capillary forces are strong enough to hold liquids in place. Chips loaded with sample solutions can be waved around in the air, and even centrifuged at moderate speeds without displacing samples.

To enhance the drawing power of the sample wells 12, the target area of the receptacle, interior walls 42, may have a hydrophilic surface that attracts a sample fluid. It is often desirable that the surfaces be bio-compatible and not irreversibly bind biomolecules such as proteins and nucleic acids, although binding may be useful for some processes such as purification and/or archiving of samples. Alternatively, the sample wells 12 may contain a porous hydrophilic material that attracts a sample fluid. To prevent cross-contamination (crosstalk), the exterior planar surfaces 14 of chip 10 and a layer of material 40 around the openings of sample wells 12 may be of a hydrophobic material such as a monolayer of octadecyltrichlorosilane (OTS). Thus, each sample well 12 has an interior hydrophilic region bounded at either end by a hydrophobic region.

The through-hole design of the sample wells 12 avoids problems of trapped air inherent in other microplate structures. This approach together with hydrophobic and hydrophilic patterning enable self-metered loading of the sample wells 12. The self-loading functionality helps in the manufacture of arrays with pre-loaded reagents, and also in that the arrays will fill themselves when contacted with an aqueous sample material.

It has been suggested that such nanoliter chips can be utilized for massively parallel assays such as Polymerase Chain Reaction (PCR) and Enzyme-Linked Immunosorbent Assay (ELISA) analysis. However, nanoliter chips require complex time-consuming preparation and processing. Before the samples are introduced, each sample well must be pre-formatted with the necessary probes, reagents, and other components in a process referred to as formatting. Once the chip is formatted, the analyte or specimen is introduced into each well, (sample loading), referring generically to both specimens loading and reagents loading. Transferring large collections of fluid samples such as libraries of small molecule drug candidates, cells, probe molecules (e.g., oligomers), and/or tissue samples stored in older style 96- or 384-well plates into more efficient high density arrays of nanoliter receptacles can be difficult. As a practical matter, there tend to be two approaches to formatting and loading of nanoliter sample chips—bulk transfer and discrete transfer.

An example of bulk transfer is dipping a sample chip into a reservoir of sample liquid. The sample liquid wicks into the sample wells by capillary action and all of the wells fill uniformly with the sample.

One method for discrete transfer uses a transfer pin loaded with the transfer liquid. For example, pins or arrays of pins are typically used to spot DNA samples onto glass slides for hybridization analysis. Pins have also been used to transfer liquids such as drug candidates between microplates or onto gels (one such gel system is being developed by a company in California). Many pin types are commercially available, of various geometries and delivery volumes. Some are slotted, grooved, cross-hatched, or other novel-geometry pins. The Stealth Pin by ArrayIt is capable of delivering hundreds of spots in succession from one sample uptake, with delivery volumes of 0.5 nL to 2.5 nL. Majer Precision Engineering sells pins having tapered tips and slots such as the MicroQuil 2000. Example techniques for using one or more pins to transfer sample liquid are described in U.S. Patent Publication Number 2003/7748 A1, filed Aug. 23, 2002, and incorporated herein by reference.

Due to the small dimensions involved, registration of the pin array to the through-hole wells of the microfluidic array is non-trivial. Any misalignment of the pins to the through-holes on the chip will result in a failure to properly load the microfluidic array with sample.

SUMMARY OF THE INVENTION

In accordance with one aspect of the invention, a method of registering a location of a dispenser array in relation to a microfluidic array is provided. A first one of the dispenser array and the microfluidic array is movable in relation to the frame, and the other of the first one of the dispenser array and the microfluidic array is fixed relative to the frame. The relative position of the dispenser array is identified by a set of coordinates. A first camera is in rigid association with one of the dispenser array and the microfluidic array. The method includes identifying a fiducial reference in rigid association with the other one of the dispenser array and the frame, in a manner permitting the fiducial reference to appear in a first position of a field of view of the first camera when the dispenser array is in an alignment position, associated with a first coordinate set, relative to the frame. Quantities related to a vector displacement from the alignment position to a fixed position on the microfluidic array are determined. The quantities thus determined are used to guide positioning of the dispenser array relative to the microfluidic array.

In accordance with related embodiments of the invention, the first one of the dispenser array and the microfluidic array may be configured to move independently in each of three approximately mutually orthogonal directions. A skew from orthogonality of the directions may be determined. Determining skew may include positioning a plate in a field of view of the first camera, the plate having three reticules defining three corners of a triangle. The first one of the dispenser array and the microfluidic array may be moved relative to the frame so that a fiducial reference appears in a plurality of distinct additional positions in the field of view of the first camera, each position associated with a distinct coordinate set. An orientation of the first camera relative to the directions may be determined based on the plurality of distinct positions.

In accordance with further related embodiments of the invention, a second camera may be mounted in rigid association with the other one of the dispenser array and the microfluidic array. A second fiducial reference capable of being viewed by both the first camera and the second camera may be identified. The second fiducial reference may be viewed with both the first camera and the second camera to determine quantities of a vector displacement from a position within the field of view of the first camera to a position within the field of view of the second camera.

In accordance with still further related embodiments, the first one of the dispenser array and the microfluidic array may be moved relative to the frame so that a second fiducial reference on the one of the dispenser array and the microfluidic array appears in a plurality of distinct positions in the field of view of the second camera, each position associated with a distinct coordinate set. The orientation of the second camera relative to the directions may be determined based on the plurality of distinct positions.

In accordance with yet another related embodiment of the invention, the first camera is in rigid association with the first one of the dispenser array and the microfluidic array, the first camera being rigidly displaced from a fixed position on the first one of the dispenser array and the microfluidic array by a displacement vector. The method further includes moving the first one of the dispenser array and the microfluidic array relative to the frame so that the fixed position on the first one of the dispenser array and the microfluidic array is within the field of view of the one of the second camera in rigid association with the frame. Quantities of the displacement vector are determined.

In accordance with other embodiments of the invention, a World Coordinate System having a center of origin is identified. A First Camera Coordinate System having a first camera center of origin within a field of view of the first camera is identified. A Second Camera Coordinate System having a second camera center of origin within a field of view of the second camera is identified. A transformation for transforming a coordinate in the First Camera Coordinate System to the World Coordinate System is determined. A second transformation for transforming a coordinate in the Second Camera Coordinate System to the World Coordinate System is determined.

In accordance with still further related embodiments, at least one of the dispenser array and the microfluidic array is rotatable around a center of rotation. A position of the center of rotation is determined. Determining the coordinates of the center of rotation may include applying a best fit circle algorithm or another geometric algorithm.

In accordance with another aspect of the invention, a method of registering a dispenser array to a microfluidic array rigidly coupled to a frame is presented. The dispenser array is movable in relation to the frame. A first camera is in rigid association with the dispenser array, and a second camera is in rigid association with the frame. A set of coordinates identifies the relative position of the dispenser array. The method includes determining a first position of a first fixed point on the microfluidic array relative to a fiducial reference by viewing the microfluidic array with the first camera. A second position of a second fixed point on the dispenser array relative to the fiducial reference is determined by viewing the dispenser array with the second camera. Quantities of a vector displacement from the first position to the second position are determined. The quantities thus determined are used to guide positioning of the dispenser array relative to the microfluidic array.

In accordance with related embodiments of the invention, a World Coordinate System having a center of origin is defined. A First Camera Coordinate System having a center of origin within a field of view of the first camera is defined. A transformation for transforming a coordinate in the First Camera Coordinate System to the World Coordinate System is determined. The World Coordinate System may include a first axis and a second axis orthogonal to the first axis, wherein the dispenser array is capable of moving along a first motion axis and a second motion axis. The first motion axis is parallel to the first axis, while the second motion axis defines an angle $\beta$ with the second axis. The angle $\beta$ is determined. Calculating the angle $\beta$ may include positioning a plate in a field of view of the first camera, the plate having three reticules defining three corners of a triangle and/or rectangle. The first camera coordinate system may include a camera first axis and a camera second axis orthogonal to the camera first axis, the camera second axis defining an angle $\theta_C$ with the second motion axis of the first camera, the method further comprising calculating the angle $\theta_C$. Calculating the angle $\theta_C$ may include viewing a fiducial reticle in the field of view of the first camera; moving the first camera along only the x motion axis; and moving the first camera along only the y motion axis.

In accordance with further related embodiments of the invention, a second camera is in rigid association with the frame. The method further includes defining a Second Camera Coordinate System having a second camera center of origin within a field of view of the second camera. A second transformation for transforming a coordinate in the Second Camera Coordinate System to the World Coordinate System is determined.

Determining the second transformation may include positioning the dispenser array in the field of view of the second camera, and moving the dispenser array along the x-motion axis. Determining the second transformation may include determining the second camera center of origin in the World Coordinate System. Determining the second camera center of origin in the World Coordinate System may include placing a fiducial in a field of view of the second camera. The fiducial is moved such that the fiducial is in the field of view of the first camera. The coordinates of the fiducial in the First Camera Coordinate System are determined. The coordinates of the fiducial in the First Camera Coordinate System are transformed to the World Coordinate System. The second camera may then be used to determine the coordinates of the dispenser array in the World Coordinate System.

In accordance with yet other embodiments of the invention, the dispenser array is rotatable around a center of rotation in rigid association with the first camera. The method further includes determining the coordinates of the center of rotation in the World Coordinate System. The coordinates of the center of rotation in the World Coordinate System may be determined by rotating the dispenser array and the microfluidic array in a field of view of the second camera and using a best fit circle algorithm or another geometric algorithm. A vector between the first camera and the center of rotation may be determined, the vector having coordinates in the World Coordinate System. The dispenser array may include a center and define a reference axis. The reference axis defines an angle $\theta_{RA}$ with an axis of the World Coordinate System. The coordinates of the center and the angle $\theta_{RA}$ are determined.

More specifically, $\theta_{RA}$ may be determined by looking at each dispenser of the dispenser array using the second camera. The dispensers may approximately form a grid, thus a grid fit algorithm may be used. The grid fit algorithm may return the center of the grid as well as the angle of the grid. The center of the grid may not be the center of rotation. Various algorithms may be in defining the grid fit. One algorithm that may be used minimizes the average amount of error between the real grid and the fitted grid. Another algorithm may minimize the worst case error of any pin on the real grid to the fitted grid.

In accordance with still further embodiments of the invention, the coordinates of the microfluidic array in the World Coordinate System are determined. Determining the coordinates of the microfluidic array in the World Coordinate System may include moving the first camera so as to place the some or all of the microfluidic array field in the field of view of the first camera. For example, the four corners sample wells of the microfluidic array/chip may be viewed to determine where the rectangle of the chip is defined and the rotation of the chip. In various embodiments, the entire microfluidic array/chip may be placed in the field of view of the camera.

In accordance with another aspect of the invention, a system for registering a location of a dispenser array in relation to a microfluidic array includes a first camera in rigid association with one of the microfluidic array and the dispenser array. A frame is rigidly coupled to the other one of the microfluidic array and the dispenser array, the one of the microfluidic array and the dispenser movable in relation to the frame.

In accordance with related embodiments of the invention, a second camera is in rigid association with the frame, the second camera capable of viewing the first camera and the one of the microfluidic array and the dispenser array. A controller may control relative motion between the microfluidic array and the dispenser array. The controller may include at least one encoder and/or an interface to the first camera for transferring data signals. A rotary stage may rotate one of the microfluidic array and the dispenser array. A gantry may be used to control motion of the dispenser array relative to the microfluidic array, for example, in three approximately mutually orthogonal directions.

In accordance with another embodiment of the invention, a method of aligning a first array to a second array is provided. Each element within the first array has an expected position relative to other elements in the first array. The expected positions of each element in the first array form a template, wherein one or more elements of the first array deviate from their expected position. The method includes aligning the template with the first array. The template is used to approximate locations of each element in the first array. Elements of the first array are aligned with elements the second array as a function of the approximate locations.

In related embodiment of the invention, aligning the template with the first array includes aligning at least one position on the template with at least one position on the first array. A camera may be used to determine the location of the at least one position on the first array. Using the camera may include viewing segments of the first array to determine the location. Alternatively, the entire first array may be viewed simultaneously.

In further related embodiments, one of the first array and the second array may include receptacles, and the other of the first array and the second array includes pins. The pins may have a pin diameter, and each receptacle may define an opening having a diameter that is larger than the pin diameter by a predefined value. Thus, when the elements of the first array are aligned with the second array as a function of the approximate locations, a pin that deviates from their expected position by less than the predefined value is still aligned over their corresponding receptacle. The pins may be cone shaped. Each of the pins may be capable of limited movement. The receptacles may have walls defining a beveled opening. The receptacles may be through-holes, the method further including viewing the pins through the through-holes using a camera.

In yet other related embodiments of the invention, each element within the second array has an expected position relative to other elements in the second array, the expected positions of each element in the second array forming a second template, wherein one or more elements of the second array deviate from their expected position. The method further includes aligning the second template with the second array. The template is used to approximate locations of each element in the second array. Elements of the first array are aligned with the second array as a function of the approximate locations of each element in the second array. The first template may be substantially equivalent to the second template.

In another embodiment of the invention, a method of dispensing a microfluidic sample is provided. The method includes providing an array of dispensers for dispensing the microfluidic sample, and an array of receptacles, each receptacle capable of receiving microfluidic sample from one of the dispensers. At least one of the array of dispensers and the array of receptacles is scanned with a camera for a fiducial reference. The array of dispensers is aligned with the array of receptacles as a function of the fiducial reference such that transfer of sample from the array of dispensers to the array of receptacles is enabled.

In related embodiments of the invention, each dispenser and/or receptacle has an expected position relative to other dispensers in the dispenser and/or receptacle array. The expected positions of each dispenser and/or receptacle in the dispenser and/or receptacle array forming a template, wherein one or more of the dispensers and/or receptacles deviate from their expected position. The method further includes aligning the template with the dispenser and/or receptacle array based on the fiducial position. The template is used to approximate locations of each element in the dispenser and/or receptacle array. The elements of the dispenser array are aligned with the receptacle array as a function of the approximate locations.

In further related embodiments of the invention, scanning includes using the camera to view segments of at least one at least one of the array of dispensers and the array of receptacles to determine the fiducial position. Alternatively, the camera may simultaneously view the entire at least one of the array of dispensers and the array of receptacles to determine the fiducial position.

In still further related embodiments of the invention, the array of dispensers may be an array of transfer pins for transferring a plurality of samples to a corresponding plurality of the receptacles. The pins may be cone shaped. Each of the pins may be individually capable of limited movement. The receptacles may have walls defining a beveled opening. The array of receptacles may be a platen array of through-hole wells. The dispensers may be viewed through the through-hole wells using the camera. The array of receptacles may be a platen array of closed-ended wells. At least one of the receptacles may include hydrophilic walls that attract the sample. At least one of the receptacles may include an opening surrounded by hydrophobic material.

In accordance with another embodiment of the invention, a system for dispensing sample fluid includes one or more dispensers forming a dispenser array. At least one receptacle array includes one or more receptacles; each receptacle capable of receiving sample fluid from one of the dispensers. An alignment means aligns the dispenser array and the at least one receptacle array.

In accordance with related embodiments of the invention, the alignment means includes a rotational stage for rotating at least one of the dispenser array and the at least one receptacle array. The alignment means may include a vision means for viewing one at least one of the dispenser array and the at least one receptacle array. The vision means includes one or more sensors for detecting position of at least one of the dispenser array and the receptacle array, which may be one of a optic sensor and an acoustic sensor. The vision means may be a camera. One of the dispenser array and the receptacle array may include a fiducial reference, the vision means capable of viewing the fiducial reference to align the dispenser array and the at least one receptacle array.

In accordance with further related embodiments of the invention, the at least one receptacle array may be one of a platen and a biochip. The receptacle array may be a microfluidic array. The receptacles may include closed and/or through-hole wells. The at least one receptacle array may include a plurality of receptacle arrays positioned in a tray. The dispenser array may be an array of transfer pins for transferring a plurality of samples to a corresponding plurality of the receptacles. The pins may be cone shaped and/or individually capable of limited movement. The receptacles may have walls defining a beveled opening. The at least one of the receptacles may include hydrophilic walls that attract the sample. The at least one of the receptacles may include an opening surrounded by hydrophobic material.

In accordance with still further embodiments of the invention, each element within the dispenser array may have an expected position relative to other elements in the dispenser array, the expected positions of each element in the dispenser array forming a template, wherein one or more elements of the first array deviate from their expected position. The alignment means may include template means for aligning the template with the dispenser array; approximating locations of each element in the dispenser array using the template; and aligning elements of the first array with the second array as a function of the approximate locations.

Other various embodiments relate to differentially coated plates, methods for preparing said plates, and methods for using the differentially coated plates for conducting a plurality of specified reactions. Thus, for example, some embodiments provide a process for differentially treating surfaces of a substrate, such as channel substrate or a through-hole array plate, wherein the different surfaces are subjected to a series of processes and reactions which result in differential surface coatings for the etched or through-hole surface and the surface of the substrate or plate. A differential coating is a coating or process whereby the coating physicochemical properties vary in a controlled manner, and in a controlled pattern. These coating properties can be surface tension, reactivity, biocompatibility, and numerous other properties. This is different from the hydrophobic/hydrophilic patterning of a planar surface, as in the case of a MALDI target plate where small hydrophilic spots are surrounded by large hydrophobic areas to concentrate the sample onto the hydrophilic spot during drydown. In the case of the OpenArray™ plate, the inside of the through-holes is preferably hydrophilic and biocompatible, whereas the outside surface of the plate is preferably hydrophobic and non-protein binding, although it is envisioned that properties for the inside surface relative to the outside surface may change, as needed. When an OpenArray™ chip is differentially coated such that the through-holes are hydrophilic and the exterior of the chip is hydrophobic, a chip may be dipped into a high surface tension fluid such as water, and when removed, the individual through-holes are filled with fluid and the exterior of the chip is dry.

The following provides generalized methods and devices for spatially controlling the surface modifications of an etched surface and is a focus of this invention. One important aspect of the invention is the ability to force load liquids into the OpenArray™ for exchanging fluids that enable the differential coating process. During the manufacture of the OpenArray™ chips, they become uniformly hydrophobic. When loading is attempted to perform chemistry in the through-holes to affect differential coating, a high surface tension fluid will not load the through-holes, and a low surface tension fluid will wet the entire chip. It becomes difficult to perform differential coating a simple way. Therefore, the novel technique of forced loading was invented. The uniformly hydrophobic chip is submerged in a low surface tension co-solvent, such as ethanol. Then the chip is submerged in a high surface tension fluid that contains reagents for the differential chemistry. The high surface tension fluid exchanges and replaces the low surface tension fluid in the wells. When the chip is removed from the high tension fluid, the high surface tension fluid sheets off the exterior coating of the chip, but remains in the through-holes. If the differential coating takes time to complete, and evaporation of the high surface tension fluid from the through-holes is problematic, the chip can then be submerged in an immiscible fluid such as silicone oil or a perfluorinated hydrocarbon. This keeps the high surface tension fluid in the wells while the chemistry or deposition occurs, without evaporation or leakage of the high surface tension fluid onto the exterior of the chip.

This process can be generalized beyond hydrophilic interior and hydrophobic exterior coatings to, for example, reverse surface tensions of the liquids relative to the platen substrate to make the interior surface hydrophobic and the exterior surface hydrophilic. This would be useful in loading polar solvents, such as benzene, into the OpenArray channels for non-biological chemistry applications.

Methods exist for the aqueous treatment or aqueous surface chemistry modification of substrates containing hydrophobic pores. For example, U.S. Pat. No. 5,209,850, assigned to Gore, teaches the use of low surface tension co-solvents such as methanol or surfactants to allow wetting of the substrate and subsequent surface modification. However, these methods uniformly treat the entire substrate and do not provide differential coatings.

We have developed a number of techniques and embodiments that allow differential coating of the OpenArray™ chip, and could also be applied to other substrates with hydrophobic pores. There are several generalized approaches for achieving a differentially coated etched substrate:

Deposition of one material (e.g. hydrophobic coating) on exterior while blowing a non-reactive gas ($N_2$) through the through-holes to block its deposition on the interior surfaces of channel. Second material is loaded, if needed, as a liquid into the channels to react and chemically or physically modify and coat the interior surface. The second material does not wet nor react with the first material to change its physicochemical properties.

Deposition of one material (e.g. hydrophobic coating) on exterior while physically blocking through-holes with a liquid or solid. Unblocking holes without affecting hydrophobic coating and then, if needed, coating channel interiors with a different material (e.g. hydrophilic).

Uniform deposition of one material (e.g. hydrophobic coating) on through-hole array. Subsequent stripping of coating from inside through-holes by the use of a mask and high energy UV light to expose substrate. Second material deposited with process gas or liquid on interior of through-holes. UV light may/may not be used to initiate chemical reaction for deposition/chemical modification of interior surfaces.

Uniform deposition of one material (e.g. hydrophobic coating) on through-hole array. Subsequent stripping of coating from the through-holes by forced loading of an etching solution that physiochemically removes the first material from the interior surfaces of the channels. Second material for coating/modifying interior surfaces is applied by liquid or gas deposition.

Individually addressing the through-holes of a uniformly treated chip (e.g. hydrophobically) with a dispenser, such as a pin, a syringe tip, a piezo dispenser, etc. to deposit an etchant or other liquid that reacts with the first material to product a surface with the desired properties (e.g. hydrophilic). This could be a multi-step process involving first applying an etchant to remove the hydrophobic coating, a cleaning agent to clean and activate the surface and the hydrophilic coating.

Using optical masks and UV-catalyzed chemistry to cure different coatings on the interior surfaces on the through-holes and the chip exterior. The patterned substrate may be a stainless steel plate having etched grooves or patterns, or a stainless steel plate having through-holes such as a microfluidic sample array (a chip). In other embodiments, the patterned substrate may be of silicon or glass. Various methods of differentially treating the patterned substrate or through-hole array plate may include a series of treatments and reactions. The series of treatments in various embodiments in accordance with the presently claimed invention may involve inspection; labeling for tracking during processing; cleaning; uniform coating of the planar non-etched or non-holed substrate surface with a first reagent; treating the etched surface or through-hole surface with a reagent that activates the etched surface or through-hole surface for later treatment by producing reactive groups on the etched or through-hole surfaces; treating the etched or through-hole surfaces with a reagent different from that used to treat the planar non-etched or non-holed surface of the substrate; additional treatment of the etched or through-hole surface to prevent reaction with reagents which may be used in later treatments; coating the planar non-etched or non-holed surface of the substrate with a second reagent that either adsorbs or chemically reacts with the first reagent on the non-etched or non-holed surface; and quality control tests.

A particular embodiment may first uniformly coat all surfaces of the substrate by treating with vinyl-terminated silane, for example, then selectively-oxidize the etched or through-hole surfaces by force loading with ethanol a permanganate solution, for example, of 5 mM $KMnO_4$ and 19.5 mM $NaTO_4$ in deionized water followed by incubation in a nonreactive oil or liquid such as a perfluorinated alkane solution for 2 hours, then PEGylation (covering with polyethylene glycol or molecules bearing PEG moieties) of the selectively oxidized etched or through-hole surface is done followed by re-loading of the etched or through-holed surface with additional PEG, with a final coating of the non-etched or non-holed surface accomplished by treatment with perfluorosilane using vapor-phase deposition.

Alternatively, the initial coating of all surfaces of the substrate may be done using liquid phase vinyl deposition with 7-octenyltrichlorosilane or 10-undecenyltrichlorosilane, for example. The PEGylation may alternatively be performed using various PEG-silane derivatives, such as methoxy-PEG silane MW 2000, methoxy-PEG silane MW 500, and methoxy-PEG silane MW 10,000. Also, triethoxysilylbuteraldehyde may be used as an alternative first coating of the non-etched or non-holed planar surface of the substrate. This allows PEGylation of the etched or through-hole surface without selective oxidation. Other PEGylation methods include the use of longer PEG molecules, such as methoxy-PEG-amine MW 5000 in place of silane-PEG coatings of lower molecular weights. In addition, the PEG within the PEGylated etched or through-hole surfaces may be cross-linked using hyperbranched PEG and PEI molecules and appropriate cross-linker molecules.

In such embodiments, the etched or through-hole surface is treated with a reagent to expose functional group A, followed by exposure to a solution containing a PEG having a terminal functional group B that is reactive with functional group A. The OpenArray could be coated with different materials catalyzed by absorption of radiant energy (UV, X-ray, electron beam) at different locations in the array by one or more of the previously described embodiments and then by use of one or more masks, different materials could be formed in different regions of the OpenArray by exposure to radiation for specified durations, intensities and energies (e.g. UV, X-ray, electron beam). Instead of masks, the radiation could be focused and directed to specified locations by a number of focusing means including lenses. The focused beam (photons or electrons) is moved relative to the platen to trace a prescribed pattern of surface modifications. The optical based method can be combined with one or more of the previous embodiments for applying a differential coating to an OpenArray.

Other embodiments provide a method for differentially coating a substrate having at least one exterior surface and a plurality of channels for liquid disposed therein, each channel having at least one interior surface in communication with at least one exterior surface, the method comprising applying a first coating agent to the substrate to create a coated substrate and selectively modifying at least one exterior surface or at least one interior surface of the coated substrate with a first modifying agent to create at least one modified surface having a first specified physicochemical property and a non-modified surface such that the modified surface differs from the non-modified surface with respect to the first specified physicochemical property. In some embodiments, a second modifying agent is applied to the first modified surface such that the second modifying agent imparts a second specified physicochemical property to the modified surface. In related embodiments, the first modifying agent may be applied in a mixture of two or more modifying agents having distinct specified physicochemical properties, to create at least one modified surface having a mixture of distinct specified physicochemical properties.

According to this method, the modified surface may be a modified gradient surface having a gradient mixture of the distinct specified physicochemical properties, or the modified surface may be a modified mixed-layer surface having a heterogeneous mixture of distinct specified physicochemical properties. Alternatively a third or more modifying agent may be applied to the modified agent to impart a third or more specified physicochemical property to the modified surface. Other related embodiments provide a variation of the described method wherein the at least one modified surface has one or more of the first, second and third specified physicochemical properties or it may have a combination of the specified physicochemical properties.

Related embodiments provide methods where the modifying agent is applied uniformly to create at least one uniformly modified surface, or applied non-uniformly such that the non-uniformly modified surface is non-uniform with respect to a property selected from the group consisting of concentration of modification, thickness of modification, continuity of modification, presence of the specified physicochemical property, and nature of the specified physicochemical property.

Another embodiment in accordance with the present invention provides a method as described above, wherein selectively modifying further comprises selectively activating at least one interior surface or at least one exterior surface with an activating agent prior to selectively modifying said surface so as to create at least one activated surface and modifying the at least one activated surface by reacting the surface with the modifying agent to create at least one modified surface with the first specified physicochemical property. In some embodiments, the exterior or the interior surface is modified. In related embodiments, the method further comprises causing a blocking agent to adhere to at least one interior surface or at least one exterior surface prior to selectively applying the first coating agent so as to create at least one blocked surface, and removing the blocking agent from the blocked surface after applying the first coating agent. The blocked surface may either be at least one exterior surface, or at least on interior surface.

In other more particular embodiments there is provided a method as described above, wherein the method further comprises causing a blocking agent to adhere to at least one modified surface to create at least one blocked modified surface, applying a second coating agent to the substrate and removing the blocking agent from the blocked modified surface. As in other embodiments, the modified surface may be an exterior surface or an internal surface and the channels may be through-holes, passages or troughs.

In other particular embodiments the physical interactions between the blocking agent and the surface are selected from one or more of the group consisting of Van der Waal's forces, hydrogen bonding interactions, hydrophilic interactions, hydrophobic interactions, dipole-dipole interactions, ionic interactions, surface tension interactions, and polar interactions. Alternatively, the coating agent or agents, blocking agents, and/or first and later modifying agents adhere to the exterior or interior surface by chemical bonding such as covalent bonding, coordinate covalent bonding, or ionic bonding.

Still other embodiments provide a method for differentially coating a surface wherein the first, second and other modifying agents are selected from the group consisting of a polymer, a monomer, a cross-linking agent, a photo-cleavable agent, a silane, a lipid, a fatty acid, an amino acid, a peptide, a protein, an antibody, an enzyme, a surfactant, a micelle, a liposome, a nucleotide, an oligonucleotide, a nucleic acid, a salt, a wax, a low-melting solid, and an oil. In this and other related embodiments, the first and second coating agents may also be selected from the group consisting of a polymer, a monomer, a cross-linking agent, a photo-cleavable agent, a silane, a lipid, a fatty acid, an amino acid, a peptide, a protein, an antibody, an enzyme, a surfactant, a micelle, a liposome, a nucleotide, an oligonucleotide, a nucleic acid, a salt, a wax, a low-melting solid, and an oil. And according to the desired type of differentially coated device desired, the blocking agent may be selected form the group consisting of a polymer, a monomer, a cross-linking agent, a photo-cleavable agent, a silane, a lipid, a fatty acid, an amino acid, a peptide, a protein, an antibody, an enzyme, a surfactant, a micelle, a liposome, a nucleotide, an oligonucleotide, a nucleic acid, a salt, a wax, a low-melting solid, and an oil.

In some particular embodiments, selectively modifying a surface may further comprise applying a solvent having a lower surface energy than that of the modifying agent to the at least one exterior surface or the at least one interior surface prior to applying the modifying agent, or selectively modifying may further comprise subjecting the substrate to a pressure differential prior to applying the modifying agent or by subjecting the substrate to a liquid stream of modifying agent such that momentum from the liquid stream applies the modifying agent to the at least one interior surface.

In a related particular embodiment there is provided a method for differentially coating a device wherein selectively modifying further comprises applying the modifying agent by exposing at least one exterior surface to a reactive vapor while subjecting at least one interior surface to a laminar flow stream of non-reactive gas such that the gas stream prevents the reactive vapor molecules from interacting with that interior surface.

Some embodiments provide that the activator, if used, as an oxidizing agent, a cross-linking agent, or an energy source, and may be a solid of a liquid such that the blocking agent makes at least one blocked surface any one or more of impermeable to electrons; impermeable to ionizing radiation; or unavailable for or resistant to further chemical reaction, light-activated reaction, or chemical modification. Moreover, in particular embodiments the blocking agent is selected from the group consisting of a polymer, a monomer, a cross-linking agent, a photo-cleavable agent, a silane, a lipid, a fatty acid, an amino acid, a peptide, a protein, an antibody, an enzyme, a surfactant, a micelle, a liposome, a nucleotide, an oligonucleotide, a nucleic acid, a salt, a wax, a low-melting solid, and an oil.

In a more particular embodiment there is provided a method for differentially coating a substrate having at least one exterior surface and a plurality of channels for liquid disposed therein, each channel having at least one interior surface in communication with at least one exterior surface, the method comprising applying a first coating agent to the substrate to create a coated substrate, blocking at least one exterior surface or at least one interior surface of the coated substrate to create at least one blocked surface and at least one non-blocked surface, selectively modifying the non-blocked surface with a modifying agent to create at least one modified surface and at least one non-modified surface such that the modified surface differs from the non-modified surface with respect to a specified physicochemical property, and unblocking the at least one blocked surface. The blocked surface may be an exterior surface or an interior surface, and selectively modifying comprises exposing the at least one non-blocked surface to UV radiation, ionizing radiation, an ion-beam, an electron beam, microwave radiation, visible light, a coherent light source, or a laser such that the specified physicochemical property is achieved. In alternative embodiments, selectively modifying comprises treating the at least one non-blocked surface with an etching material that removes the coating material from the non-blocked surface.

Related embodiments provide methods for differentially coating a substrate, wherein applying the first coating agent comprises uniformly or non-uniformly applying the coating agent, such that the first coating agent is one or more of a hydrophobic agent, a hydrophilic agent or a multifunctional agent and the specified physicochemical property of the at least one modified surface is a hydrophobic property or a hydrophilic property. In other related embodiments, applying the second coating agent comprises uniformly or non-uniformly applying the coating agent and the second coating agent may be one or more of a hydrophobic agent, a hydrophilic agent or a multifunctional agent wherein the specified physicochemical property of the at least one modified surface is a hydrophobic property or a hydrophilic property.

Another particular embodiment provides a differentially coated device for conducting a plurality of nano-volume specified reactions, the device comprising a platen having at least one exterior surface modified to a specified physicochemical property, a plurality of nano-volume channels, each nano-volume channel having at least one interior surface in communication with the at least one exterior surface, wherein the at least one interior surface of one or more of the of nano-volume channels is selectively coated with an optionally dissolvable coating agent physisorbed to the at least one interior surface, wherein the optionally dissolvable coating agent comprises a coating agent and a first component for the plurality of specified reactions. In embodiments having the dissolvable coating agent, the coating agent is selected from the group consisting of a low melting-point solid; a hydratable solid, semi-solid or gel, a polymer, a block co-polymer, a polyethylene glycol, a polyvinyl alcohol, a polyethyleneimine, a lipid, a surfactant, a controlled-release agent, and a salt.

In related embodiments wherein a method for preparing a differentially coated device is provided, the method comprises providing a device having a plurality of nano-volume channels for retaining one or more reaction components for the specified reactions, each channel having at least one interior surface in communication with at least one exterior surface, selectively coating at least one interior surface of one or more of the plurality of channels with a dissolvable coating agent so as to prepare the differentially coated device, wherein the dissolvable coating agent is physisorbed to the at least one interior surface and comprises a coating agent and a first component for the plurality of specified reactions.

Other embodiments provide a method for preparing a differentially coated device as described above, wherein providing further comprises selectively coating at least one external surface with a coating agent to impart a specified physicochemical property, using an autoloader device comprising a loading chamber sufficiently large to contain the device to be coated, the coating reagent, and an immiscible fluid that lifts the coating reagent over the device as the volume of the immiscible fluid is increased.

In such embodiments, as before, the coating agent is selected from the group consisting of a low melting-point solid; a hydratable solid, semi-solid or gel; a polymer; a block co-polymer; a polyethylene glycol; a polyvinyl alcohol; a polyethyleneimine; a lipid; a surfactant; a controlled-release agent; and a salt, and loading further comprises using a pin-loading device comprising an array of calibrated transfer pin dispensers to load the plurality of channels with one or more reaction mixtures, or using a piezoelectric disperser to load the channels. In a related embodiment there is provided a method for conducting a plurality of specified reactions using the differentially coated device of above, the method comprising loading the plurality of channels in the differentially coated device with one or more reaction mixtures comprising additional components sufficient for the plurality of specified reactions, and initiating the plurality of reactions by one or more methods selected from the group consisting of heating the device, exposing the device to photo/optical conditions, hydrating the nano-volume channels; and stacking the device with one or more other devices to mix components in each device upon contact, thus initiating the specified reactions.

A more particular embodiment provides a method for conducting a plurality of nano-volume specified reactions as described, wherein loading further comprises using a pin-loading device comprising an array of calibrated transfer pin dispensers to load the plurality of channels with one or more reaction mixtures, or using a piezoelectric disperser to load the channels. Related embodiments provide a plurality of channels that may vary from channel to channel with respect to any or all of: a specified reaction, a sample, a specified physicochemical property of the nano-volume channel, and method of initiating a specified reaction, wherein the plurality of channels comprise a plurality of nano-volume through-holes or nano-volume troughs and wherein the plurality of specified reactions comprise different specified reactions in two or more of the plurality of channels. In other embodiments, the plurality of specified reactions may comprise the same specified reaction in two or more of the plurality of channels, and may comprise maintenance of cell cultures. U.S. Pat. No. 6,716,629 to Hess et al. filed Oct. 1, 2001 and US Published Applications 20030180807 A1 and 20030124716 A1 to Hess et al. both filed Dec. 10, 2002 disclose methods for maintaining cell cultures in arrays, and apparatus for same, each of which is hereby incorporated by reference herein in their entirety.

Another particular embodiment provides a method for preparing a differentially coated device for conducting a plurality of nano-volume specified reactions, the method comprising providing a device having a plurality of channels for retaining one or more reaction components for the specified reactions, each channel having at least one interior surface in communication with at least one exterior surface, selectively coating at least one interior surface of the plurality of channels with a dissolvable coating agent so as to prepare the differentially coated device, or wherein the dissolvable coating agent is physisorbed to the at least one interior surface and comprises a coating agent and optionally a first component for the plurality of specified reactions. In related embodiments, selectively coating further comprises using a pin-loading device comprising an array of calibrated transfer pin dispensers to selectively physisorb the dissolvable coating agent to the at least one interior surface. Alternatively, the loading device may be piezoelectric disperser.

Still another embodiment provides a method for conducting a plurality of nano-volume specified reactions using a first and at least second differentially coated device prepared described above, the method comprising loading the plurality of channels in the first differentially coated device with one or more samples, wherein the samples are the same or different, initiating the plurality of reactions by stacking the first device with at least a second differentially coated device loaded with a mixture of reagents comprising sufficient components common to the specified reactions, such that upon stacking, the mixture of reagents in the at least second device mixes with the samples of the first device, thereby initiating the specified reactions. In related embodiments, loading further comprises using a pin-loading device comprising an array of calibrated transfer pin dispensers to load the plurality of nano-volume channels with one or more samples, or loading further comprises using a piezoelectric disperser to load the channels.

Still another more particular embodiment provides a method for preparing a differentially coated device for conducting a plurality of nano-volume specified reactions, the method comprising preparing a platen having a prescribed spatial arrangement of micro-volume channels, each micro-volume channel having at least one interior surface in communication with at least one exterior surface, wherein preparing further comprises coating a flexible printing pad with a coating agent, wherein the coating agent is applied to the exterior surface to create a spatially arranged coating on the printing pad which correlates to the prescribed spatial arrangement for the channels, transferring the spatially arranged coating on the flexible printing pad to the platen by contacting at least one external surface of the platen with the printing pad to impart the prescribed spatial arrangement of micro-volume channels to the platen, and selectively coating the at least one interior surface of one or more of the plurality of micro-volume channels with a coating agent so as to prepare the differentially coated device, wherein the coating agent is physisorbed to the at least one interior surface and comprises a coating agent and optionally a first component for the plurality of specified reactions.

BRIEF DESCRIPTION OF THE DRAWINGS

The foregoing features of the invention will be more readily understood by reference to the following detailed description, taken with reference to the accompanying drawings, in which:

FIGS. 12(a) and 12(b) shows four points found at the corners of a microfluidic array that are used in determining the orientation of the microfluidic array, in accordance with an embodiment of the invention.

FIG. 24A is a simplistic depiction of an autoloading device, used to selectively modify or coat surfaces of differentially coated devices, showing how a solvent, flowing in from the bottom, pushes the modifying or coating agent up in the chamber, thereby loading the nano-volume channels.

DETAILED DESCRIPTION OF SPECIFIC EMBODIMENTS

Definitions

Figure 1:
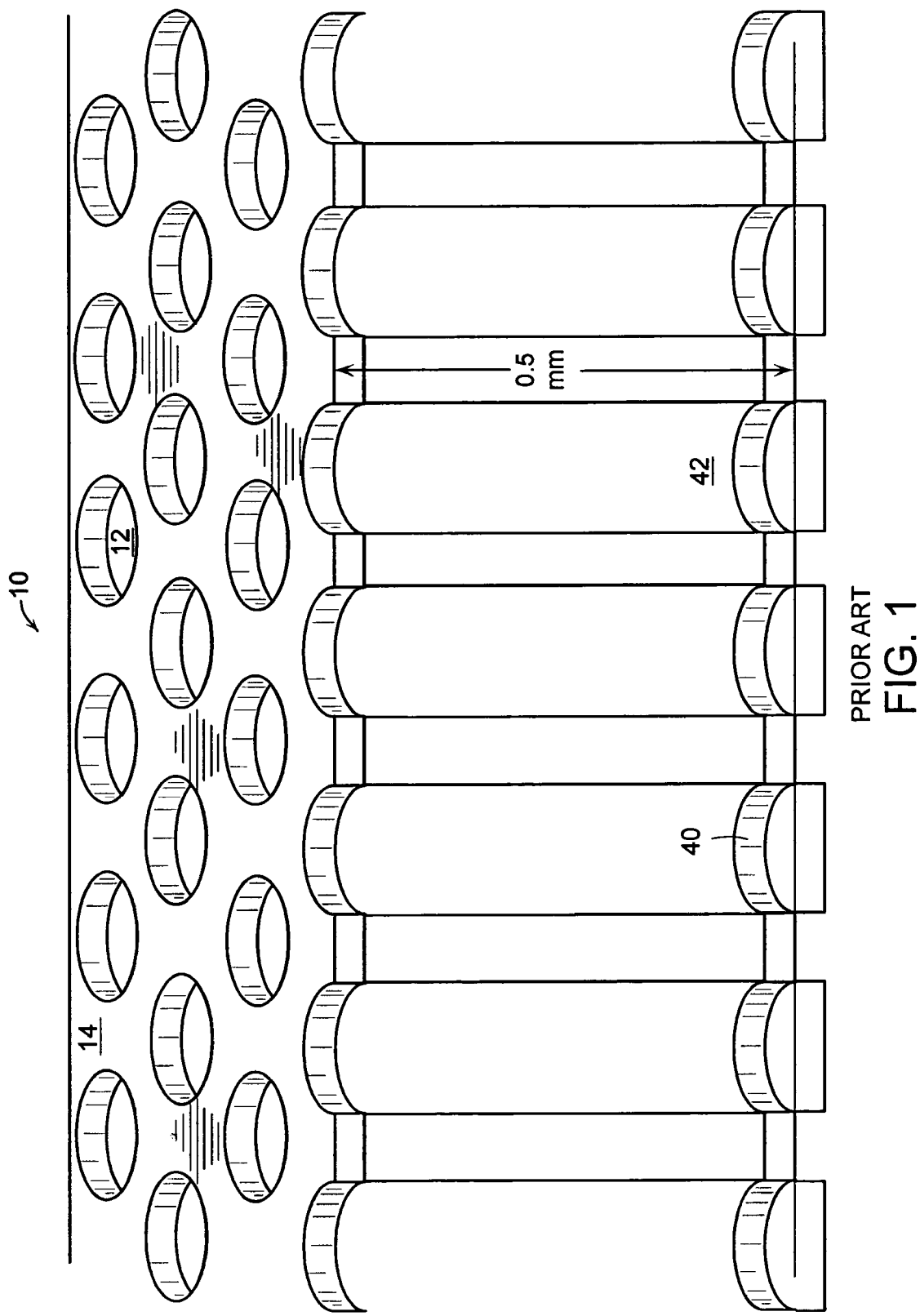
FIG. 1 shows a detailed cut away view of a typical nanoliter sample chip according to the prior art.

The following terms shall have the meanings indicated unless the context otherwise requires:

"Physicochemical Property" as used herein means any property involving the principles of physics and chemistry, alone or in combination, including but not limited to any property of a substance, reaction, molecule, event, process relating to physical state, electronic structure, electronic principles, thermodynamic principles, atomic structure, atomic principles, molecular composition and geometry, chemical composition, chemical reactivity, valence state, oxidation state, oxidation potential, reduction potential, molecular structure, molecular composition, molecular principles, aromaticity, spatial orientation, isomeric form, stereochemical orientation, surface tension, refractive index, wetability, water solubility, density, melting point, boiling point, conductivity, and absorption, luminescence, emission and reflection properties and other light/energy related properties defined by wavelength phenomenon, for example, color and color changes.

Other examples of physicochemical properties include but are not limited to those relating to hydrophobicity, lipophilicity, hydrophilicity, protein sequence, intramolecular interactions, intermolecular interactions, two- and three-dimensional structure, for example protein primary, secondary and tertiary structure, nucleic acid sequence and structure, antibody structure, enzyme structure, morphology, properties relating to protein-protein interactions, protein-small molecule interactions, nucleic acid-nucleic acid, nucleic acid-protein, or nucleic acid-small molecule interactions, antibody-antigen interactions. The term also encompasses the idea of an intermediate property that is capable of being altered.

"Channel" as used herein means a space defined by an interior surface or surfaces connecting at least one exterior surface, wherein the channel is capable of confining a liquid, or in which liquid flows, diffuses, or resides. Channels may be through-holes, troughs, passages, etched grooves, contract-printed prescribed alignment patterns, wherein the alignment is aligned or random in space, interconnected with other channels or not.

"Through-hole" as used herein means a cylindrical or other shaped channel open at two ends, so that liquid can flow through. It is often referred to as a microwell, a channel, or micro-volume sample chamber. The volume is such that it may be less than 1 µL, or less than 400 nL, or as little as several nL. Liquid sample is placed therein, and held by surface tension, aided by the nature of the differential coating on the external surface with which the through-hole is in communication. A nano-volume channel, or sample holder, may be similarly sized, by volume, as a microvolume channel, through-hole or sample chamber, though typically a nano-volume channel or through-hole has a smaller capacity for a liquid sample than a micro-volume channel/through-hole.

"Trough" as used herein means a particular type of channel having a concave interior surface defining two continuous sides and a bottom but open on the third side, the two sides in communication with an exterior surface.

"Hydrophilic" as used herein means that which has an affinity for water, of absorbing water, mixing with water, dissolving in water, and interacting with water such as through hydrogen bonding. Hydrophilic materials and compounds may be completely hydrophilic, or have regions of hydrophilicity, such as a protein, or lipid bi-layer component like a fatty acid. Hydrophilic materials tend to have ionic or charged regions, or are polar. A hydrophilic molecule or portion of a molecule is one that typically is electrically polarized and capable of hydrogen bonding, enabling it to dissolve more readily in water than in oil or other "nonpolar" solvents. Hydrophilic molecules can establish hydrogen bonds with water molecules, which are favorable by thermodynamics and makes these molecules soluble in water.

"Hydrophobic" as used herein means that which has an aversion for water. Hydrophobic compounds and materials tend to be electrically neutral and nonpolar, and thus prefer other neutral and nonpolar solvents or molecular environments. Hydrophobic is often used interchangeably with "oily" or "lipophilic" or "oleophilic." Hydrophobic refers to the physical property of a molecule that is repelled by water. Hydrophobic molecules in water often cluster together to minimize thermodynamically unfavorable interfaces or interactions with the polar water molecules.

"Lipophilic" as used herein means that which has an affinity for lipids. Lipophilic is a particular concept within the broad concept of hydrophobic—i.e. materials which avoid water—but more particularly refers to those materials which have an affinity for compounds commonly referred to or known as lipids, such as molecules with a long-chain saturated or unsaturated hydrocarbons tail and a polar, or charged oxygen-containing head. More generally, a lipid may be thought of as a greasy hydrophobic compound containing carbon, hydrogen and oxygen. Examples of lipids include steroids; phospholipids, neutral fats and carotenoids and sphingolipids.

"Blocking Agent" as used herein means a material or substance used to physically block access of a surface, defined space, channel, region of a surface or regions of a surface or surfaces, from exposure to a chemical composition, reagent or process, energy source or exposure, or environment. A blocking agent may be a solid, including a low-melting point solid such as a wax or polymer, or a salt that may or may not be applied in liquid form and then dried; or the blocking agent may be a liquid, such as an oil, or a grease. Other examples of blocking agents include traditional chemistry blocking agents, wherein a functional moiety on a particular chemical composition is reacted with a standard reagent known in the field to create a modified moiety that is "blocked" or protected from reacting with a later reagent in a particular reaction scheme. For both the physical blocking agents and traditional chemistry blocking agents, the blocking agents are removed after protecting the particular region, or moiety from the chemical reagent of process, energy source or exposure "Modifying Agent" as used herein means a material or reagent that is capable of modifying a surface, a composition, a structure, a physicochemical property or particular characteristic, by either chemical means, such as a chemical reaction, or physical means, such as blocking. Modifying agents may be blocking agents, and blocking agents may be modifying agents. Both may be coating agents.

"Coating Agent" as used herein means "a material which may be applied to a surface to physically cover all or part of the surface. A coating agent may be homogenous in its chemical composition and/or chemical properties, physical composition and/or physical properties, or it may be heterogeneous, such as a gradient coating, a multifunctional, multicompositional or multilayered coating. A coating may be applied chemically, wherein the coating adheres to the coated surface through chemical bonds, such as covalent bonds, or it may be applied as a physical coating, wherein the coating adheres to the coated surface through physical interactions such as electrostatic forces, hydrogen bonds, surface tension, Van der Waal's forces, polar interactions and dipole forces, for example.

"Uniform coating" as used herein means a coating, layer, surface composition or deposition covering a surface that is homogeneous relative to chemical, molecular, or physical state or properties, although the thickness and nature of the coating may vary at any given location on the surface relative to another location. Conversely, a non-uniform coating is a coating, layer, surface composition or deposition covering a surface that is heterogeneous relative to chemical, molecule or physical state or properties, and may also vary in thickness and surface appearance from one region of the coated surface to another.

"Nano-volume specified reaction" as used herein means a particular reaction run in a nanoliter volume scale, such that the total reaction volume is generally less than a microliter.

"Dissolvable" as used herein means a material, compound, substance or agent whose physical state can be change through heat, hydration, salvation, or other means at will. Thus a dissolvable substance may be a wax, which melts to a liquid upon treatment with heat, or a salt or powder which dissolves upon addition of water or other liquid.

"Physisorbed" as used herein means that the forces holding a substance to a surface do not involve the making or breaking of chemical bonds, but rely on purely physical interactions for adherence, absorption, affinity or similar interactive phenomena.

In illustrative embodiments, a system and method for registering a location of a dispenser array relative to a receptacle array is presented. The receptacle array, which may be a microfluidic array, is rigidly coupled to a frame, while the dispenser array is movable in relation to the frame. A first camera is in rigid association with one of the dispenser array and the frame. The first camera is capable of viewing a fiducial reference in rigid association with the other of the dispenser array and the frame when the dispenser array is in an alignment position. Quantities related to a vector displacement from the alignment position to a fixed position on the microfluidic array are determined. The quantities thus determined are used to guide positioning of the dispenser array relative to the microfluidic array. Details are discussed below.

Figure 3:
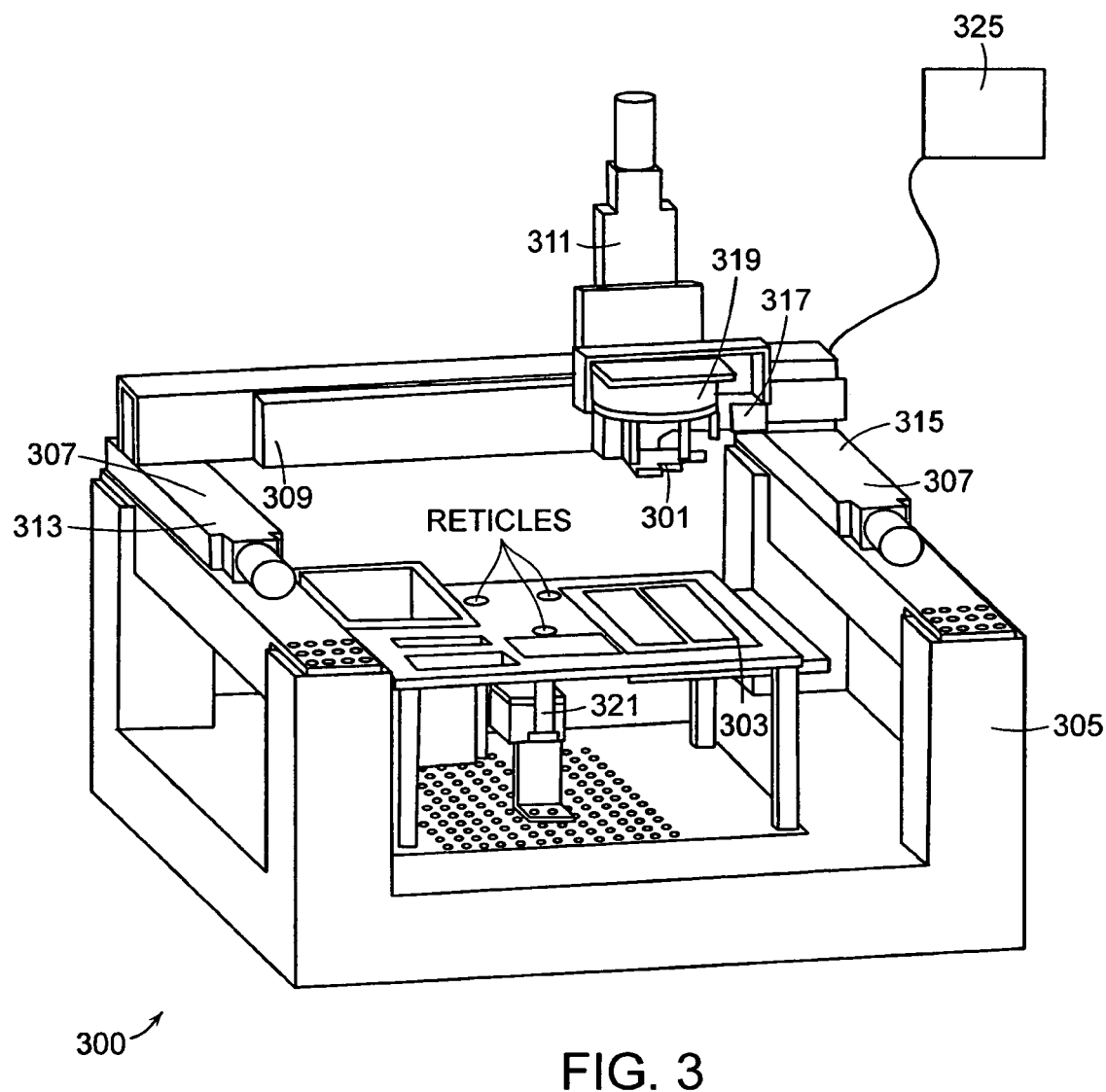
FIG. 3 shows a system for registering a dispenser array to a microfluidic array 303, in accordance with an embodiment of the invention.

FIG. 3 shows a system 300 for registering a dispenser array 301 to a receptacle array, which may be, without limitation, a microfluidic array 303, in accordance with one embodiment of the invention. The dispenser array 301 typically includes one or more fluid dispensing elements at expected positions in a plane. The dispenser array 301 may be, without limitation, an array of transfer pins capable of being loaded with transfer liquid. The microfluidic array 303 may be a platen or chip with a plurality of closed and/or through-hole sample wells at expected positions, as described above.

As shown in FIG. 3, the microfluidic array 303 is rigidly coupled to a frame 305, while the dispenser array 301 is movable in relation to the frame 305. Note that alternatively, the dispenser array 301 may be rigidly coupled to the frame 305, with the microfluidic array 303 movable in relation to the frame 305.

The dispenser array 301 is, without limitation, capable of moving independently in approximately three mutually orthogonal directions. For illustrative purposes, the three directions will be referred to as an x-motion axis 307, a y-motion axis 309, and a z-motion axis 311. In various embodiments, a gantry with two parallel tracks 313 and 315 may be attached to the frame 305 to assist in moving the dispenser array 301. Due to various tolerances, there is typically skew from orthogonality between the directions, such as between the x-motion axis 307 and the y-motion axis 309.

A controller 325 may be used to control motion of the dispenser array 301 relative to the frame 305. Controller 325 may include, without limitation, a robotic motion control system, various circuitry, and/or a Central Processor Unit (CPU) that may include memory and be appropriately pre-programmed or configured to be loaded with an appropriate program. Memory may include, for example, a diskette, a fixed disk, a Compact Disk (CD), Read Only Memory (ROM), Erasable Programmable Read-Only Memory (EPROM), and/or Random Access Memory (RAM).

The controller 325 may further include one or more encoders that precisely determine relative position of the dispenser array 301. For example, an encoder for each motion-axis 307, 309, 311 may be provided, such that a set of coordinates identifies the relative position of the dispenser array 301.

The system 300 includes one or more vision means for viewing either or both the dispenser array 301 and the microfluidic array 303. The vision means may include, for example, one or more sensors for detecting position of either or both the dispenser array 301 and the microfluidic array 303. The sensor may be, without limitation, an optical or acoustic sensor.

Figure 4:
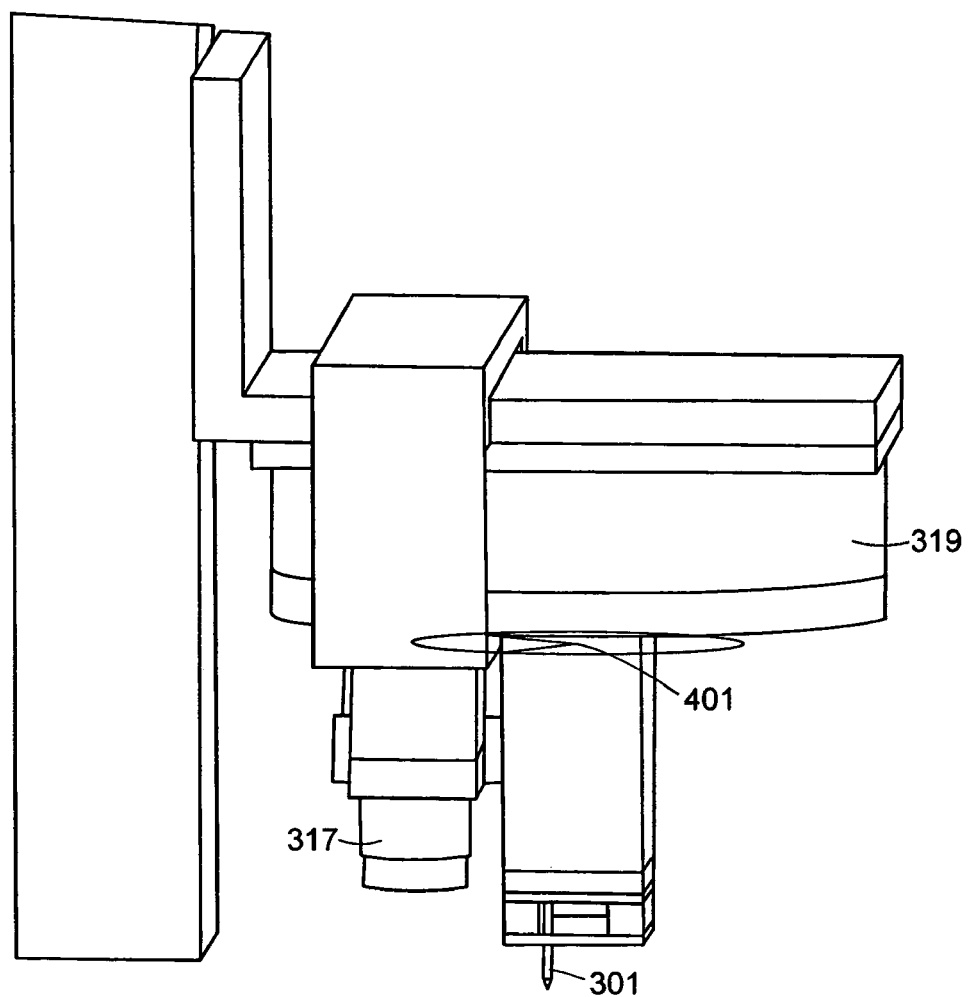
FIG. 4 shows the rotary stage according to FIG. 3 in more detail.

In an illustrative embodiment, the vision means includes a first camera 317 in rigid association with the dispenser array 301. The dispenser array 301 may be capable of rotating about a fixed point relative to the first camera 317. As shown in more detail in FIG. 4, the dispenser array 301 may be mounted to a rotary stage 319 via a dispenser holder 321. The rotary stage 319 permits controlled rotation of the dispenser array 301 about a center of origin 401, the center of origin 401 being in rigid association with the dispenser array 301. An alternative design may, rotate the microfluidic array 303 instead of, or in combination with, the dispenser array 301.

Referring back to FIG. 1, a second camera 321 may be used, among other things, to determine the orientation of the dispenser array 301 relative to the camera 317. The second camera 321 may be, without limitation, rigidly mounted to the frame 305.

In an embodiment of the invention, a World Coordinate System (WCS) may be defined whose position is fixed relative to, for example, the frame 305, and to which other elements in the system 300 will be referenced. The Origin of the WCS ($O_W$) may be, without limitation, defined by a fixed fiducial on the frame 305. Relationships between the WCS, the field of view of the first camera 317 defined by a First Camera Coordinate System (FCCS), the field of view of the second camera 321 defined by a Second Camera Coordinate System (SCCS), the position of dispenser array 301, and/or the position of the microfluidic array 303 are determined. Each of the various coordinate systems may be, without limitation, a Cartesian coordinate system following the right hand rule, however other coordinate systems known in the art may be used.

The x-motion axis 307 of the first camera 317/dispenser array 301 may be defined to be parallel to the x axis of the WCS, while the y-motion axis 309 of the dispenser array 301 is not guaranteed to be parallel to the y axis of the WCS. The angle between y-motion axis 309 and the y axis of the WCS, β, is assumed to be fixed after the gantry is initialized.

Figure 5:
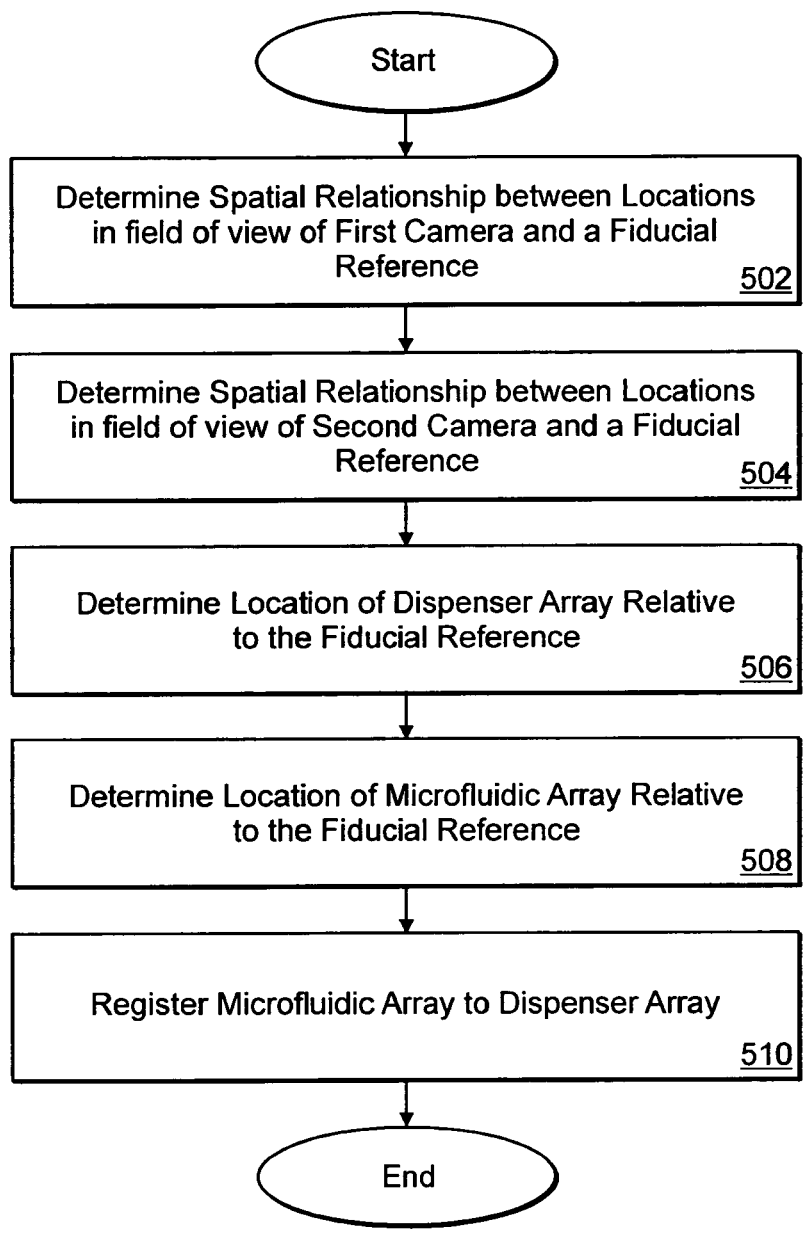
FIG. 5 shows an illustrative process of registering a dispenser array to a microfluidic array, in accordance with an embodiment of the invention.

FIG. 5 shows an illustrative process of registering the dispenser array 301 to the microfluidic array 303, in accordance with one embodiment of the invention. The process begins at step 502, in which a spatial relationship between a location in the field of view of the First Camera 317 and a fiducial reference is determined. For exemplary purposes, the fiducial reference will be defined as the origin ($O_W$) of the WCS.

Various associations between the FCCS and the WCS may be determined. The FCCS may be defined, for example, such that the origin of the FCCS, $O_F$, is the center of the first camera's field of view. The x and y axis of the FCCS makes an angle with respect to the x and y axis of the WCS, which is determined. Furthermore, the pixel resolution of the First Camera with respect to the WCS, and a transformation between positions in the FCCS and the WCS, are determined.

Figure 6:
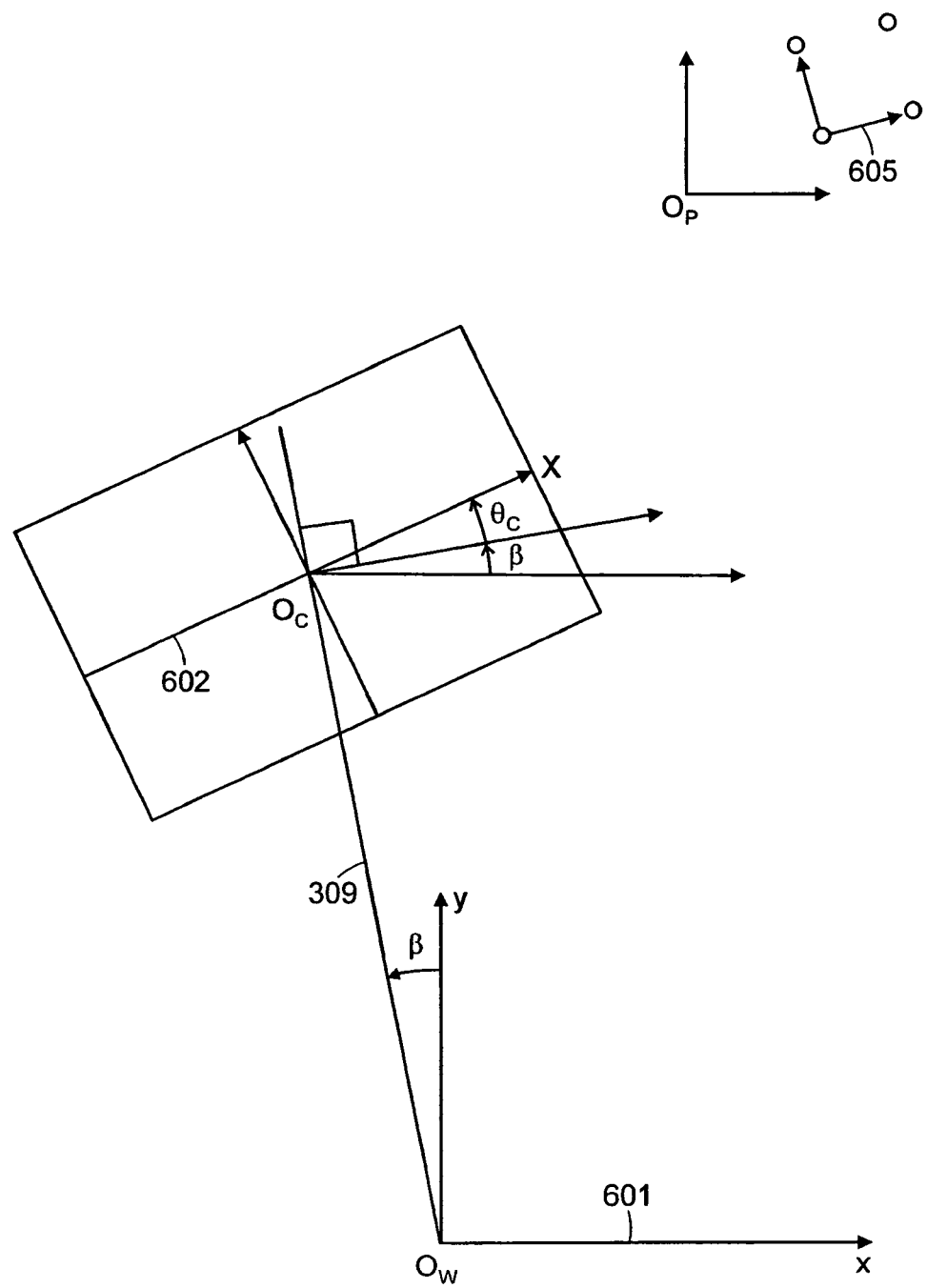
FIG. 6 shows relative positions of a World Coordinate System, a First camera Coordinate System, and a dispenser array, in accordance with an embodiment of the invention.

FIG. 6 shows the relative positions of the WCS 601, the FCCS 603 and the dispenser array 605. Typically, the first camera 317 cannot be mounted so that the y-axis 607 of the FCCS perfectly corresponds to the y-motion axis 309, but rather the y-axis of the FCCS makes an angle $\theta_C$ to the y-motion axis 309. Accordingly, the angle the first camera 317 makes with respect to the WCS is $\theta_C + \beta$. These two angles must be decoupled because β may change when the motion axes 307 and 309 are initialized.

Figure 7:
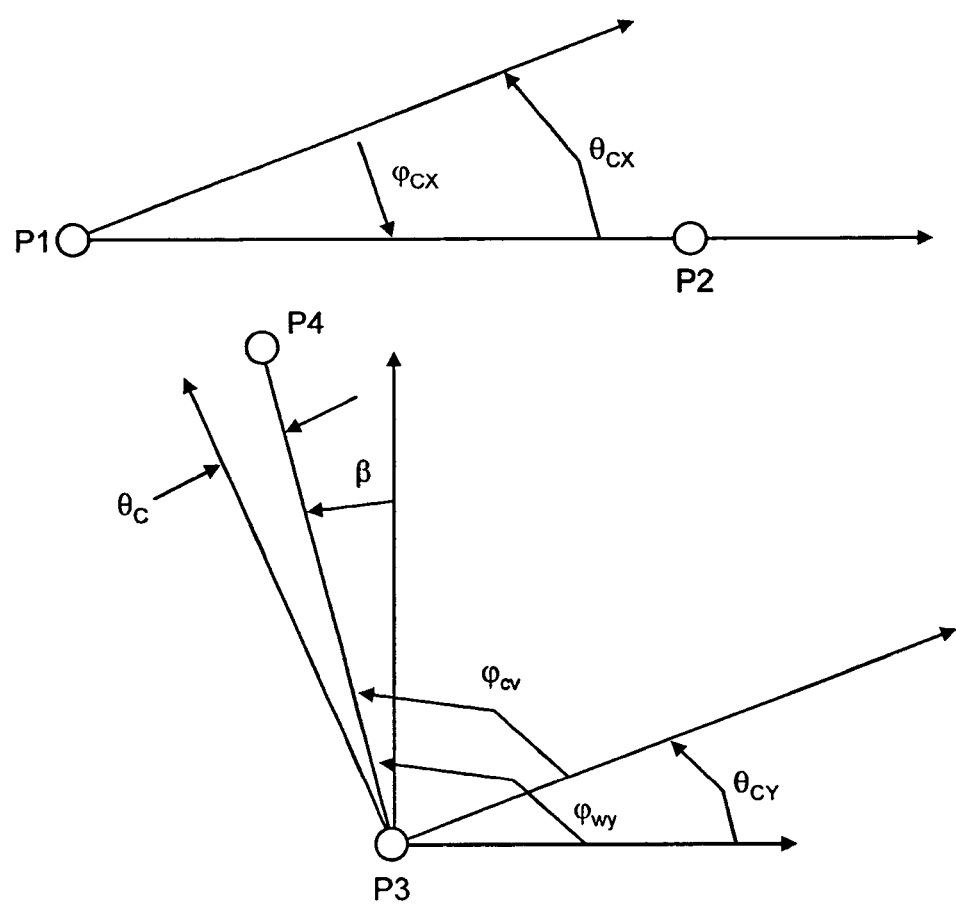
FIG. 7 shows a fiducial reference that may be viewed in a plurality of distinct positions in the field of view of a first camera, in accordance with an embodiment of the invention.

In order to determine angles β and θ, the first camera 317 may moved such that a fiducial reference (which may be fixedly positioned, without limitation, to the frame 305) appears in a plurality of distinct positions in the field of view of the first camera, as shown in FIG. 7 in accordance with one embodiment of the invention. More particularly, the fiducial reference may be placed on the right side of the first camera's 317 field of view. The position $P_1$ of the fiducial is recorded in both the WCS and the FCCS. A move along only the x-motion axis 307 will then be made such that the fiducial moves to the left side of the first camera's 317 field of view. The fiducial will be searched here and this point $P_2$ will be saved in both coordinate systems as before. The angle made by the two points can be determined as follows:

$\varphi_{wx} = \text{Atan } 2(\Delta Y_W, \Delta X_W)$, Angle made by point 1 and 2 in the WCS:

$\varphi_{cx} = \text{Atan } 2(\Delta Y_C, \Delta X_C)$, Angle made by point 1 and 2 in the Camera:

and $\theta_C + \beta = \theta_{CX} = \varphi_{wx} - \varphi_{cx}$.

Note that since a move was made only along the x-motion axis from point 1 to 2, $\varphi_{wx}$ will be 0 degrees, and $\theta_C + \beta = \theta_{CX} = 0 - \varphi_{cx}$.

Next, the first camera 317 will be moved along only the y-motion axis 309 in the positive direction from point 3 to point 4. The angles made by these two point can be determined as follows:

$\varphi_{wy}$=Atan 2($\Delta Y_W, \Delta X_W$), Angle made by point 3 and 4 in the WCS:

$\varphi_{cy}$=Atan 2($\Delta Y_C, \Delta X_C$), Angle made by point 3 and 4 in the Camera:

And $\theta_C + \beta = \theta_{CY} = \varphi_{wy} - \varphi_{cy}$.

In this case, $\varphi_{wy}$=90+$\beta$, such that $\theta_C + \beta = \theta_{CY}$=90+$\beta$−$\varphi_{cy}$, and $\theta_C + \beta = 0 - \varphi_{cx} = 90 + \beta - \varphi_{cy}$, leading to $\theta_C = 90 - \varphi_{cy}$.

Note that $\beta$ can be determined from above as $\beta = \varphi_{cy} - \varphi_{cx} - 90$, but another method, which is typically more precise, may be used to determine $\beta$ as follows.

Figure 8:
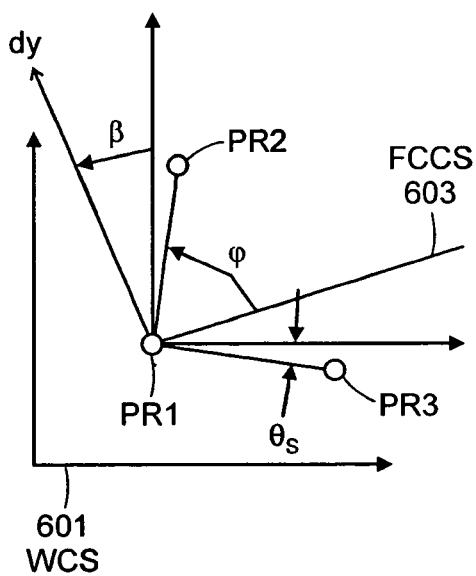
FIG. 8 shows a plate with three accurately known points that may be used to determine angle $\beta$, in accordance with an embodiment of the invention.

Referring to FIG. 8, a plate with three accurately known points PR1, PR2, and PR3 may be used to determine $\beta$, in accordance with an embodiment of the invention. The points PR1, PR2, and PR3 may form, for example, three corners of a square, the square having sides with known length L. The plate may be attached to the frame 305 such that the two sides of the square defined by points PR1 and PR2, and PR1 and PR3 are aligned as close as possible to the WCS y and x axis, respectively. The two end points PR1 and PR3 of the side that is substantially parallel to the x-axis of the WCS are searched for using the first camera 317. As the end points are searched, the angle, $\theta_{CX}$, determined earlier will be used to transform the two end points PR1 and PR3 to the WCS. The first camera 317 will be moved only along the x-motion axis 307. The two points PR1 and PR3 are used to determine the angle the square makes in the WCS, $\theta_S$. Next, the two end points PR1 and PR2 that are substantially parallel to the WCS y axis will be searched for using the first camera 317 by moving the first camera 317 only along the y-motion axis 309. During this search, the camera angle, $\theta_C$, only will be removed. The two end points found by the search are (x1, y1) and (x2, y2+dy), where dy is movement along the y-motion axis 309. $\beta$ can now be determined as:
$\beta$=90−$\theta_S$−$\varphi$, where $$\varphi = \text{Atan2}\left(\frac{y2 + dy - y1}{x2 - x1}\right).$$

Once $\beta$ is known, the location of two fixed points R1 and R2, which may be defined by two fixed reticles are saved in memory. The first fixed point R1 may be arbitrarily defined as the origin of the world coordinate system, while the second fixed point R2 is offset from the first fixed point R1 in the y direction. The locations of the two fixed points R1 and R2 can now be used to recalculate $\beta$. The glass plate with the four reticles is typically very expensive to manufacturer since the position of the reticles on it must be very precise. The individual reticles are cheaper since each one has only one reticle. The glass plate is used to compute $\beta$, and then that information is used to accurately establish the relationship between the individual reticles. Once Beta is established, the relationship between the two reticles R1 and R2 can be accurately determined. By storing the relationship between the reticles R1 and R2, the system can be easily retrained by examining where reticles R1 and R2 are then next time recalibration is required, without using the plate.

Figure 9:
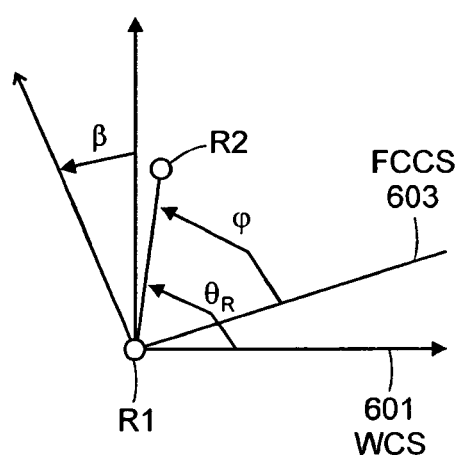
FIG. 9 shows two reticles defining an angle $\theta_R$, in accordance with an embodiment of the invention.

As shown in FIG. 9, the angle $\theta_R$ can be determined by:

$$\theta_R = \text{Atan2}\left(\frac{y_{R2} - y_{R1}}{x_{R2} - x_{R1}}\right)$$

where $(X_{R1}, Y_{R1})$=(0,0), and, as determined with the glass plate, $$\varphi = \text{Atan2}\left(\frac{y2 + dy - y1}{x2 - x1}\right).$$

$\beta$ can then be determined using the equation $\beta = \theta_R - \varphi$.

Once $\beta$ is known, points in the field of view of the first camera 317 can be transformed to the WCS using the following equation:

$$\begin{bmatrix} x_W \\ y_W \\ 1 \end{bmatrix} = \begin{bmatrix} C\beta\theta_c & -S\beta\theta_c & dx - dyS\beta \\ S\beta\theta_c & C\beta\theta_c & dyC\beta \\ 0 & 0 & 1 \end{bmatrix} \begin{bmatrix} x_{FC} \\ y_{FC} \\ 1 \end{bmatrix}$$

where $C\beta\theta_C$=Cos($\beta+\theta_C$), $S\beta\theta_C$=Sin($\beta+\theta_C$), $C\beta$=Cos($\beta$) and $S\beta$=Sin($\beta$).

Referring to FIG. 7, the first camera 317 resolution can now be determined by transforming $P_{1W}$ and $P_{2W}$ to the FCCS and taking the ratio of change in motion in the WCS x direction to the change in the first camera's 317 field of view in the x direction.

To transform $P_{1W}$ and $P_{2W}$ to the first camera's 317 frame of reference $P_{1WC}$ and $P_{2WC}$:

$$(Xwc \; Ywc) = \begin{bmatrix} \cos(\beta + \theta_c) & \sin(\beta + \theta_c) \\ -\sin(\beta + \theta_c) & \cos(\beta + \theta_c) \end{bmatrix} \begin{bmatrix} Xw \\ Yw \end{bmatrix}$$

for both points
The first camera $$X \text{ resolution} = \frac{\Delta Xwc}{\Delta Xc}$$

(units per pixel), where $\Delta X_{WC}=(X_{2WC}-X_{1WC})$ and $\Delta X_C=(X_2-X_1)$. Similarly, the Y resolution of the first camera can be determined by P3 and P4.

Referring back to FIG. 5, the spatial relationship between locations in the second camera's field of view 321 and the fiducial reference is similarly determined in step 502. More specifically, the SCCS may be defined, for example, such that the origin of the SCCS, $O_S$, is the center of the second camera's 321 field of view. The x and y axis of the SCCS makes an angle $\theta_{2C}$ with respect to the x and y axis of the WCS, which is determined. Furthermore, the pixel resolution of the Second Camera with respect to the WCS, and a transformation between positions in the FCCS and the WCS, are determined. The second camera 321 is fixed in the WCS and therefore the location of the second camera 321 is also determined.

The second camera's 321 angle $\theta_{2C}$ is determined by following a procedure similar to that used to determine $\theta_C$ above. The difference is that a dispenser on the dispenser array 301 will be used as a fiducial reference, with the dispenser being move relative to the second camera 321 along the x-motion axis 307.

Once the camera angle $\theta_{2C}$ is known, the pixel resolution of the second camera 321 can be determined following a similar procedure as for the first camera 317.

Finally, the location of the second camera's 321 (e.g., the center of origin in the SCCS) is determined in the WCS by placing a fiducial reference in the second camera's 321 field of view and locating it with both the first camera 317 and the second camera 321. Using the first camera 317, the fiducial reference's position in the WCS can be determined, allowing a position in the field of view of the second camera 321 to be determined in the WCS.

Figure 10:
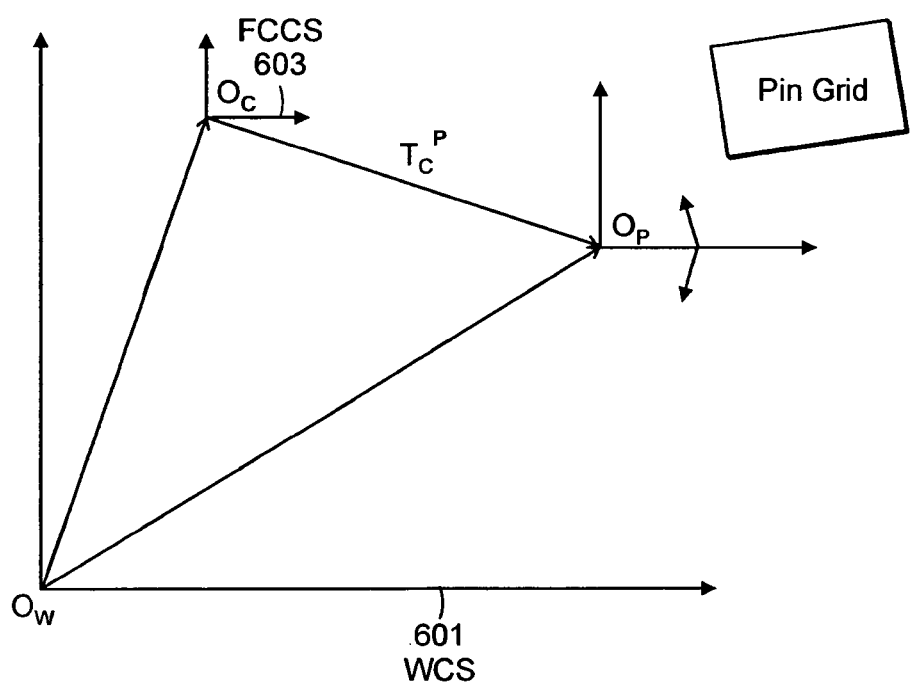
FIG. 10 shows a vector $T_{PC}$ formed between a first camera's $O_C$ and the center of rotation ($O_P$) of a dispenser array, in accordance with an embodiment of the invention

Referring back again to FIG. 5, the location of the dispenser array 301 relative to the fiducial reference is determined in step 506. The dispenser array 301 may be mounted in rigid association with the first camera 317, and in various embodiments may be rotated about a center of rotation 401 (see FIG. 4). The center of rotation 401 can be determined by training a single dispenser, for example, a single pin, of the dispenser array 301 in the field of view of the second camera 321. The dispenser array 301 is rotated such that the trained pin remains in the field of view of the first camera 317. By rotating the pin to at least 3 different positions within the field of view of the second camera 321, a fit circle algorithm can be used to determine the center of rotation 401 in the WCS. This may be done with several pins, with the results being averaged. As shown in FIG. 10, a vector $T_{PC}$ is formed between the first camera's 317 $O_C$ and the center of rotation $O_P$ of the dispenser array 301, in accordance with an embodiment of the invention. The vector $T_{PC}$ can consequently be determined by vector subtraction.

Upon determining the center of rotation $O_P$ of the dispenser array 301, the center of the dispenser array 301 and the positions of the dispensers on the dispenser array 301 relative to the $O_C$ are determined, along with the angle that the dispenser array 301 makes with the WCS. The angle will be used to determine an offset to the dispenser array 301 rotary axis when aligning the dispenser array 301 to the microfluidic array 303.

Figure 11:
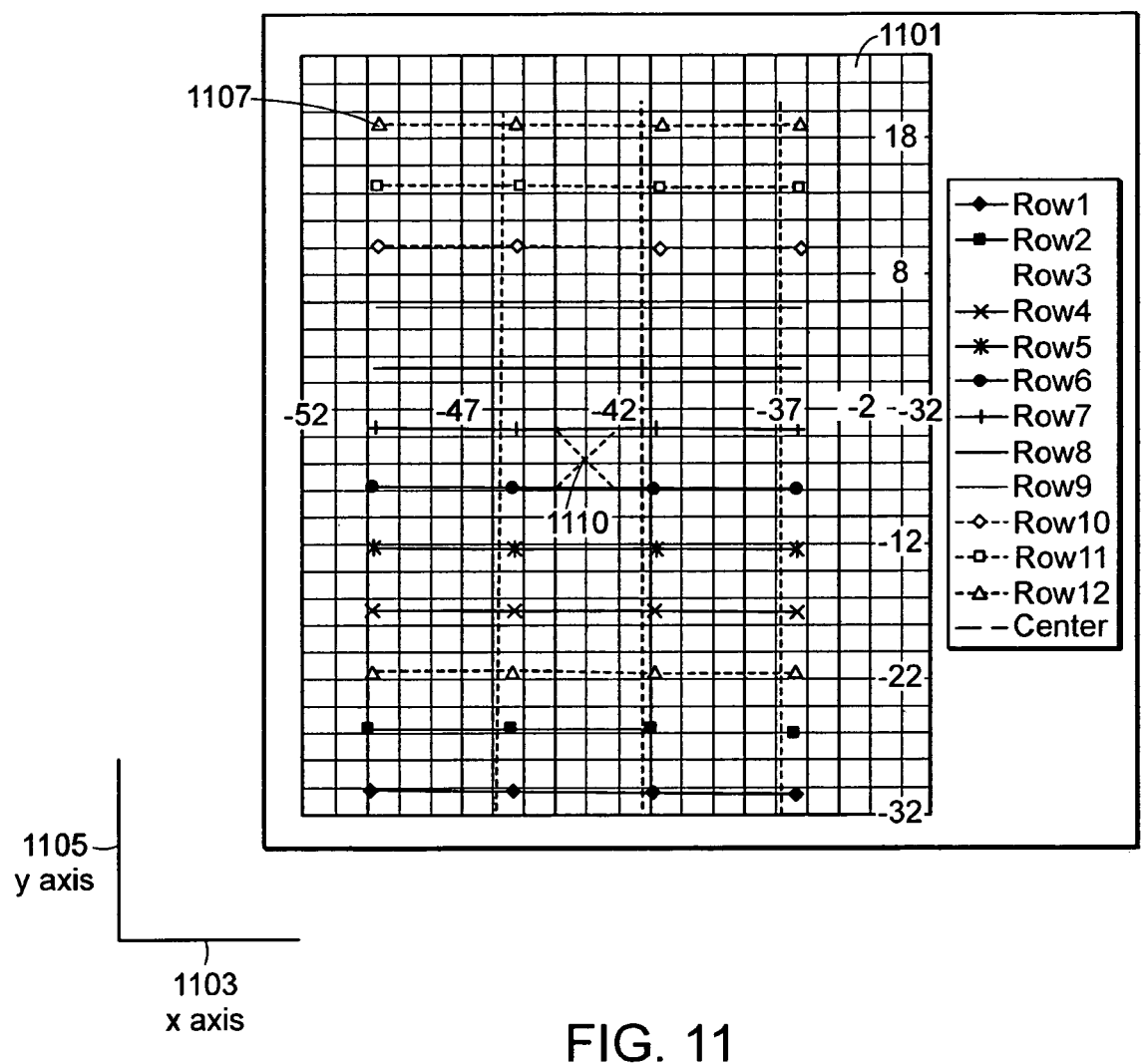
FIG. 11 shows a layout of an exemplary dispenser array, in accordance with one embodiment of the invention.

FIG. 11 is a layout of an exemplary dispenser array 1101, in accordance with one embodiment of the invention. The dispenser array 1101 includes 48 pins 1107 positioned on a grid defined by a grid x-axis 1103, and a grid y-axis 1105 orthogonal to the grid x-axis 1103. The pins 1107 form a 4 pin (along the x-axis 1103) by 12 pin (along the y-axis 1105) array. The angle that the dispenser array 301 makes with the WCS may be defined, for example, as the angle between the grid x-axis 1103 of the dispenser array 301 and the WCS x-axis.

In various embodiments, a best fit algorithm may be utilized to determine the angle the dispenser array 301 makes with the WCS. Of course, other algorithms known in the art may also be used. The best fit grid is determined by best fitting lines in the grid x an y axis directions 1103 and 1105. For example, with regard to the dispenser array of FIG. 11, the pins may be sorted in four groups of twelve (along the grid y-axis 1105) and twelve groups of four (along the grid x-axis 1103). A best fit line is applied to each group. The average slope and intercept of the four lines in the grid y-axis 1105 direction and the average slope and intercept of the twelve lines in the grid x-axis 1103 direction is used to determine the center of the grid 1110. The center of the grid 1110 is the intersection of the two average lines. The angle of the grid relative to the WCS can be determined by taking the average angle of the vertical and horizontal lines. Ninety degrees is subtracted from all the vertical lines. The vertical lines may be weighted three times more than the horizontal lines since they have as many times more points.

Worst pin positions may be discarded from the best fit algorithm, so as to provide a better fit for the majority of pin positions. The algorithm may be applied a predetermined amount of times, with earlier results determining the pin positions that are farthest from the line. The algorithm is typically run again after removing the bad pin positions. The number of pin positions in each line may determine how many pin positions are discarded. For example, only one point may be discarded in each horizontal line (i.e., lines parallel to the grid x-axis 1103), with three points being discarded in each vertical line (i.e. lines parallel to the grid y-axis 1105). Furthermore, bad pins can now be identified or checked against known specifications. In various embodiments, a template of expected pin locations may be aligned with one or more viewed pin positions to aid in the alignment process.

Referring back to FIG. 5, the location of the microfluidic array 303 relative to the fiducial reference is determined, step 508. The microfluidic array 303 is placed in the field of view of the first camera 317 such that the four corners of the microfluidic array 303 can be examined. The location, orientation, and the stretch of the microfluidic array 303 in the WCS is determined. The microfluidic array 303 may be in the form of one or more chips, as discussed above, that are arranged on one or more trays. For example, each chip may include sample wells that are grouped into a 4 by 12 array of 5-well by 5-well sub-arrays In another embodiment, the sub-arrays may be 8-wells by 8-wells or any other convenient number. For alignment, only the lower left hole corresponding to the pins on each of the four corner arrays is used. Other embodiments may of course use other holes for aligning. For example, the extreme corner holes on each of the four corner arrays may be used. A controller is capable of navigating the first camera 317 to each chip on the tray and aligning (i.e. determining the WWC of each chip), given the row and column of the desired chip on the tray. The base location of each of the trays is stored in the registry.

The base location may be defined by the lower left corner of the chip 303 located in the upper right corner of the tray. The registry also stores the pitch of the rows and columns of each chip in the tray. In various embodiments, there are two rows and six columns on each tray, with the pitch between the columns 1-2, 3-4, and 5-6 is different than the pitch between columns 2-3 and 4-5. Therefore, there are two different pitch values stored 'Pitch1' for the first set and 'Pitch2' for the second set. The pitch of the holes in the sub-grid and the pitch of the pins is also known. Using all this information, the system can navigate itself to each of the four corners of any given chip and align it.

Figure 2:
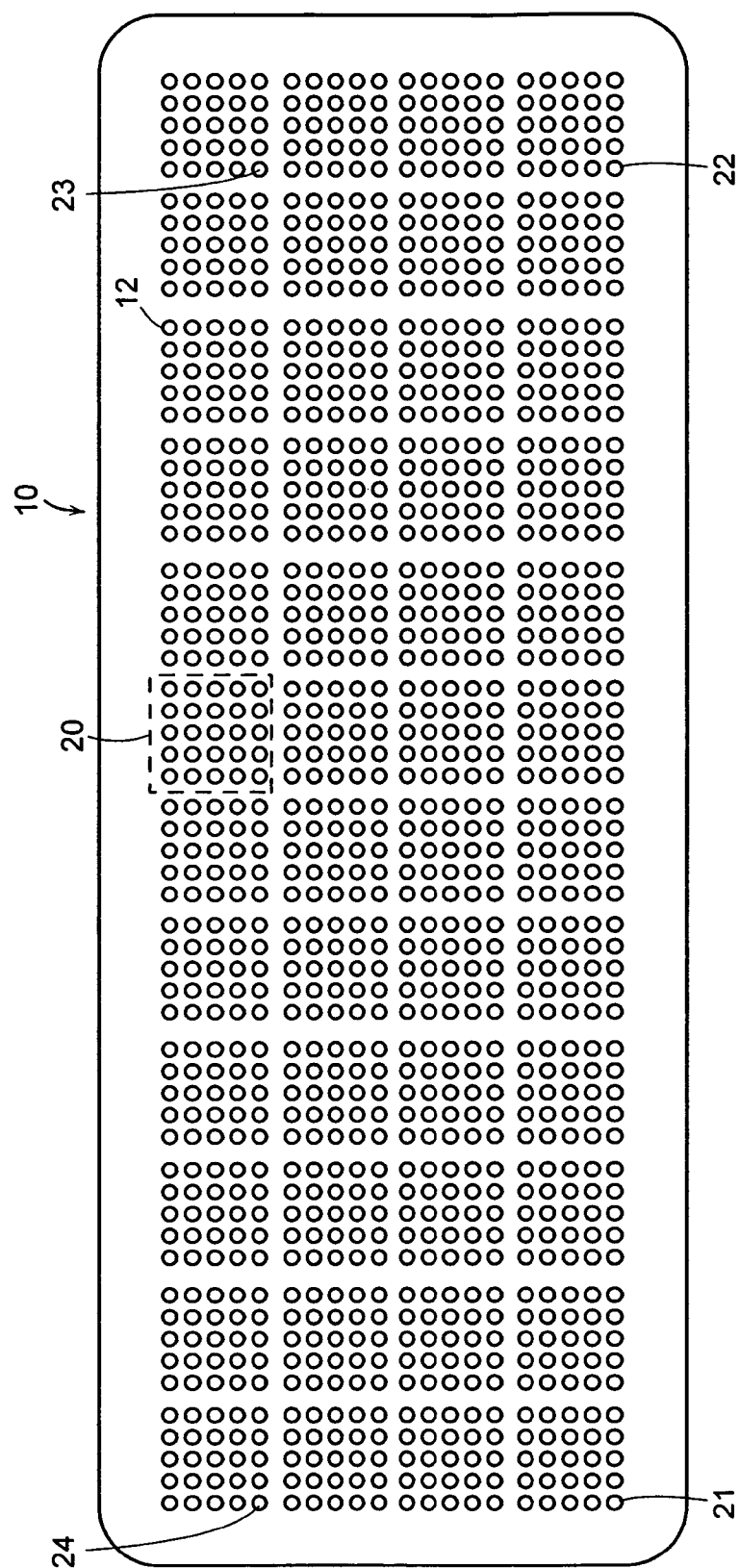
FIG. 2 shows a top plan view of a chip according to FIG. 1 in which the array of sample wells is grouped into sub-arrays.

For example, referring back to FIG. 2, the first camera 317 will move to the lower left corner and locate the lower left hole 21 of the sub-grid. The first camera 317 will then move to the lower right corner and locate the lower left hole 22 for the sub grid. This is repeated for the lower left hole 23 of the upper right corner sub grid and finally the lower left hole 24 of the upper left corner sub grid.

As shown in FIG. 12, the four points 1201-1204 (found in this example at the extreme corners of the chip) are used to calculate the angle of the microfluidic array 303 in the WCS. If the chip is aligned at a desired angle, the diagonals will form Angle1 and Angle2 with an arbitrary horizontal line. But if the chip is rotated as shown in FIG. 12(*b*), the angles formed by the diagonals and the arbitrary horizontal line will be slightly different. The difference between the angles will be used to calculate the angle of the microfluidic array 303 in the WCS. In particular, rotation1=Angle1'−Angle1 and rotation2=Angle2'−Angle2. Ideally, rotation1 would equal rotation2. In practice they will be slightly different. Rotation1 and rotation2 may then be, for example, averaged, to determine the angle of the microfluidic array 303 in the WCS.

The center 1208 of the microfluidic array 303 is determined by calculating the center of the found rectangle. The stretch in x direction is calculated by comparing the horizontal sides of the found rectangle and the theoretical rectangle. The stretch in y is calculated by comparing the vertical segments. If the stretch in either direction is greater then a predetermined value, the alignment for the microfluidic array 303 fails.

If the stretch is within limits, the microfluidic array 303 is then registered with the dispenser array 301, step 510 of FIG. 5. The locations and orientations of the dispenser array 301 and the microfluidic array 303 relative to the fiducial (e.g., $O_W$ of the WCS) have been determined, as described above. A vector displacement between the center of the microfluidic array 303 and the center of dispenser array 301 can thus be determined, and the first camera 317/dispenser array 301 moved accordingly. Furthermore, the dispenser array 301 is rotated using rotary stage 319, such that the angle of the microfluidic array 303 matches the angle of the dispenser array 301.

Figure 13:
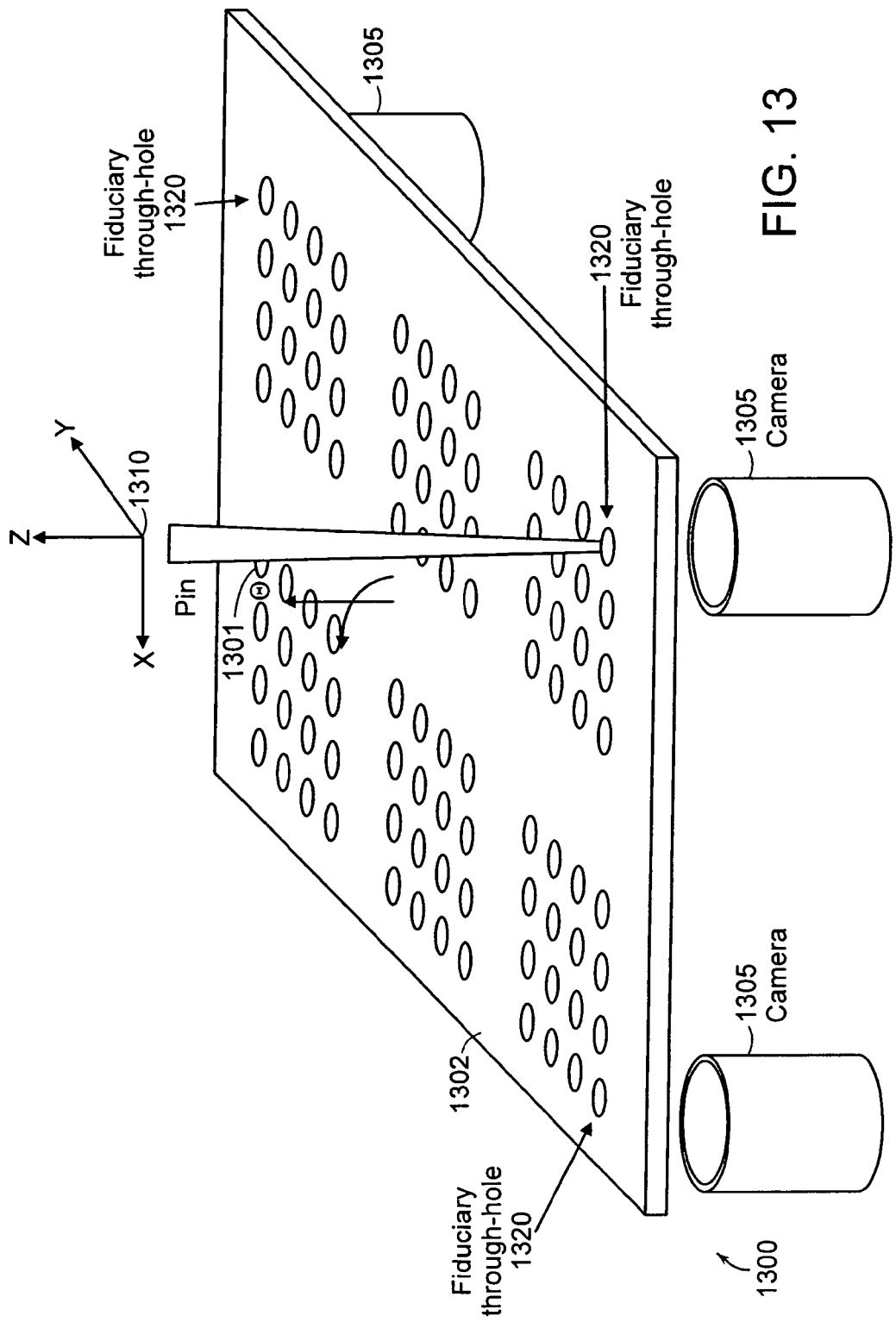
FIG. 13 shows a system for registering a dispenser element to a microfluidic array, in accordance with an embodiment of the invention.

In accordance with other embodiments of the invention, a method of registering a location of a dispenser array in relation to a receptacle array is provided. FIG. 13 shows a system 1300 wherein one dispenser element 1301 can be positioned to dispense fluid into, for example, an opposing through-hole in a microfluidic array 1302. A coordinate system external to the microfluidic array 1302 is defined by a rigid frame to which the dispenser element 1301 is fixed. Two or more cameras 1305 are positioned on the opposing side of the microfluidic array 1302 from the dispenser element 1301 under specified through-holes of the microfluidic array 1302. The dispensing element 1301 could be a pin, as described previously. The pin 1301 is actuated to move in a rectilinear coordinate system (XYZ) 1310. The microfluidic array 1302 is rigidly fixed in the XY plane defined by the motion of the pin and the array is actuated to rotate in the XY plane with the axis of rotation (Θ) parallel to the pin (Z axis).

Important elements within the system 1300 include: (i) relative center-to-center positional accuracy of the through-holes; and (ii) accurate measurement of pin 1301 and microarray 1302 XYZΘ displacement. The precision and accuracy of the center-to-center spacing of through-holes in the microarray 1302 is such that selection of at least three through-holes as alignment fiduciaries defines a XY coordinate system locating all the through-holes in the microarray 1302. The pin translation and microfluidic array rotation actuators typically have separate means to measure the displacement (linear or angular). This may be accomplished be by counting steps in a pre-calibrated stepping motor drive or with a separate displacement sensor. The center-to-center spacing of the pins 1301 (in embodiments having a plurality of pins) in the pin array may be advantageously an integral of the through-hole center-to-center spacing, with the error in the spacing being typically less than the precision of the distance between the array through-holes (<+−25 micrometers) by at least a factor of 5.

The Z axis coordinate of the tip of the pin 1301 relative to the through-hole array 1302 surface is determined by recording the distance the pin 1301 is moved to bring it into contact with the through-hole array 1302 surface.

One or more cameras 1325 are positioned opposite each fiducial through-hole 1320. The cameras are typically rigidly mounted and are not moved relative to the microfluidic array 1302 nor pin 1301.

In various embodiments, determination of the XY coordinate system may be accomplished as follows:

A minimum of three through-holes are selected, one in each corner of the microfluidic array 1302, as fiduciaries 1320 for coordinate system determination.

The pin 1301 is positioned above a fiducial through-hole 1320 and a camera 1325 is positioned below.

The pin 1302 is moved in XY until the image of the pin tip is positioned in the center of the fiducial through-hole 1320.

The pin 1302 is moved to the second and third fiducial through-holes 1302 and coordinate vectors of the pin center relative to the through-hole center is measured.

Figure 14:
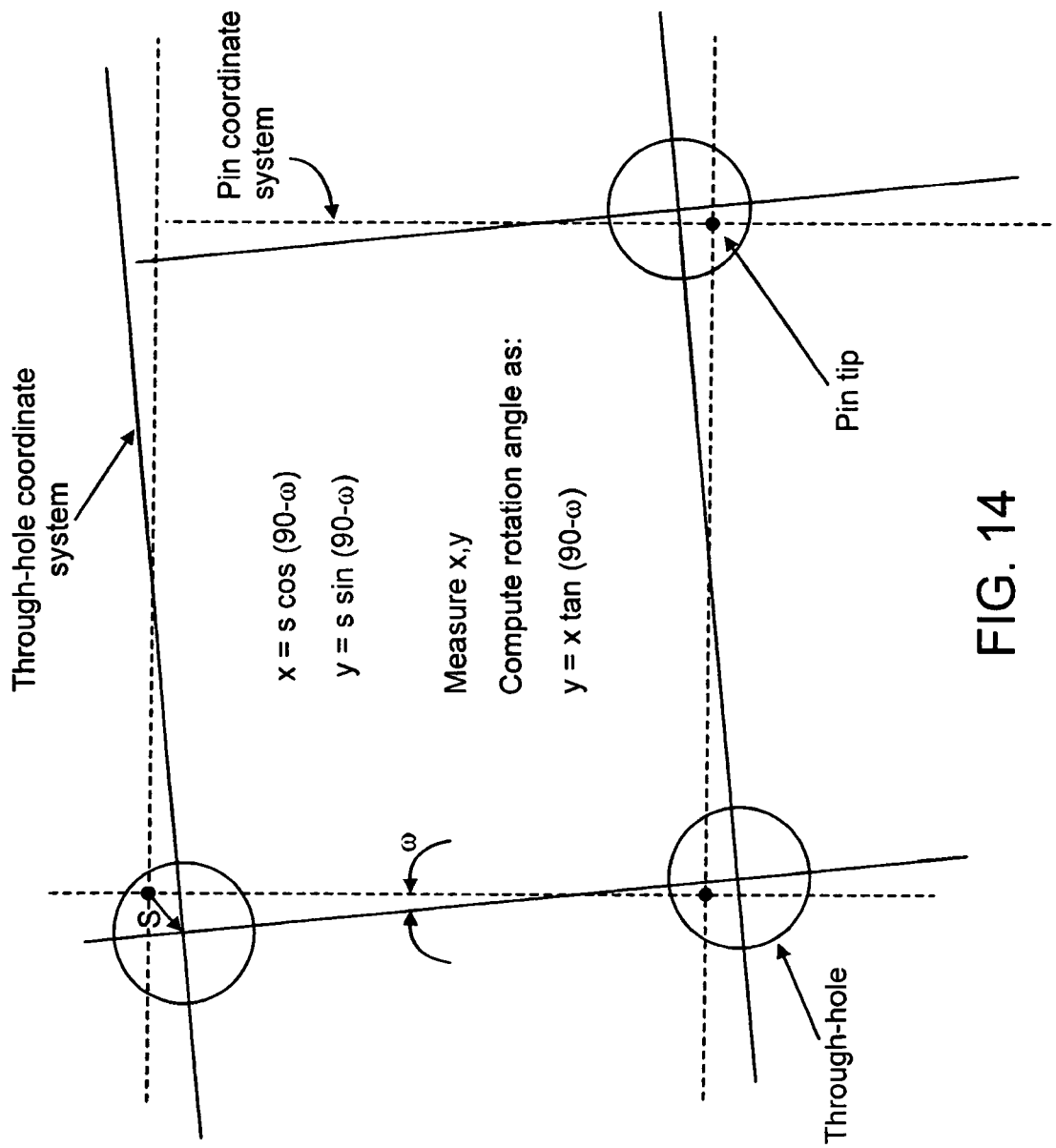
FIG. 14 shows rotation of a microfluidic array, in accordance with an embodiment of the invention.

A coordinate transformation is then enacted which first rotates the microfluidic array 1302 to align the through-hole array axes to the pin 1301 translation axes (see, for example, FIG. 14). The pin 1301 then re-visits the first through-hole 1320, positioned relative to the through-hole center and then moved to determine the lateral offset from the other two fiducial through-holes 1320. The angular offset is recomputed, the microarray 1302 is rotated and the positioning procedure repeated until the position of the pin tip relative to each fiducial through-hole center is less than +−5 micrometers.

The Z axis is determined by starting from a Z position above the microfluidic array 1302 surface. After the XY position of the pin 1301 is determined, the pin 1301 is brought into contact with the fiducial through-hole 1320 to determine the distance from the inserted pin position and a starting point above the microfluidic array 1302 surface.

In various embodiments, a coherent fiber bundle may illuminate and transfer an image of the through-hole to project onto a camera. One light source may be used for multiple fiber bundles, with one camera associated with each imaging fiber bundle.

One camera can be multiplexed to image two or more spatial positions on the microfluidic array 1302 by the following method. A coherent fiber bundle transmits an image of a fiducial through-hole for projection onto a sub-segment of the camera. At least three, if not four, through-hole images can be multiplexed onto a common camera image with this approach.

Figure 15:
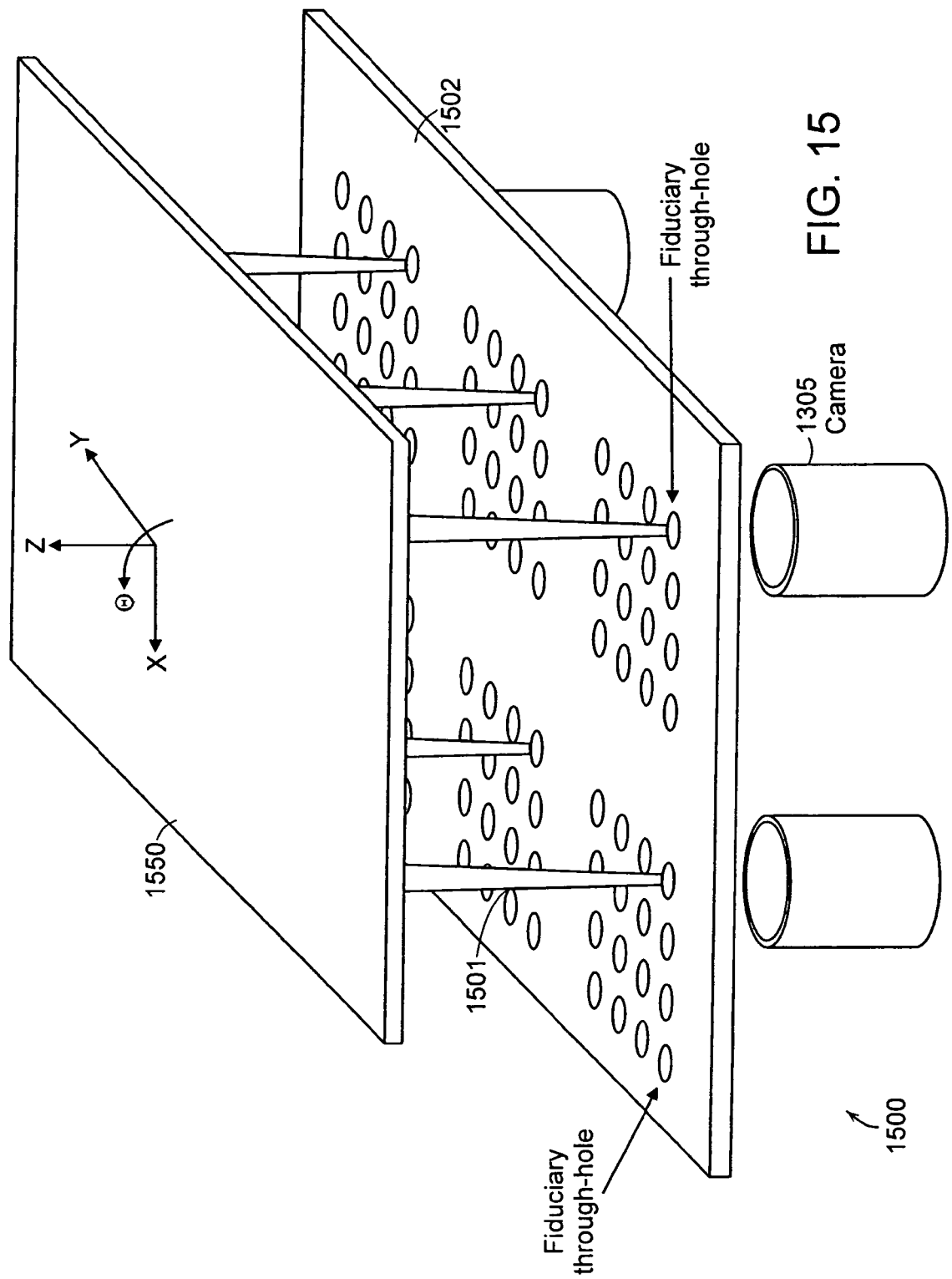
FIG. 15 shows a system for registering a dispenser array that has a plurality of dispenser elements with a microfluidic array, in accordance with an embodiment of the invention.

FIG. 15 shows a system 1500 wherein the dispenser array 1550 contains more than one dispenser element 1501, with the number of pins 1501 equal to the number of subarrays in a microfluidic array 1502. Each pin is registered to a through-hole in the same relative position in each subarray with this method. In alternative embodiments, the dispenser array may have a pin for each throughhole, with the center-to-center spacing of the dispenser elements substantially matching the pitch of the through-hole array.

A through-hole array can be used as an alignment mask to pre-position the pins relative to the through-hole array. Used as a mask, the holes in the mask through-hole array are sized to accept the pins in a sliding fit. Each pin is free to move in the Z axis yet constrained relative to lateral (XY) translations and rotation (Θ).

Detailed Examples of Preferred Embodiment

Masking/Blocking/Protecting of Some or all Holes or Etched Areas Prior to Deposition:

Methods are disclosed for using force-loading to fill holes with a material that prevents deposition of a surface-modifying agent, while allowing the exterior surface to be coated. For example, large amounts of water can prevent the deposition of silane-based coatings because the silanes react with the water prior to reaching the surface.

One technique is to force-load water into holes or etched areas through the use of liquid exchange with ethanol (a lower surface energy fluid) and then expose the OA or etched plate to a silane vapor. It is also possible to force-load the etched areas or holes through the use of vacuum or momentum. For example, holding a hydrophobically coated OA plate under running water can force water into the holes while running off of the exterior surfaces; or a flowing gas or fluid can be used to prevent deposition of a surface-modifying agent in the holes of an OA plate, while allowing modification of one side of the OA.

For example, by arranging the flow of nitrogen such that the gas is forced to flow through the holes in an OA plate (from "back" to "front") while the plate is in a vapor deposition chamber, and preventing through the use of o-rings or other gasketing materials the exposure of the "back" side of the OA plate while the "front" is exposed to the vapor of a surface-modifying agent such as fluorotrichlorosilane, the interior surfaces of the holes are blocked from modification. After coating the "front" side of the OA plate, the plate can be reversed such that the "front" and "back" designations are interchanged. Then, the process can be repeated resulting in an OA plate with modified exterior surfaces and un-modified interior surfaces.

A solid material can be used to block holes or etched areas during surface-modification of the rest of the OA. The material is chosen to have a melting point that allows it to remain solid during all deposition and modification steps, but to be melted away from all protected surfaces after deposition at a temperature that will not adversely affect the substrate material or any coatings applied thereto. Alternately, a solid or semi-solid material can be chosen that can be dissolved by a solvent that will not affect the substrate or coatings applied thereto.

For example a waxy material like polyethyleneglycol (PEG) can be easily selected that has the required melting temperature ranges for low-temperature deposition processes, since PEG is available in a large variety of molecular weights giving it a large range of melting points. The PEG or other such material can be solidified in the OA holes or etched areas of substrates after flowing a liquid phase of the material into necessary areas. Reusable masks can be used to prevent exposure of the exterior surfaces.

One method is to stack a large number of OA plates together such that all through-holes align and the group is tightly held together. Submerging in a liquid phase of a blocking material then fills all of the holes continuously while exposing only the exterior surfaces of the OA plates on each end of the stack ("masks") and the outside edges of each of OA plate which are unimportant. Then the stack can be disassembled and the OA plates subsequently coated. After coating, the plates are heated and the blocking material melts and is removed.

Another method is to coat the entire OA plate, including the holes, with a PEG-type material or a low melting point metal (e.g. gallium and its alloys). Then, the exterior surfaces are sanded, scraped, lapped, polished, ground or otherwise mechanically treated to remove the blocking material from those areas and the OA plates subsequently coated. After coating, the plates are heated and the blocking material melts and is removed.

Depending on the reaction rates, the deposition process could be performed at low temperature (at or below room temperature) where the material blocking the channels is solid. Raising the temperature post-deposition will cause the blocking material to become liquid for removal from the channel.

Masking/Blocking/Protecting of Some or all of the Surface Prior to Deposition:

In some embodiments, a mask can be used to prevent the surface-modifying agent from affecting the exterior surface during deposition and coating of the OA holes or etched areas. For example, a mask is used during manufacture of the OA plates themselves. By not stripping this mask during manufacture of the OA plate, the mask will still be bonded to the OA plate and provide protection of the exterior surfaces during surface-modification of the etched areas or OA holes.

Alternatively, on OA plate can be used to block exterior surfaces of other OA plates by simply placing it atop the other. 2 OA plates could be used to make a "sandwich", with a target plate between two other plates used as masks. The exterior plates could be reused many times.

Examples of the usefulness of blocking include: masking/blocking/protecting of some or all holes or etched areas after uniform deposition and prior to etching/dissolving/modifying/destroying surface coating; masking/blocking/protecting of some or all of the surface after uniform deposition and prior to etching/dissolving/modifying/destroying holes' surface coating.

Another embodiment discloses the use of force-loading to fill holes with a material that contains a surface-modifying agent, while allowing the exterior surface to be unchanged. One technique is to force-load liquid containing a surface-modifying agent into holes or etched areas through the use of liquid exchange with ethanol (a lower surface energy fluid). It is also possible to force-load the etched areas or holes through the use of vacuum or momentum. For example, holding an OA plate in a stream of liquid containing surface-modifying agents allows the holes to be loaded while keeping the exterior surfaces dry.

In other embodiments, the surface-modifying agents can be echants (such as a base to remove any present coating), oxidants (to modify the present coating), or other chemicals that allow addition to or modification of the surface chemistry.

Moreover, an OA plate can be used to block exterior surfaces of other OA plates by simply placing it atop the other. 2 OA plates could be used to make a "sandwich", with a target plate between two other plates used as masks. The exterior plates could be reused many times.

For example, a masked OA could be exposed to uv-radiation of wavelength less than 200 nm in the presence of ozone. Systems are available from Ushio America, Inc. that generates uv of 172 nm wavelength. The action of the energetic photons and the oxygen singlet and triplet molecules can destroy most organic bonds allowing removal of the surface coating in the interior of the OA holes or the etched areas of a substrate.

Masked UV Initiated In Situ Polymerization to Selectively Coat the Planar Non-Etched and Through Hole Surfaces Using a Photo-Reactive Film The planar non-etched and etched areas of the open array can be uniformly coated with a photo-reactive material by treating the surfaces with a vinyl-terminated silane, for example, then force load the through holes with a PEGylated monomer such as Polyethylene glycol 400 monoethylether monomethacrylate (PEGMA), for example, to grow a PEG layer by in-situ polymerization under UV light at 360 nm of wavelength in the presence of a photo initiator such as MEN or TENTED and using a photo-mask such as a second OA, to protect the planar surface from UV radiation. Alternatively, the polymerization could be carried out using an appropriate thermo-initiator.

After the internal surface of the open array is polymerized and blocked-terminated, the planar non-etched surface can be selectively reacted with a hydrophobic monomer such as 10—heptadecafluorodecyl acrylate by in-situ polymerization by immersion in a solution containing the monomer and appropriate photo or thermo-initiator.

Coating of the Planar Non-Etched Surface of the Open Array by Contact Printing or Stamping Stamping or contact printing is another approach for differential coatings of the planar and through-hole surfaces in an open array. In this approach, a series of stamping and solution-phase modifications are applied to achieve differential coatings. First, a polydimethylsiloxane pad PDMS is pretreated with a hydrophobic silane derivative such as octadecyltrichlorosilane OTS, for example, and brought into contact with both sides of the OA. This step coats exterior surfaces of through-holes with a hydrophobic film. Then, the whole chip is exposed to multiple solution-phase reactions, where interior surfaces of through-holes are first modified with a functional silane film such as vinyl, aldehyde, or epoxy terminated derivatives, and further modified to attach a polyethylene glycol (PEG) film or any other molecule of interest such as proteins, peptides or oligonucleotides. The key characteristics of this approach is that once the exterior surface is coated with a hydrophobic film by stamping, the film is not affected by a series of chemical reactions downstream targeted for modifying interior surfaces.

Non-limiting examples of a patterned substrate may be stainless steel plate having etched grooves or patterns, or a stainless steel plate having through-holes such as a microfluidic sample array (a chip). In other embodiments, the patterned substrate may be of silicon, polymeric materials, glass or any other substrate known to those of skill in the art. Various methods of differentially treating the patterned substrate or through-hole array plate may include a series of treatments and reactions. The series of treatments in various embodiments in accordance with the presently claimed invention may involve inspection; labeling for tracking during processing; cleaning; coating of the planar non-etched and/or through-hole substrate surface with a first reagent; treating the through-hole and/or non-etched surface with a reagent that activates or modifies the surface for later treatment by producing reactive groups on the etched or through-hole surfaces; treating the etched or through-hole surfaces with a reagent different from that used to treat the planar non-etched or non-holed surface of the substrate; additional treatment of the etched or through-hole surface to prevent reaction with reagents which may be used in later treatments; coating the planar non-etched or non-holed surface of the substrate with a second reagent that either adsorbs or chemically reacts with the first reagent on the non-etched or non-holed surface; and quality control tests.

A particular embodiment may first uniformly coat the non-etched or non-holed (and the through-hole) surface by treating with a functional and hydrophobic silane derivative such as vinyl-terminated silane, for example, then selectively oxidize the etched or through-hole surfaces by first (force) loading with a low surface tension-aqueous phase miscible solvent such as ethanol followed by loading by mixing of a oxidant such as a permanganate solution, for example, of 5 mM $KMnO_4$ and 19.5 mM $NaIO_4$ in deionized water. Other oxidizing agents may include but are not limited to dichromates and peroxides. This type of chemical modification is done by incubation in a nonreactive oil or liquid such as a perfluorinated alkane solution for 2 hours, then PEGylation (covering with polyethylene glycol or molecules bearing PEG moieties) of the selectively oxidized etched or through-hole surface is done followed by re-loading of the etched or through-holed surface with additional protecting PEG, with a final coating of the non-etched or non-holed surface accomplished by treatment with perfluorosilane using vapor-phase deposition.

Alternatively, the initial coating of the non-etched or non-holed planar surface (it should include the internal surface) of the substrate may be done using liquid phase vinyl deposition with 7-octenyltrichlorosilane or 10-undecenyltrichlorosilane, for example. The PEGylation may alternatively be performed using various PEG-silane derivatives, such as linear, branched or dendritic PEGS. Some examples include methoxy-PEG of various MW, bifunctional PEG derivatives, and star-PEG. Also, aldehyde, epoxy, and carboxylic silane derivatives may be used as an alternative first coating of the non-etched and/or etched surface of the substrate. This allows PEGylation of the etched or through-hole surface without selective oxidation by controlling parameters such as pH and reagent concentration. Other PEGylation methods include the use of longer PEG molecules, such as methoxy-PEG-amine MW 5000 in place of silane-PEG coatings of lower molecular weights. In addition, the PEG within the PEGylated etched or through-hole surfaces may be cross-linked using hyperbranched PEG and PEI molecules and appropriate cross-linker molecules.

In such embodiments, the etched or through-hole surface is treated with a reagent to expose functional group A, followed by exposure to a solution containing a PEG having a terminal functional group B that is reactive with functional group A. The solution may also contain PEG having a terminal functional group A, and may contain a catalyst or activator that facilitates reaction between functional groups A and B to form a covalent bond—i.e., cross-links.

For example, the etched or through-hole surface may be treated to expose a carboxylic acid moiety. A solution is then prepared with, for example, a 6-arm PEG terminated with —$NH_2$ and a PEG terminated with —COOH, and may also contain EDC (1-ethyl-3-[3-dimethylaminopropyl]carbodiimide hydrochloride). The carboxylic acid-containing etched or through-hole surface is then exposed to the solution of PEGs and catalyst, and if necessary, the solution may be dried on the etched or through-hole surface and incubated at high temperature to improve the yield of cross-linking between the amine and carboxylic acid groups.

Other embodiments may uniformly coat the non-etched non-holed planar surface with a film exposing an epoxide group. After treatment with ammonia gas to open the ring and expose hydroxyl and amine groups, a solution of PEG bearing amine-reactive and/or hydroxyl-reactive functional groups is force-loaded into the etched or through-hole surfaces and incubated as described above, followed by standard batch coating of the non-etched or non-holed planar surface with a second reagent to achieve differential coating of the final substrate.

PEGylated etched and through-hole surfaces created neutral hydrophilic surfaces. Alternatively, specific bio-reactive surfaces may be created by treating the etched or through-hole surfaces with reagents such as biotin-streptavidin reagents, antibodies, proteins, nucleic acid probes, small molecules, or promoters of cell-adhesion to create surfaces capable or reacting with specific antibodies, molecules or cells of interest.

Figure 16:
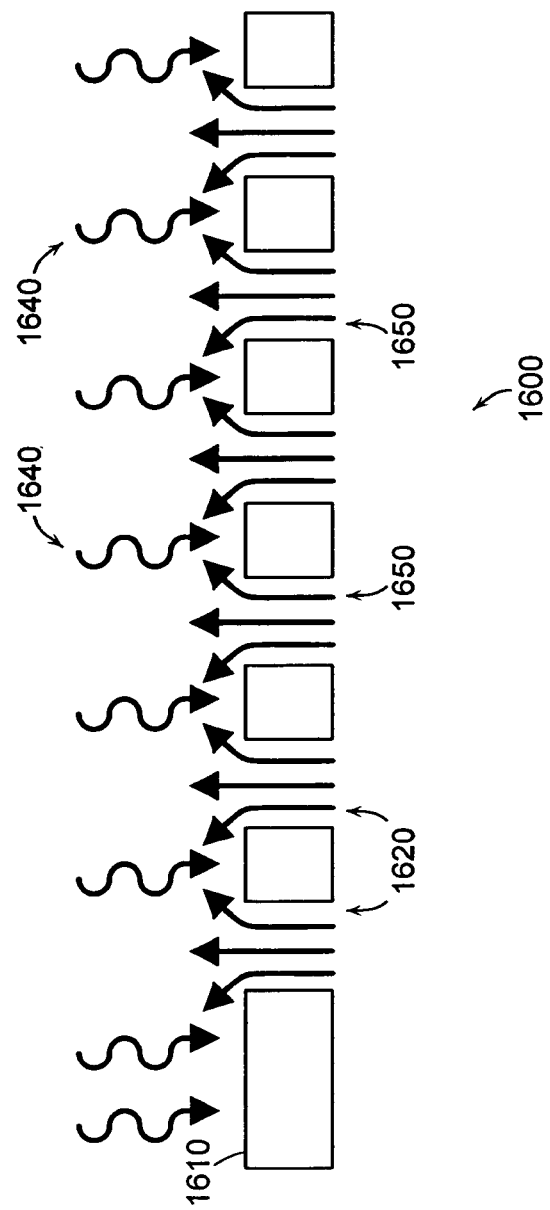
FIG. 16 shows a depiction of one way to differentially coat a device in accordance with an embodiment of the invention, wherein uni-directional flowing fluorosilane gas is used to coat an exterior surface of the device, and opposite-flowing $N_2$ is used to protect the channels.

As can be seen in the embodiment depicted in FIG. 16, a vaporized coating material such as a silane 1640 flows from the top and coats the upper external surface 1610 of the substrate 1600. From below, an inert gas 1650 such as $N_2$ flows through the channels 1620 to protect them from the silane, thus differentially coat a device in accordance with an embodiment of the invention, wherein uni-directional flowing fluorosilane gas is used to coat an exterior surface of the device, and opposite-flowing $N_2$ is used to protect the channels.

Figure 17:
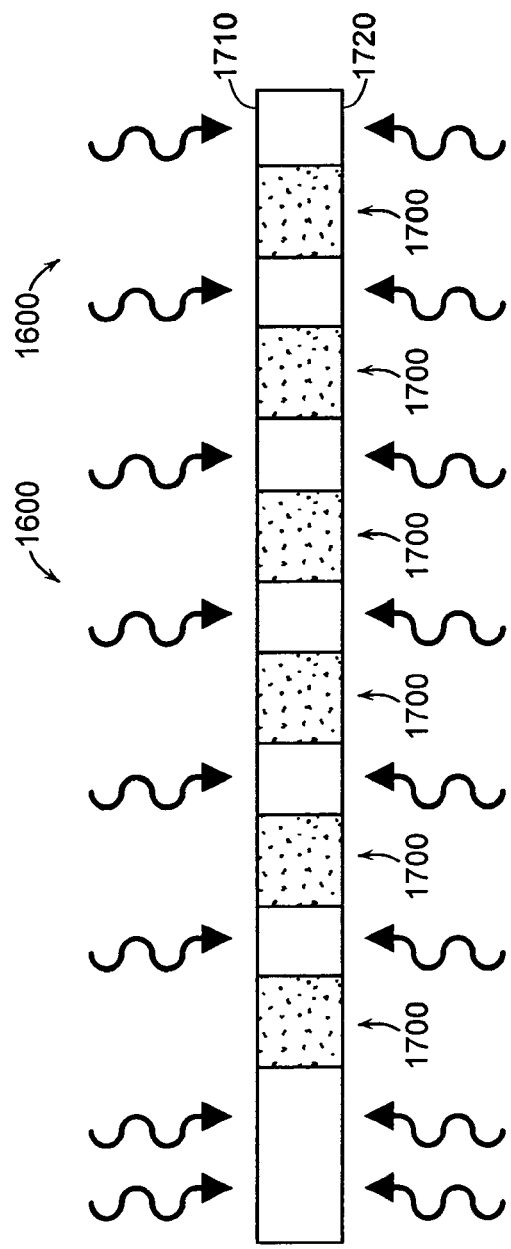
FIG. 17 shows a schematic of an alternative way to differentially coat a device in accordance with an embodiment of the invention, wherein bi-directional flowing fluorosilane gas is used to coat two exterior surfaces of the device, such that the channels are protected from the silane coating agent by a wax, which is dissolvably removed later by melting.

A similar embodiment is seen in FIG. 17, wherein bi-directional flowing silane gas 1600 is used to coat two exterior surfaces 1710 and 1720 of the device, and the channels are protected from the silane coating agent by a wax 1700, which may be dissolvably removed later by melting or heating.

Figure 18:
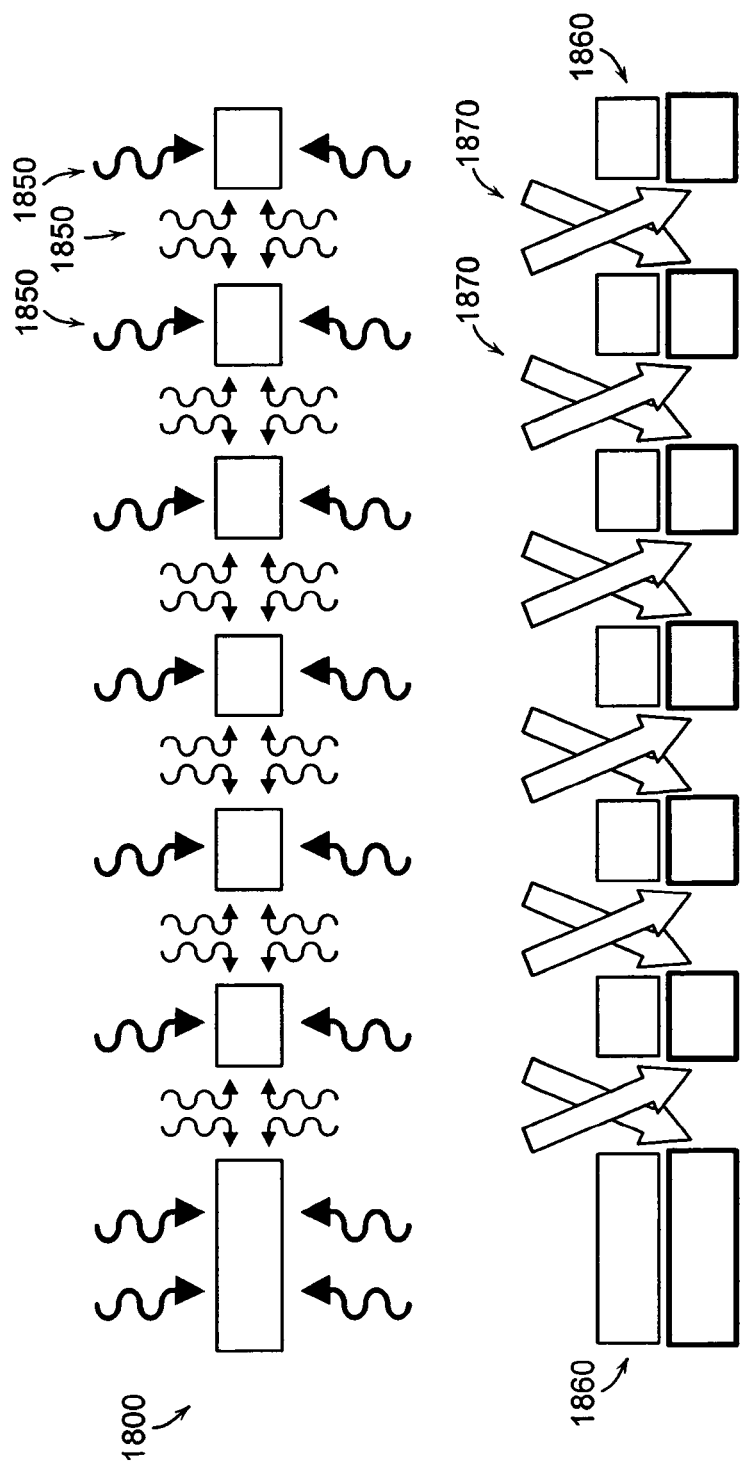
FIG. 18 shows another a way to differentially coat a device in accordance with the present invention, wherein the entire device, including the plurality of nano-volume channels, is first coated with a hydrophobic film—fluorosilane in this case—followed by blocking or masking of on external surface, such that treatment with UV light strips the silane from the channels but not the masked/blocked external surface.

FIG. 18 shows another a method for differentially coating a device in accordance with the present invention, wherein the entire device 1800, including the plurality of nano-volume channels, is first coated with a hydrophobic film 1850—fluorosilane in this case—followed by blocking or masking of one external surface 1860, such that treatment with UV light 1870 strips the silane from the channels but not the masked/blocked external surface 1860.

Figure 19:
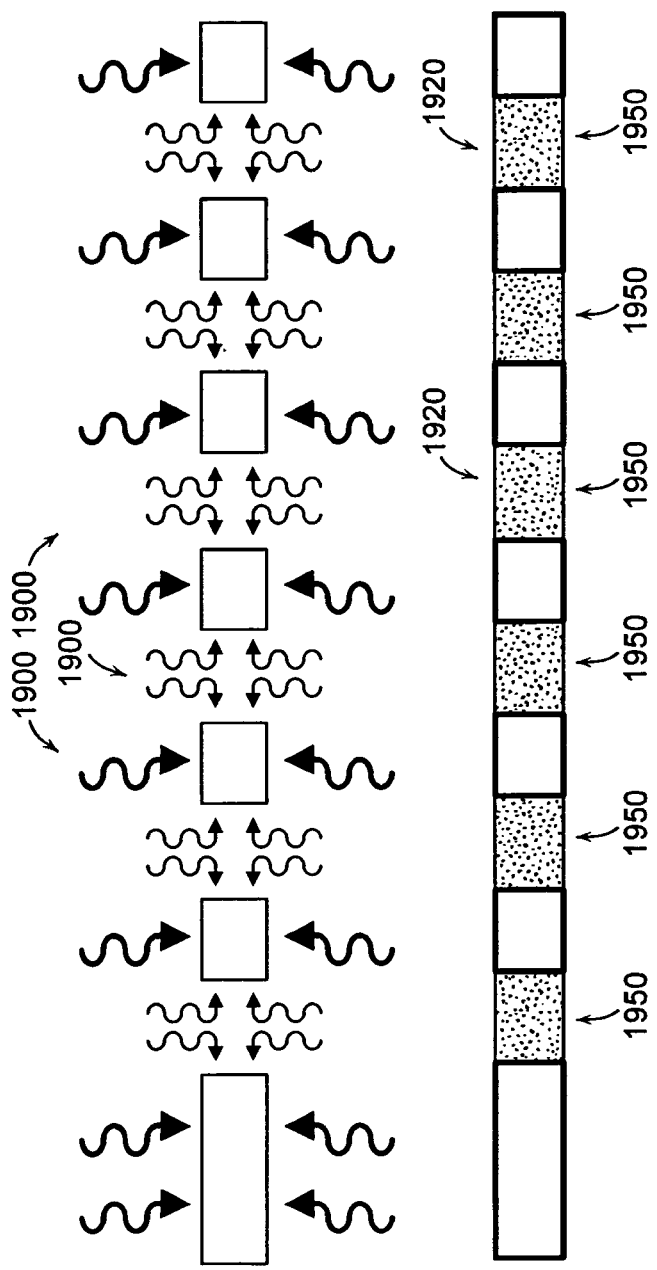
FIG. 19 shows a schematic of a method for differentially coating a device in accordance with the present invention, wherein the entire device, including the nano-volume channels, is first coated with a hydrophobic film, such as fluorosilane, as depicted here. The channels are then subjected to an etching/modifying agent such as strong base, which selectively removes the hydrophobic film from the nano-volume channels.

FIG. 19 shows a schematic of yet another method for differentially coating a device in accordance with the present invention, wherein the entire device, including the nano-volume channels, is first coated with a hydrophobic film 1900, such as fluorosilane, as depicted here. The channels 1920 are then subjected to an etching/modifying agent 1950 such as strong base, which selectively removes the hydrophobic film from nano-volume channels 1920.

Figure 20:
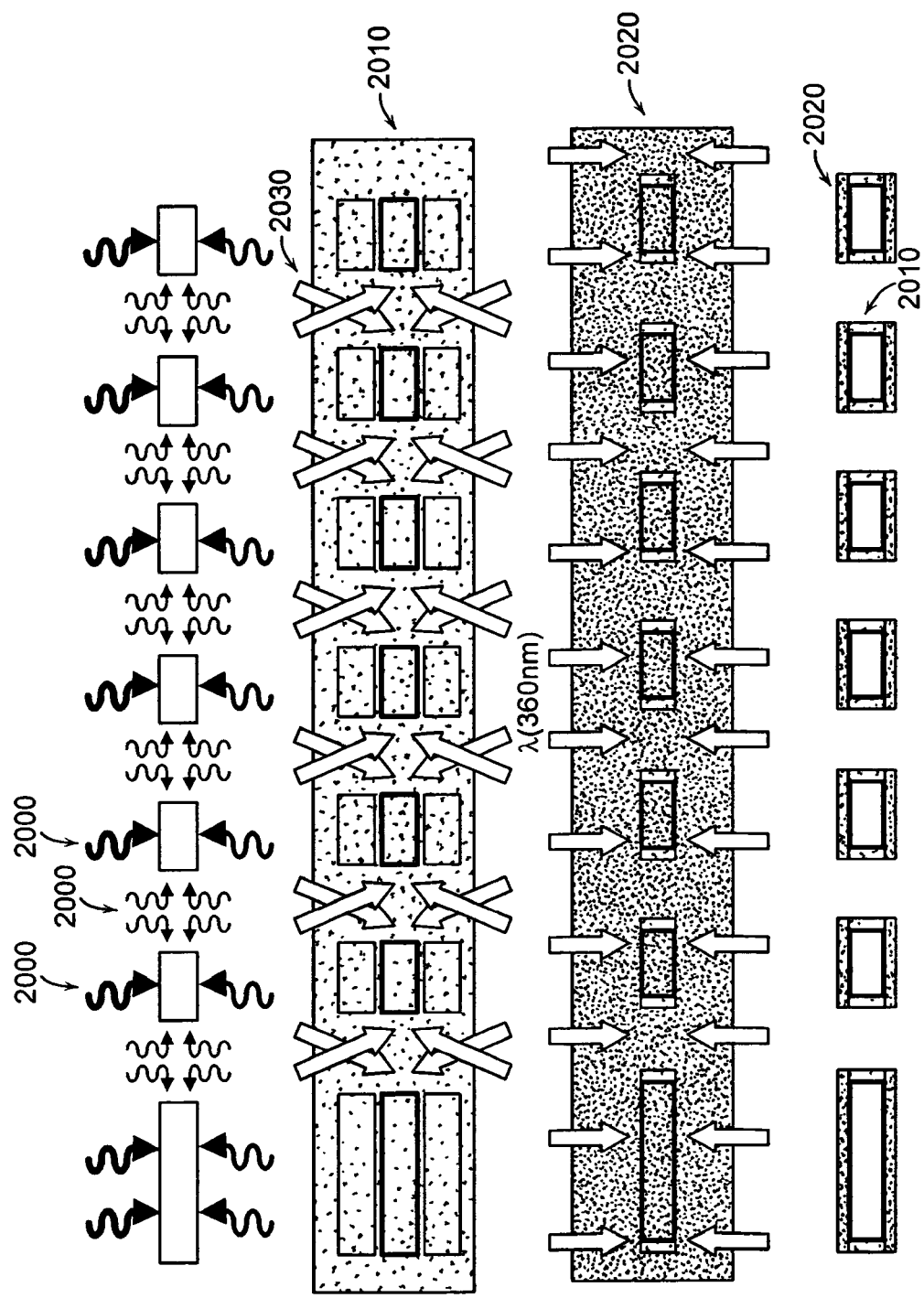
FIG. 20 depicts yet another way to differentially coat a device in accordance with the present invention, wherein the device is completely coated with a reactive film, in this case a reactive silane, after which first a hydrophilic and then second a hydrophobic film are applied on the channel and external surfaces, followed by selective removal of the hydrophilic and second hydrophobic layers by subjecting the device, particularly the nano-volume channels, to 360-nm light which catalyzes the release of the hydrophilic and subsequent hydrophobic layers from the surface of the channels, leaving only the original hydrophilic layer in the channels, and the other layers on the external surfaces.

FIG. 20 depicts yet another way to differentially coat a device in accordance with the present invention, wherein the device is completely coated with a reactive film 2000, in this case a reactive silane, after which first a hydrophilic 2010 and then second a hydrophobic film 2020 are applied on the channel and external surfaces, followed by selective removal of the hydrophilic and second hydrophobic layers by subjecting the device, particularly the nano-volume channels, to 360-nm light 2030 which catalyzes the release of the hydrophilic and subsequent hydrophobic layers from the surface of the channels, leaving only the original hydrophilic layer 2010 in the channels, and the other layers 2020 on the external surfaces.

Figure 21:
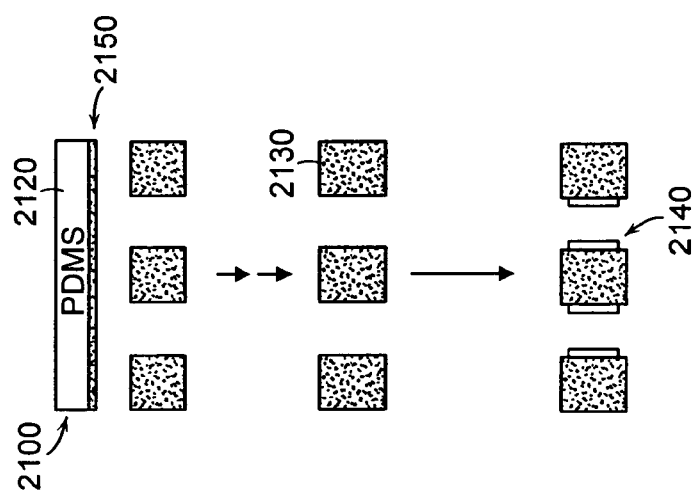
FIG. 21 shows a method for differentially coating a device using contact printing or stamping methods, in accordance with embodiments of the invention, wherein a printing pad or stamp pad of coated with a first hydrophobic agent namely polydimethylsiloxane (PDMS), then layered with octadecyltriclorosilane (OTS). By contacting the device with the OTS-layered printing pad, at least one external surface of the device is coated with the OTS, thus allowing controlled application of compounds to the external surfaces of the device, such as OTS in from the printing pad to the device, after which the internal surfaces of the array device may be modified using reagents such as aldehyde-terminated silane and amine-terminated polyethylene glycol (PEG); and carboxyl-terminated PEG+amine-terminated PEG.

FIG. 21 shows a method for differentially coating a device using contact printing or stamping methods in accordance with embodiments of the invention, wherein a printing pad or stamp pad 2100 is coated with a first hydrophobic agent 2120 namely polydimethylsiloxane (PDMS), then layered with octadecyltriclorosilane (OTS) 2150. By contacting the device with the OTS-layered printing pad, at least one external surface 2130 of the device is coated with the OTS, thus allowing controlled application of compounds to the external surfaces of the device, such as OTS in from the printing pad to the device, after which the internal surfaces 2140 of the array device may be modified using reagents such as aldehyde-terminated silane and amine-terminated polyethylene glycol (PEG); and carboxyl-terminated PEG+ amine-terminated PEG.

Figure 22:
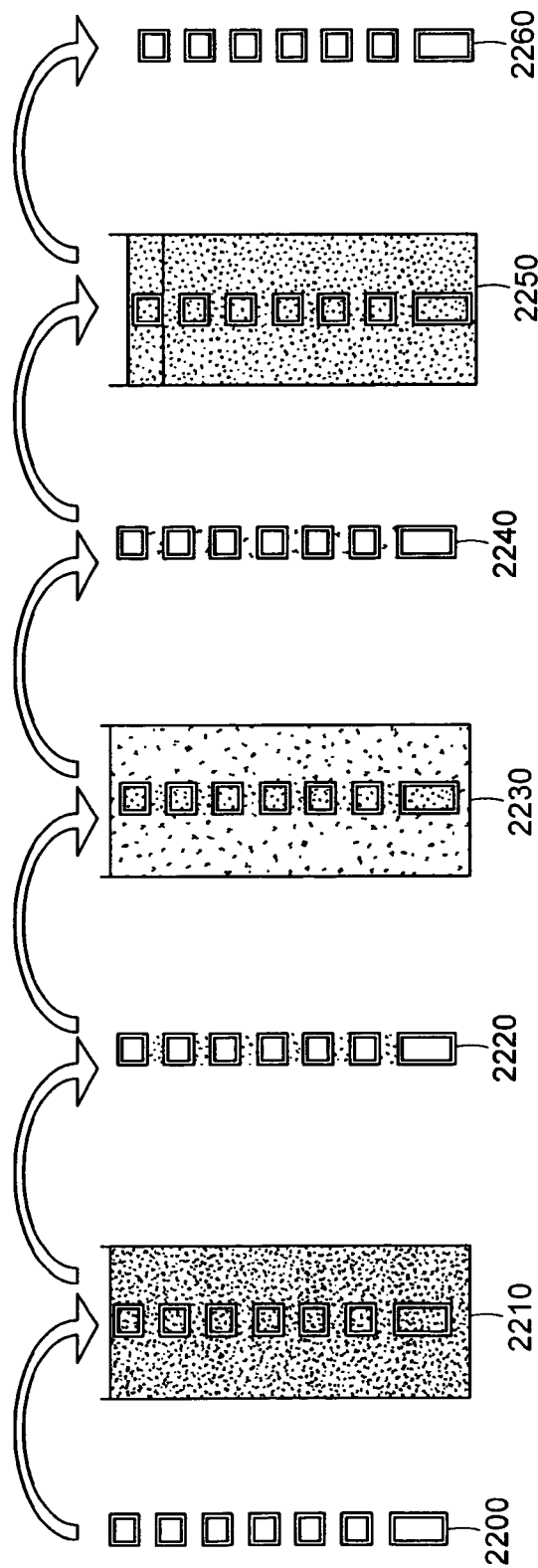
FIG. 22 shows the use of forced loading to load channels in a hydrophobically coated device with ethanol, a lower energy (surface tension) solvent, followed by immersion of the ethanol-loaded device with an aqueous solution, the lower surface tension ethanol "pulling" the higher energy (surface tension) water into the nano-volume channels, after which the device may be dipped in an aqueous solution to exchange water for aqueous reagents, thereby enabling chemical reactions to be conducted in the nano-volume channels as the device is incubated in oil, for example
Figure 23A:
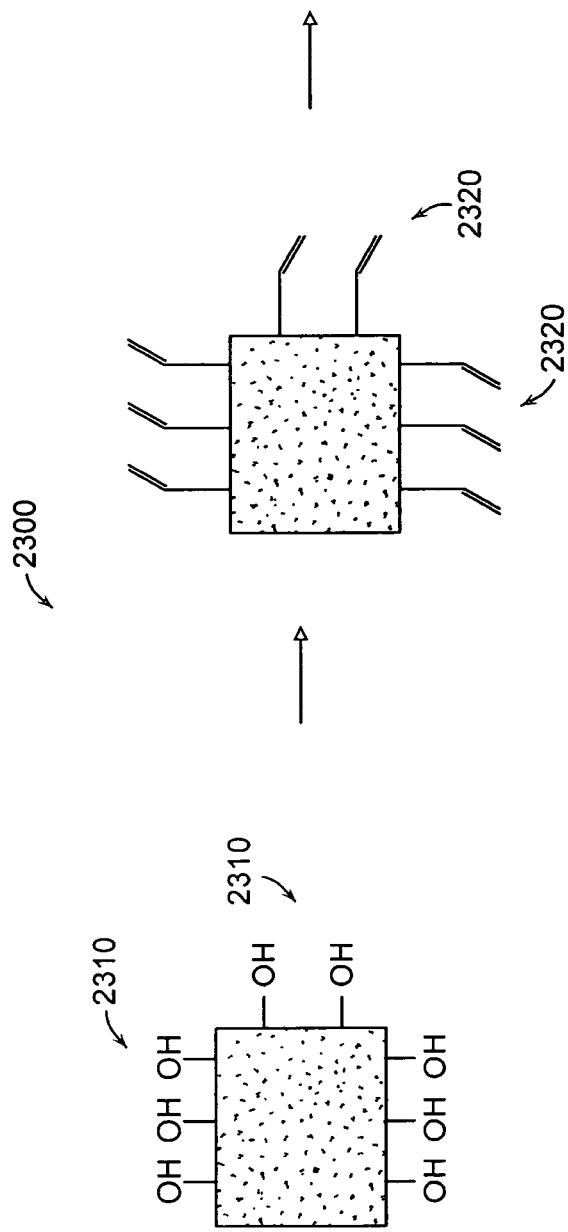
FIG. 23A shows the initial steps of a process for differentially coating the surfaces of a patterned substrate in accordance with an embodiment of the presently claimed invention.
Figure 23B:
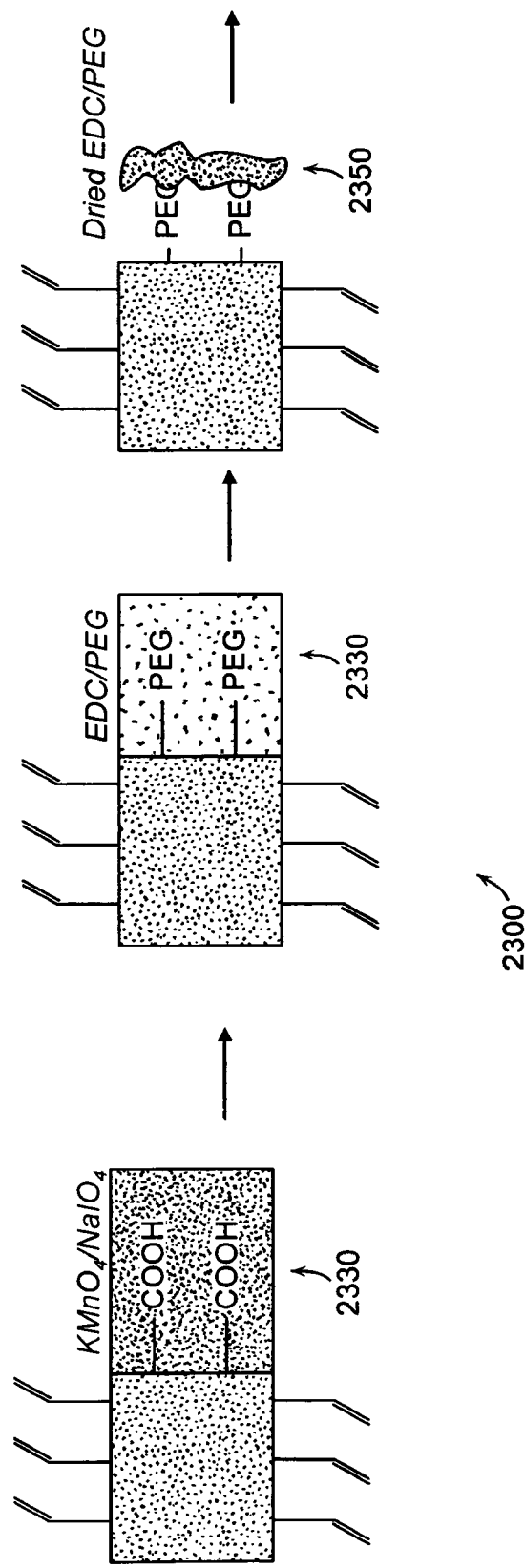
FIG. 23B shows several additional steps of the same process for differentially coating the surfaces of a patterned substrate in accordance with an embodiment of the presently claimed invention.

FIG. 22 shows the use of forced loading to load channels in a hydrophobically coated device 2200 with ethanol 2210, a lower energy (surface tension) solvent to force load the channels 2220 followed by immersion of the ethanol-loaded device with an aqueous solution 2230, the lower surface tension ethanol "pulling" the higher energy (surface tension) water into the nano-volume channels 2140, after which the device may be dipped in an aqueous solution 2250 to exchange water for aqueous reagents yielding a hydrophobically coated substrate loaded with hydrophilic reagent 2260, thereby enabling chemical reactions to be conducted in the nano-volume channels as the device is incubated in oil, for example FIGS. 23A and 23B show a process for differentially coating the surfaces of a patterned substrate in accordance with an embodiment of the presently claimed invention. in FIG. 23A, the substrate 2300 is originally treated so that all exposed surfaces are activated with an active compound 2310 after which the all substrate surfaces are modified with an active hydrophobic component 2320.

In FIG. 23B additional steps of the process can be seen, wherein an oxidizing agent selectively oxidizes the interior surface 2330 of the substrate after which the inner surface is selectively modified with a hydrophilic agent 2340. At this point, the inner surface is coated with additional agent hydrophilic agent 2350 and dried.

Figure 23C:
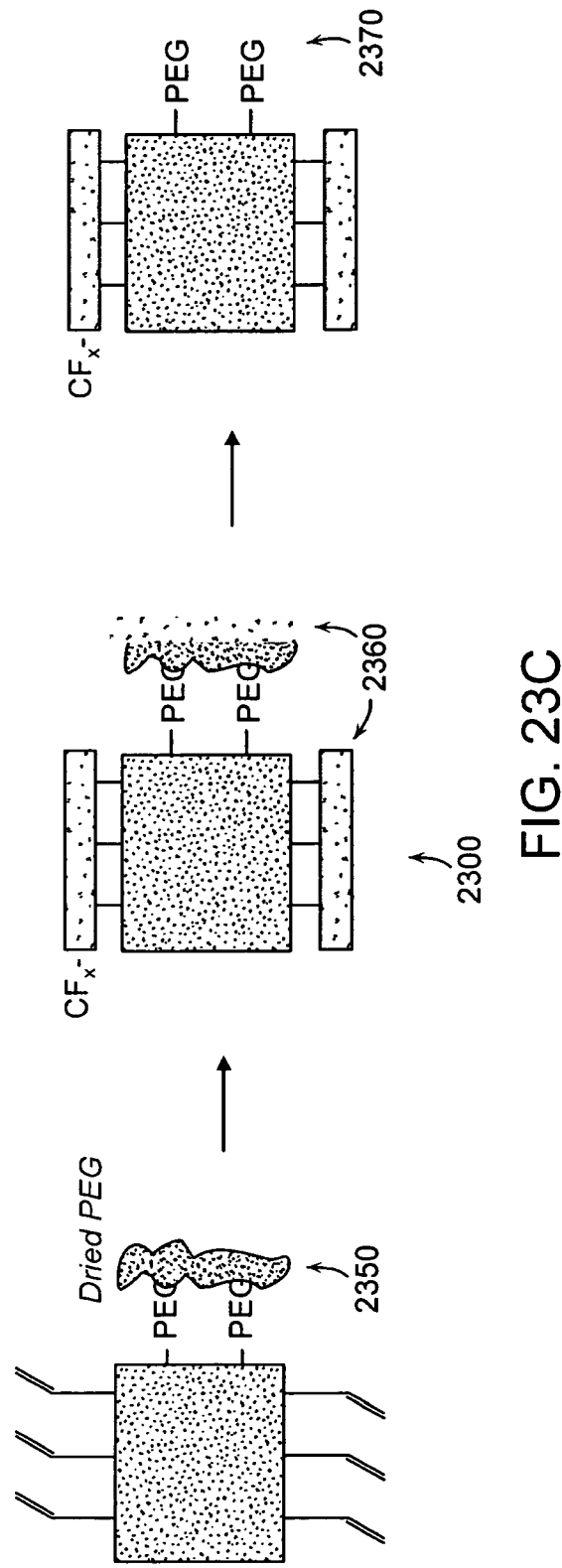
FIG. 23C shows three later steps of the same process for differentially coating the surfaces of a patterned substrate in accordance with an embodiment of the presently claimed invention.

FIG. 23C shows the final steps of the process wherein the selectively coated interior surface 2350 is coated with a hydrophobic coating agent 2360 after which the sustrate 2300 is rinsed with the hydrophobic coating agent, selectively rinsing off from the interior surface all coatings not chemically bound leaving only bound hydrophilic agent 2370.

FIG. 24A is a simplistic depiction of an autoloading device 2400, used to selectively modify or coat surfaces of differentially coated devices 2420, showing how a solvent 2430, flowing in from the bottom, pushes the modifying or coating agent 2440 up in the chamber, thereby loading the nano-volume channels.

Figure 24B:
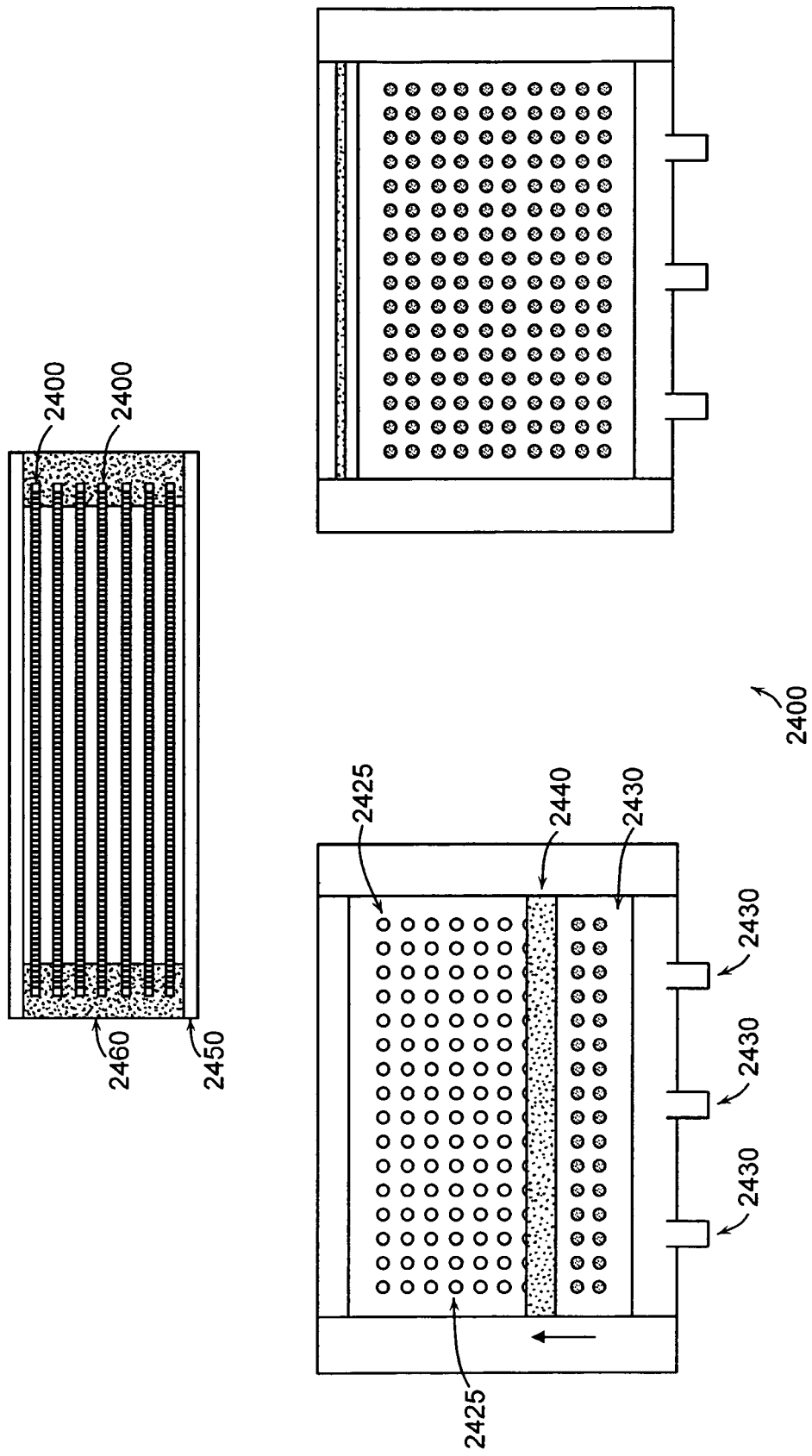
FIG. 24B is another view of the same autoloading device and chamber, wherein multiple platen are shown held within the autoloading chamber by grooves in the walls of the autoloading chamber.

FIG. 24B is another view of the same autoloading device and chamber, wherein multiple platen 2420 are shown held within the autoloading chamber by grooves 2460 in the walls of the autoloading chamber 2400.

Figure 25:
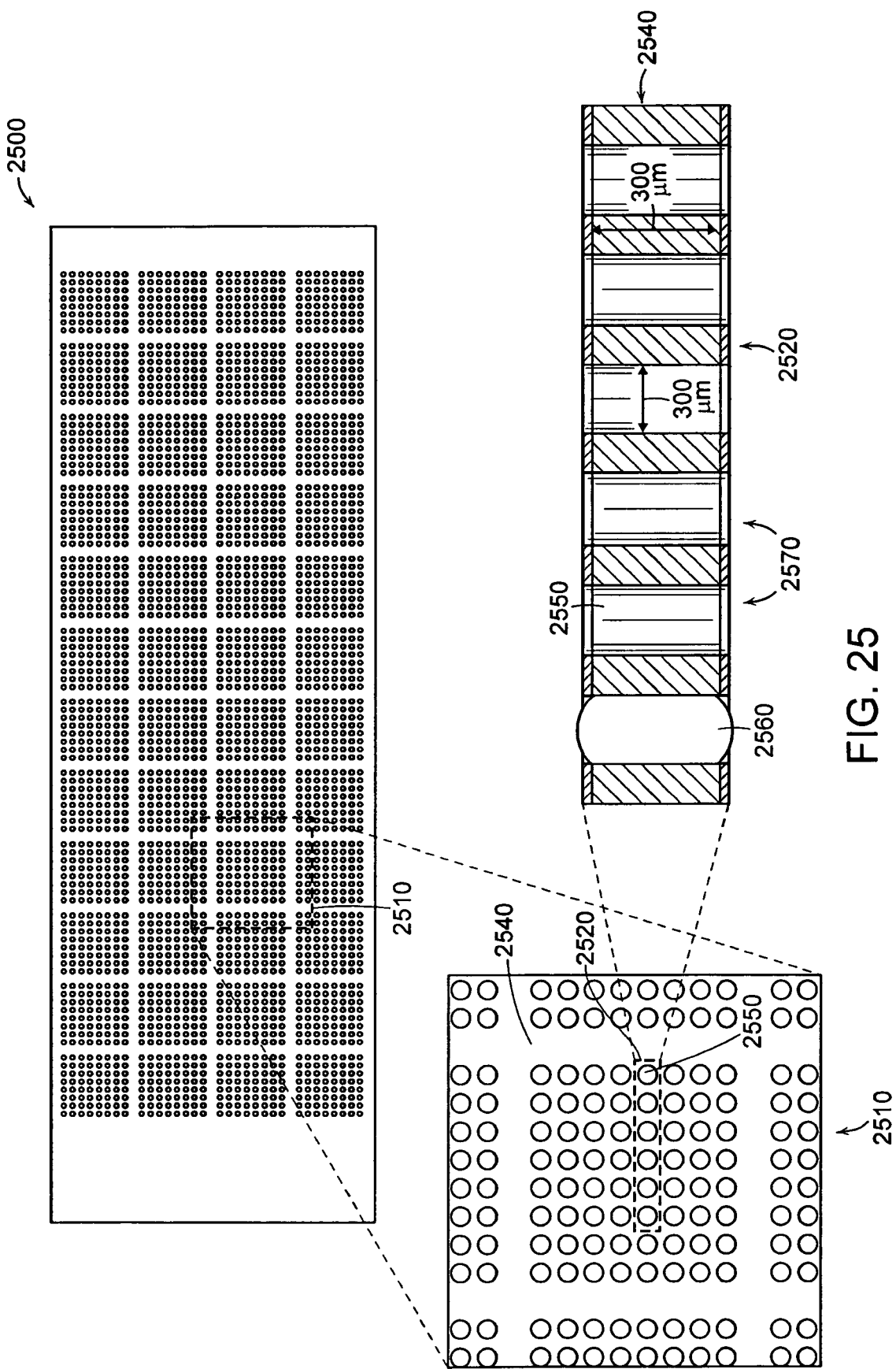
FIG. 25 shows an array in accordance with the present invention, wherein one section of the array is enlarged as an inset, lower left, and a single row of that section of the array is enlarged yet again as another inset (lower right) showing a cross-sectional view of a row of channels or through-holes in the array, with a blocked of loaded channel depicted on the left of the row inset, and five other empty channels, displayed in cross-section, visible to the right of this inset.

FIG. 25 shows an array 2500 in accordance with the present invention, wherein one section of the array is enlarged as an inset 2510, lower left, and a single row of that section of the array is enlarged yet again as another inset 2520 (lower right) showing a cross-sectional view of a row 2540 of channels or through-holes 2550 in the array, with a blocked or loaded channel 2560 depicted on the left of the row inset, and five other empty channels 2570, displayed in cross-section, visible to the right of this inset.

In various embodiments, the disclosed system and method may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

In order to produce an OpenArray™ Chip for performing biological assays, a chip substrate, or a plate with holes, must be differentially coated. The current design of the chip is slightly smaller than a microscope slide in outer dimensions, but is only 300 µm thick. It has 3072 vias or holes in it, each 300 µm in diameter on a 500-µm pitch. In addition, the coating process must be applicable to other size chips, such as our 25,000-hole chip, as well as higher density (smaller hole) chips.

The exterior surfaces of the chip substrate is preferably hydrophobic, while the interior surfaces of the through-holes is preferably hydrophilic and compatible with a specific assay run inside through-holes. Hydrophobicity of exteriors prevents any crosstalk between the filled through-holes by maintaining a solution within the holes, and also inhibits any adsorption of organics on the surface of the chip during sample introduction. The hydrophilic coating of interiors of the holes enables instantaneous and spontaneous loading of ~30 nL volume into the holes upon loading. In addition, the interior coating needs to be biocompatible as well as hydrophilic because miniaturized biological assays run in the holes can be affected by the surface in such high surface-to-volume environment. In other applications, the chemistry of the interior of the wells must be flexible so that the surface of the holes can be functionalized to bind molecules of interest to the surfaces.

Substrates

Originally, the feasibility of this technology was demonstrated with silicon and glass as substrates. Both materials can be processed using photolithographic techniques resulting in fine control of features such as the holes needed for Thru-Holerm technology. Also, the coating chemistry necessary for performing biological assays in glass is well-known, and these chemistries are applicable to silicon as well. Both silicon and glass substrate chips can be coated satisfactorily for biological assays. However, there are problems with both.

Stainless steel is an attractive material for disposable microfluidic-based chips thanks to low material cost and readily available inexpensive fabrication processes. One of the major challenges in employing stainless steel for producing a microfluidic chip for biological applications is the control of its surface properties. Through surface modification with molecular-level thin films, stainless steel chips with differential hydrophilic and hydrophobic surfaces and specific biologically active surfaces are produced, as desired.

In developing a coating process for stainless steel chips, two major hurdles were overcome: understanding and control of steel surface properties and differential coatings for exteriors and interiors of through-holes. The coating processes disclosed herein provide solutions to such challenges and provide steel chips of consistent and reliable quality of coating. In addition, the process is highly compatible with scale-up in manufacturing and the production throughput can be readily increased with minimum amount of instrumentation and additional labor.

Coating Background

Many methods for applying differential coatings to chip substrates have been attempted. Originally, the methods were variations of a vapor phase deposition of perfluorinated hydrocarbon silanes. Some of these methods were vapor phase deposition of the hydrophobic silane with:

The holes protected by flowing gas through the holes and keeping the silane from entering the holes The holes protected by a waxy substance that was later dissolved away.

The holes coated with silane but subsequently stripped by using a mask and high energy uv light in the holes The holes coated with silane but subsequently stripped by using dip loaded chemistry Batch coating processes for a stainless steel chip employ novel combinations of surface modification and microfluidic phenomena. The process is composed of a series of vapor- and solution-phase surface reactions. Notably, some of the solution-phase reactions in the process are localized within through-holes by taking advantage of microfluidic phenomena, which enables differential coating.

Differential Coating Using Stamping Methods

Stamping works well for differential coatings of exteriors and interiors of through-holes in a chip. In stamping, a series of stamping and solution-phase modifications were applied to achieve differential coatings. First, a polydimethylsiloxane (PDMS) pad was pretreated with hydrophobic silane such as octadecyltriclorosilane (OTS) and brought into contact with both sides of a chip. This step coats exterior surfaces of through-holes with a hydrophobic silane film. Then, a whole chip is exposed to multiple solution-phase reactions, where interior surfaces of through-holes are first modified with a vinylsilane film and further functionalized to attach a polyethylene glycol (PEG) film. The key characteristics of this approach is that once the exterior surface is coated with a hydrophobic silane film by stamping, the film is not affected by a series of chemical reactions downstream targeted for modifying interior surfaces. Differential coating via stamping was simple and straightforward for bench-level practice.

Different Exterior Coating on Opposite Sides of the Through-Hole Platen

A preferred embodiment of the differentially coated through-hole platen is to make the exterior coating on one surface of the platen functionally different from the exterior coating on the opposite surface and, furthermore, both exterior coatings are functionally different from the coatings on the interior surfaces of the through-holes.

One example of this embodiment is an exterior coating to facilitate liquid transfer between two through-hole plates spatially registered to align the through-holes and brought into contact with each other. One surface of the plate is coated with a pressure-sensitive adhesive whilst the opposite face is coated to be hydrophobic. There are fiduciary marks on the platen to aid the alignment of the through-holes between two or more platens. The surface of at least two platens are aligned relative to the fiduciary marks and brought into contact such that the adhesive surface contacts the hydrophobic surface. If the through-holes of one platen are empty and the other filled with fluid, fluid is transferred from one platen to the other. Otherwise, fluid in the opposing through-holes mix when the platens are brought into contact. Curing of the adhesive results in the bonding of the two platens, forming a unitary structure. The application of this method would include addition of reagents in one platen to samples in a second platen. Bonding the two platens together simplifies subsequent processing steps like washing, incubation or addition of another platen containing another set of reagents.

Description of Current OpenArray Device and System

The present system is developed for nanoliter PCR, called the OpenArray™ system, and is based on a rectilinear array of 3072, thirty-three nanoliter through-holes in a stainless steel platen the size of a standard microscope slide (25 mm×75 mm). The through-holes are arranged in a pattern of 48 sub-arrays on a pitch equal to the wells in a 384-well microplate (4.5 mm) and with 64 channels per sub-array. The platen surface is chemically modified with a process to make the inside surface of each channel hydrophilic and the outside surface hydrophobic. The differential hydrophilic-hydrophobic coating facilitates precise loading (CV<2%) and isolated retention of fluid in every channel.

Workflow to implement a PCR assay follows multiple steps. Individual primer pairs are transferred with an array of 48 slotted pins manipulated by a 4 axis robot from wells in a 384 well microplate to individual channels in each of the 48 sub-arrays. This reformatting operation takes place in an environmentally controlled chamber to prevent evaporative loss. Once a platen is fully populated with primer pairs, the solvent is evaporated in a controlled manner leaving the primers immobilized in a matrix on the inside surface of each through-hole.

Next, forty-eight previously prepared samples (DNA or cDNA) are mixed with Taq polymerase mastermix (Roche LightCycler) and loaded into each sub-array (one sample per sub-array) with a 48 pipette tip-based dispensing device called the Array-in-Array. Once the sample and mastermix are loaded into each subarray, a plug of UV curable epoxy seals the array in a glass-walled case with an immiscible fluid that prevents evaporation during thermal cycling. Three encased arrays are placed on the flat block of an imaging thermal cycler (NT Cycler) programmed to thermally cycle and image the arrays according to a programmed real time PCR protocol. For SYBR Green RT-PCR, a fluorescence image of the three arrays is acquired during the extension phase of the thermal cycle protocol. In this example, the NT Cycler is capable of performing 9,216 real-time PCR analyses, including temperature melt curves, in under three hours. For SNP genotyping with the Taqman SNP assay, multiple arrays are thermally cycled on a flat block thermal cycler and then fluorescently imaged in the NT Cycler as an endpoint measurement to determine genotype.

Software for implementing real-time PCR controls the NT Cycler, performs image analysis to extract from the image sequence SYBR Green fluorescent intensities from each through-hole at each thermal cycle and tabulates the data in a flat file for further analysis with software tools provided in the NT Cycler environment or by a third party. A sample-centric approach organizes data and displays the results of the $C_T$ calculation, copy number and melt temperature estimate for each primer pair analyzed with the system. The genotyping application uses a similar software workflow but displays correlation plots of the fluorescent signals, provides the workflow for semi-automated genotyping calling and exports the data in a flat file to a database.

Other Coatings

Liquid phase vinyl deposition with 7—octenyltrichorosilane or 10—undecenyltrichrorosilane was used to coat steel substrates. The use of vinyl silanes derivatives will replace stamping as the coating method. The vinyl terminated layer yields a hydrophobic surface with a contact angle in the range from 90 to 105 degrees. The vinyl layer can be chemically modified into more hydrophilic groups providing the functionalities for internal coatings.

Methods for PEGylating the Internal Channels

Several PEG-silanes derivatives were tested for their ability to protect the internal surface in a chip. Some examples are methoxy-PEG silane MW 2000, methoxy-PEG silane MW 500 and methoxy-PEG silane MW 10,000.

Steel Coating Using Liquid Phase Aldehyde Deposition

Triethoxysilylbutyraldehyde was used as an alternative coating method. By using an aldehyde terminated surface, PEGylation can be done in a single step. The vinyl terminated surface needs to be oxidized prior to PEGylation, which can potentially damage the external surface.

Introduction of a Longer PEG Molecule to Protect the Channels

Methoxy-PEG-amine MW 5000 was used to replace a silane-PEG 2000 coating. The acid terminated surface obtained after vinyl oxidation was modified with amine PEG using NHS/EDC chemistry.

External Surface Chemical Modification

The use of vinyl-silane deposition to modify the internal and external surface of a chip in a batch process produces a hydrophobic surface that may not pass stringent Q.C. tests in the imitation PCR buffer or WISK test. To overcome this problem several post-modification methods have been tested. Some examples are acylation of the vinyl surface with an acyl halide and a Lewis acid catalyst in what is essentially a Friedel-Crafts reaction. In this case, palmitoyl chloride can be used in the presence of aluminum chloride.

Thick Polymeric Fillings

To improve the internal surface coatings, several methods have been tested. Crosslinking PEG inside the channels using hyperbranched PEG and PEI molecules and appropriate crosslinker molecules yielded great hydrophilic channels with excellent loading.

Aldehyde—Based Batch Process

This process represents an alternative to the current vinyl batch process to remove some potential coating problems during oxidation. PEGylation of the aldehyde activated surface using a Schiff's base mechanism yields better surface coating than EDC/NHS chemistry as applied in the oxidized vinyl chemistry.

In Situ Polymerization Using a Vinyl Terminated Surface

This process employs the use of Polyethylene glycol 400, monoethylether monomethacrylate (PEGMA) to PEGylate the surface by redox initiation in the presence of AIBN.

Reversed Batch Process

This process inverts the steps in the process to minimize the effect of oxidation on the external surface. Instead of vinyl, oxidation, PEGylation and perfluoro deposition, in that order, the vinyl surface is protected first to run secondary deposition, followed by oxidation and PEGylation of the internal channels.

Surface Initiated PEG Attachment

Thiol PEG can be reacted with the vinyl terminated surface using atom transfer by a radical-based reaction in the presence of copper bromide and bipyridine as catalyst.

Novel Coatings and Methods of Forming Coatings on Substrate Including Stainless Steel Formation of Cross-Linked Polyethylene Glycol Films In this process, a surface exposes a functional group A. The surface is exposed to a solution containing a polyethylene glycol, whose end is terminated with a functional group B, which is reactive with a functional group A. The solution also contains a polyethylene glycol, whose end is terminated with a functional group A. In addition, the solution may contain a reagent that activates and/or assists the formation of covalent bonds between group A and B.

Example 1

A surface exposes a carboxylic acid moiety. A solution is prepared with 6-arm polyethylene glycol terminated with —$NH_2$ and —COOH each and (1-Ethyl-3-[3-dimethylaminopropyl]carbodiimide hydrochloride). The carboxylic acid-containing surface is exposed to the solution of polyethylene glycols. If necessary, the solution can be dried on the surface and incubated at elevated temperature to improve the yield of cross-linking between amine and carboxylic acid groups. The resulting surface should show a thick, covalently-attached PEG film.

Formation of Thick Films of Polyelectrolytes by Layer-to-Layer Adsorption

A surface is exposed to a solution of polycations and polyanions sequentially. By electrostatic attraction, a film of polycation/polyanion is formed on the surface.

Differential Coating from Hydroxyl-Terminated Surface

The exterior and interior surfaces of OpenArray chip are uniformly coated with a film exposing hydroxyl groups. Then, the chip is treated with standard batch coating process described elsewhere in the application.

Differential Coating from Epoxide-Terminated Surface

The surfaces of an OpenArray chip are uniformly coated with a film exposing epoxide groups. Then, the surface is reacted with ammonia gas to open the ring and expose both hydroxyl and amine groups. A solution of polyethylene glycol bearing amine-reactive functional groups is force-loaded into through-holes only and incubated. Then, the chip is treated with standard batch coating process for differential coating, as described elsewhere in the application.

Differential Coating from Amine-Terminated Surface

The surfaces of an OpenArray chip are uniformly coated with a film exposing amine groups. A solution of polyethylene glycol bearing amine-reactive groups is forced-loaded into through-holes for selective modification. Then, the chip is processed with standard batch coating process for differential coating, as described elsewhere in the application.

Formation of Cross-Linked Polyethylene Glycol Film Covalently Attached to a Surface A surface is modified with a reactive functional group, for example an epoxide group. A solution of polyethylene glycol bearing more than two reactive functional groups, for example epoxide groups, is brought into contact with the surface. Upon incubation, these reactive groups react to form covalent bonds to each other to result in a covalently attached and cross-linked polyethylene glycol film.

Formation of Polyethylene Glycol Film by Dendrimer Approach

A surface exposes a functional group X. A solution of PEG bearing reactive group Y is brought into contact with the surface, where the PEG reacts with the surface and still exposes many unreacted functional groups Y. Then, the surface is exposed to a solution of PEG bearing another reactive group Z (or reactive group X) for covalent bond formation and immobilization of PEG. By repeating this step, a covalently bonded PEG film can be produced.

Formation of PEG Film by Polymer Brush Approach

A surface is functionalized with a group X and reacts with polymer chains by a grafting-to method. Then, a layer of PEG chains is attached to form a polymer brush layer of PEG.

Photochemical Differential Surface Coating

Another method for creating differential surface coatings is to use photochemistry to selectively modify the interiors of the channels (the etched or through-hole surfaces) relative to the array surfaces (the planar non-etched or non-holed surfaces). To accomplish this, one must have a method for selectively accessing different regions with light and a photochemically modified layer of molecules. The most practical method for optical access is the use of a photomask. The steel chips typically have a narrow throat in the center of the through holes (a hourglass shape in cross section) thus increasing the ability for light to strike the interior surfaces.

Example 2

The chip is coated with a hydrophobic silane and a photomask is placed over the chip such that light may only access the interior of the channels. This assembly is exposed to a high energy UV light. The assembly may be subjected to a flow of oxygen to create reactive oxygen species. The combination of light and reactive oxygen cleans the exposed surfaces rendering them hydrophilic and capable of being further derivatized.

Example 3

The chip is coated with a hydrophilic silane such as a PEG silane and a set of photomasks is placed over the chip such that light may only access the exterior surfaces of the array. The array is then exposed to a hydrophobic silane to create the patterned array.

In such a process, patterned substrates of metal, particularly stainless steel chips, are created through the process of photochemically etching from both sides. This two-sided etching of the through-hole walls creates an hourglass shape for the through-holes, —when viewed in cross-section. The resulting "throat" created in the metal chip may be employed for advantage in that one may differentially react, or treat, parts of the channel interior. For example, the top half of the channel could be left hydrophobic, and the bottom half cleaned to become—hydrophilic, then optionally coated with a PEG silane. Alternately, a silane with a photoactivated linker moiety may be employed to create reactivity toward a modifying reagent. This method could be used to put capture probes such as oligonucleotides onto the array and then to place encapsulated reagents in the array such that they do not block binding of analyte to the probes.

Alternative Force Filling Ideas

In addition to use of ethanol to accomplish force-filling of the etched or through-hole surfaces, it is possibly to tightly stack hydrophobically coated chips and force reactive liquid into the etched or through-hole surfaces. In such a method, the top and bottom chip of a stacked array of chips will be sacrificed, but the rest will end up with the desired reagents successfully applied in the etched or through-hole surfaces.

Alternatively, instead of force filling with modifying chemicals, the etched or through-hole surfaces can be force filled with etching chemicals such as 1M potassium hydroxide or 1M sulfuric acid.

Example 4—Coating Autoloader

The coating autoloader is a method and device that enables filling through-holes or microwells contained within a platen with a surface modifying or coating agent or agents (the reactive fluid), and then prevents the reactive fluid from evaporating while the surface modification or coating agent/s perform their desired action. This method and device results in highly uniform loading of the reactive fluid into the through-holes or microwells while minimizing the total volume of reagent is required.

In this embodiment, a chamber is provided to contain reagent fluid and platens. In a preferred form the chamber is large enough the completely contain eight through-hole plates. For example, chambers we have successfully designed and used a chamber capable of coating 8 sheets×12 arrays/sheet to give 96 open arrays. The chamber provides grooves or other mounts to hold the plurality of plates within the chamber, such that the plates are oriented in a substantially vertical direction and such that sufficient space is provided between plate faces for liquid to flow between them and between the plate faces and the chamber walls. See FIGS. 24A and 24 B for illustrations of such a device.

At the same time, minimizing the width of the chamber within these limits reduces the volume of reactive fluid needed. The two large faces of the chamber are preferably made from a clear material such as glass, or polystyrene to permit observation of filling process. If necessary the chamber may be held in a vertical orientation by clamps or a stand. The bottom of the chamber has one or more inlet ports through which the transport fluid enters or exits.

A sufficient volume of surface modifying or coating agent or agents (reactive fluids) are introduced into the bottom of the chamber to form a thin layer. Next, an inert immiscible liquid or higher density liquid, such as mineral oil or a perfluorinated fluid, is introduced through the inlet port(s) into the bottom of the chamber below the first layer. As this 'transport' fluid is pumped into the bottom of the chamber, the rising level lifts the surface modifying or coating agent or agents layer so that it passes plates in a continuous manner. The flow of transport fluid into the chamber must be smooth and controlled in speed; a peristaltic pump connected to a baffle to reduce turbulence is a suitable means for satisfying these requirements.

The volume of reactive fluid added to the chamber must be sufficient such that after volume needed to fill all desired through-holes has been removed, enough sample fluid remains in the chamber to form a continuous layer that spans the chamber. This is done so that a continuous layer of reactive fluid is maintained at all times during the loading process. As described elsewhere, the reactive fluid will enter the microwells or through-holes either though capillary action, or by exchange with a low-surface energy fluid that has been placed into all such volumes through various force-loading techniques. As the transport fluid level rises in the chamber additional through-holes are filled with reactive fluid and then are subsequently submerged in the immiscible transport fluid.

Once the desired through-holes have been filled with reactive fluid, the excess reagents can be drawn off the surface of the transport fluid at the top of the chamber by means of suction, gravity, or capillary action. The transport fluid remaining in the chamber provides an environmental barrier between the loaded volumes of reactive fluid and the surrounding atmosphere. Thus the plates may be incubated in the chamber while the desired physiochemical modification of the surface takes place without danger of evaporation. If a transport fluid appropriate vapor pressure and or melting point is used, the chamber may even be heated or cooled to control the reaction kinetics. After incubation, the 'transport' fluid is released from the chamber, out of the port(s) in the bottom.

Advantages of this device and method are this. (1) The process and device produces highly reproducible and uniform loading of the reactive fluid into the through-holes. This results in uniform surface properties inside the through-holes. (2) The volume of reactive fluid required is minimized producing cost savings on reagents. Although much larger volumes of transport fluid is required, the properties of immiscibility and inertness allow this liquid to be reused and recycled. (3) During the loading process, the contact time between the plate exterior surfaces and the reactive agent(s) is minimized; whereas after the loading is completed the contact time between the through-hole interiors and the reactive agents can be maximized by incubating the plates in the transport fluid. And (4), the process and device are scaleable and suitable for automation.

Other methods for coating the external or internal surfaces of the platen include sputtering gold onto all the surfaces of the patterned substrate followed by derivatization with hydrophobic thiols, after which one can selectively react the derivatized etched or through-hole surfaces with hydroxyl reactive species.

In addition, variations employing a combination of the above-described processes for preparing differential coatings on patterned substrate surfaces are envisioned that fall within the scope and spirit of the presently described invention.

Thick Polymeric Fillings Multiple Layers

To improve the physic-chemical properties of the internal coatings, several methods have been tested. For instance, casting multiple polymer layers inside the channels using hyper-branched PEG derivatives or PEI for example and appropriate cross-linkers yielded a thick, multiple layer polymeric coating.

Example 5—Coating Methods for Forming Multiple Layers

Example 5A—Formation of Multiple Polyethylene Glycol Films

A surface exposes a functional group X. A solution of a branched PEG derivative bearing reactive group Y is brought into contact with the surface, where the PEG reacts with the surface and still exposes many unreacted functional groups Y. In addition, the solution could contain a reagent that activates and/or assists the formation of covalent bonds between group X and Y. Then, the surface is exposed to a second solution of a branched PEG derivative bearing another reactive group Z (or reactive group X) for covalent bond formation and immobilization of PEG. By repeating this step, a covalently bonded multiple PEG films can be produced. The process could be repeated several times until the desired physico-chemical properties are achieved.

Example 5B

A surface exposes a carboxylic acid moiety. A solution is prepared with 6-arm amine terminated polyethylene glycol and EDC (1-Ethyl-3-[3-dimethylaminopropyl]carbodiimide Hydrochloride). The carboxylic acid-containing surface is exposed to the solution of polyethylene glycol. If necessary, the solution can be dried on the surface and incubated at elevated temperature to improve the yield of reaction between amine and carboxylic acid groups. The resulting surface should show a thick, covalently-attached PEG film. The remaining amine groups could be reacted, with a second solution prepared with 6-arm polyethylene glycol terminated with carboxylic groups and EDC to generate a second polymeric layer. The process could be repeated several times until the desired physico-chemical properties are achieved.

Example 5C—Formation of Cross-Linked Polyethylene Glycol Film Covalently Attached to a Surface A surface is modified with a reactive functional group, for example an epoxide group. A solution of polyethylene glycol bearing more than two reactive functional groups, for example epoxide groups, is brought into contact with the surface. Upon incubation, these reactive groups react to form covalent bonds to each other to result in a covalently attached and cross-linked polyethylene glycol film.

Example 6 (FIGS. 24A-24C)

The stainless steel chip is supplied by a manufacturer in a format of 12 chips in 6"×6" sheet and processed as such throughout the whole coating and reformatting (addition of reagents from microplates) procedures until an individual chip is cut out for packaging. It is made of 316L stainless steel and through-holes are formed via photographic patterning and selective two-sided simultaneous etching of exposed area by chemical etchants. Upon arrival at BioTrove, sheets are checked for flatness, surface finish and array/sheet geometry using a combination of visual inspection and automated optical metrology. A sheet that does not meet specs, even if only a single chip contains a defective spot, will be identified and rejected. Whenever need arises, i.e. sheets manufactured by new process or with new stock material, sample of sheets are sent for XPS analysis to confirm elemental composition of steel surfaces. Inspection results are entered into database.

Labeling

Currently, each sheet and chip is labeled manually for tracking and record keeping. A laser bar-coder and scanner will soon be implemented for all chips to automate a tracking system. A laser bar-coder inscribes bar codes and alphanumerics on each chip and scanners read the codes and record the information at each major step in chip manufacturing. This system facilitates access to process and handling information for an individual sheet and chip, as well as provides a database link to the customer for the contents of each well in the chip.

Cleaning

Sheets are cleaned by exposure to 10% RBS® aqueous solution at 50° C. for two hours with agitation. RBS® is a basic detergent, available from Bacto Laboratories Pty LTD, containing non-ionic and ionic surfactants and widely used in cleaning glass substrates. Cleaned sheets are rinsed in NaCl salt solution and deionized (DI) water bath sequentially followed by a cascade rinsing in counterflow. This method of cascade rinsing consists of a series of rinse tanks which are plumbed to cause water to flow from one tank to another in the direction opposite to that of the workflow. After cascade rinsing, the sheets are briefly immersed in a hot ethanol bath and placed in a preheated vacuum oven at 50° C. for drying under a stream of $N_2$. Alternatively, drying can be done manually by using a $N_2$ gun.

Coating of Steel Sheets with Vinyl-Terminated Silane

Surfaces of steel sheets are coated uniformly with vinyl-terminated silane by vapor-phase deposition. Cleaned sheets are placed in a custom oven along with appropriate amount of 7-octenyltrimethoxysilane in an open container. The oven is operated under vacuum after previously purging with nitrogen gas twice and heated to 100° C. for 5 h while completely isolated. 7-octenyltrimethoxysilane is then completely evaporated from its container and forms a molecular-level film on surface. Once thermal deposition of the silane on the surface is done, the chamber is purged with nitrogen gas and placed under vacuum again to remove the evaporated silane. Then, an appropriate amount of ammonia gas is introduced into the chamber in order to cure the silane film on the surfaces and enhance the stability and robustness of the film. Sheets coated with the vinyl-terminated silane are sealed in a vacuum packaged aluminized Mylar pouch for storage until the next step.

The presence of the 7-octenyltrimethoxysilane film is confirmed by high contact angle of water, ~100° C., of a modified sheet and new Silicon(2s) and Silicon(2p) signals and increased Carbon(1s) signal in X-ray Photoelectron Spectroscopy (XPS) analysis. Further, when a silicon slide was treated under an identical condition side-by-side with steel sheets, the slide exhibited a film of ~1 nm thickness by ellipsometry, corresponding to monolayer coverage of the silane. It is concluded therefore that the vapor-phase deposition of 7-octenyltrimethoxysilane produces a monolayer-level of the silane film on steel surfaces.

In manufacturing setting, silane-based surface modification by vapor-phase deposition has many advantages over solution-phase method. It is well known that surface modification employing silane reagents is extremely sensitive toward environmental conditions and tricky to reproduce in the long run, particularly in bulk scale. Between two methods of silane surface modification, vapor-phase method is more tolerant to environmental conditions and easier to control critical reaction parameters and, therefore, superior in achieving better uniformity, consistency, and reproducibility. In addition, because the vapor-phase method does not need any solvent for silane reaction and post-modification rinsing, it is much more cost-effective and environmentally safe.

Selective Oxidation of Through-Holes Surfaces

Selective oxidation of the internal vinyl-terminated surface is achieved by force loading a permanganate solution into the channels. Force loading is required because of the hydrophobic nature of the vinyl surface. The method of force loading used here is to immerse the sheet of arrays in a bath of low surface energy liquid such as ethanol. The liquid will flood all of the surfaces of the array including the through-holes. When the sheet is withdrawn vertically from the bath, ethanol remains in the through-holes yet drips off of the surfaces. The array is then immersed into an aqueous solution to replace the ethanol with aqueous solution. When withdrawn, the array holds the polar (aqueous) solvent in the holes despite being initially hydrophobic on both interior and exterior array surfaces. Other methods of force filling include filling under vacuum, under hydrostatic pressure, or under a flowing liquid. For the permanganate oxidation, the conditions of time, oxidant concentration and temperature must be carefully chosen to prevent extensive oxidation of the exterior array surfaces.

In practice, a fresh oxidation solution consisting of 5 mM $KMnO_4$ and 19.5 mM $NaIO_4$ in reverse osmosis deionized (RODI) water is used to oxidize surface inside the channels. To force load the oxidant into the holes, a sheet is submerged in ethanol for about 30 seconds, followed by RODI water, and oxidation solution. The sheet with the holes loaded with oxidant is then incubated for 2 hours under perfluorinated liquid After oxidation, the sheet is rinsed with 0.3 M NaHSO$_3$ to reduce any excess permanganate and followed by an acid rinse to protonate and protect the acid terminated surface.

Selective PEGylation of Through-Hole Surfaces

PEGylation of the acid terminated layer is performed by reacting amine-terminated PEG MW 5000 in the presence of (1-ethyl-3-[3-dimethylaminopropyl]carbodiimide.HCl (EDC) as a catalyst. After an incubation period of 2 hours at room temperature under Fluorinert, the PEG in the channels is allowed to dry overnight at 100° C. By doing this, the PEGylation efficiency is dramatically improved as observed by XPS analysis.

Reloading of PEG onto Through-Holes

Prior to secondary deposition, the PEGylated surface is rinsed in RODI water to remove any EDC/PEG residues. However, to protect the channels from perfluorosilane deposition, a PEG reload was found to be necessary. A fresh 50 mg/mL1 PEG 8000 is used to reload and protect the channel. After loading the sheets are placed in an oven at 50° C. under vacuum for one hour to dry a protective PEG layer on the inside of the holes.

Coating of Steel Sheets with Perfluorosilane Selectively Outside of Through-Holes A film of heptadecafluoro-1,1,2,2-tetrahydrodecyltriethoxysilane (a.k.a. perfluorosilane) is formed uniformly on exteriors and interiors of through-holes by vapor-phase deposition. The deposition is performed in a similar manner as vinyl-terminated silane deposition described above. Sheets are placed in a chamber of a vacuum oven along with appropriate amount of perfluorosilane in an open container. Dedicated ovens are used for the two different vapor phase steps. After putting the chamber under vacuum, it is heated to 150° C. for 2 hours followed by ammonia curing step to secure the deposited film on a surface. The coated sheets are rinsed in NaCl solution and a series of DI water bath sequentially to remove PEG dried in through-holes from "Reloading of PEG" step. Naturally, rinsing away dried PEG in through-holes removes perfluorosilane film deposited on its top and ends up exposing a fresh covalently attached PEG layer. In contrast, perfluorosilane film deposited on exterior surfaces remains through extensive rinsing steps and exhibits the hydrophobicity and oleophobicity of a typical perfluorosilane film. Finished sheets bear hydrophilic, biologically inert PEG film on through-holes surfaces and hydrophobic perfluorosilane film on exterior surfaces.

A perfluorosilane film formed by vapor-phase method was examined by contact angle measurements, XPS, and ellipsometry. In XPS spectra, the film on both steel and silicon surfaces showed characteristic pattern of peaks expected from a typical perfluorosilane monolayer. The ellipsometrical thickness of the silane film on silicon slide prepared under identical condition side-by-side with steel sheets was ~1.2 nm. The contact angle of water on perfluorosilane films formed on top of vinyl-terminated film or bare surface was higher than 110°. Based on all the data collected, it is confirmed that vapor-phase deposition of perfluorosilane produces a molecular film of monolayer coverage.

What is claimed is:

1. A method for differentially coating a substrate, the method comprising:
    supplying a substrate comprising an external surface and a plurality of through-hole channels each comprising an interior surface in communication with an exterior surface;
    applying a first coating agent simultaneously to both the exterior surface and to at least one of the interior surfaces;
    selectively oxidizing the at least one interior surface by loading the at least one interior surface with an aqueous solvent;
    after selectively oxidizing, selectively modifying the first coating agent applied to the at least one interior surface with a first modifying agent such that, after modifying, the at least one interior surface has a first specified physicochemical property that differs with respect to a specified physicochemical property of the external surface; and
    applying a second modifying agent to the at least one interior surface;
    wherein:
       the aqueous solvent comprises ethanol;
       the aqueous solvent comprises permanganate solution;
       the aqueous solvent comprises a cross-linking agent; or
       the method further comprises, after selectively oxidizing, incubating the substrate in a nonreactive oil or liquid.

2. The method of claim 1, wherein at least one of (1) the first coating agent comprises a vinyl terminated compound or (2) the first and second modifying agents each comprise a polyethylene glycol.

3. The method of claim 1, wherein the aqueous solvent comprises permanganate solution KMnO$_4$ and NaIO$_4$ in deionized water.

4. The method of claim 1, wherein the aqueous solvent solution comprises permanganate solution 5 mM KMnO$_4$ and 19.5 mM NaIO$_4$ in deionized water.

5. The method of claim 1, wherein the nonreactive oil or liquid is a perfluorinated alkane solution.

6. A method for differentially coating a substrate, the method comprising:
    supplying a substrate comprising an external surface and a plurality of through-hole channels each comprising an interior surface in communication with an exterior surface;
    applying a first coating agent simultaneously to both the exterior surface and to at least one of the interior surfaces;
    selectively oxidizing the at least one interior surface by loading the at least one interior surface with a liquid modifying agent;
    after selectively oxidizing, selectively modifying the first coating agent applied to the at least one interior surface with a first modifying agent such that, after modifying, the at least one interior surface has a first specified physicochemical property that differs with respect to a specified physicochemical property of the external surface; and
    applying a second modifying agent to the at least one interior surface;
    wherein:
       the liquid modifying agent comprises ethanol;
       the liquid modifying agent comprises permanganate solution;
       the liquid modifying agent comprises a cross-linking agent; or
       the method further comprises, after selectively oxidizing, incubating the substrate in a nonreactive oil or liquid.

7. The method of claim 6, wherein at least one of (1) the first coating agent comprises a vinyl terminated compound or (2) the first and second modifying agents each comprise a polyethylene glycol.

8. The method of claim 6, wherein the liquid modifying agent comprises permanganate solution $KMnO_4$ and $NaIO_4$ in deionized water.

9. The method of claim 6, wherein the liquid modifying agent comprises permanganate solution 5 mM $KMnO_4$ and 19.5 mM $NaIO_4$ in deionized water.

10. The method of claim 6, wherein the nonreactive oil or liquid is a perfluorinated alkane solution.

\* \* \* \* \*